US012649647B2

(12) United States Patent
Houston et al.

(10) Patent No.: US 12,649,647 B2
(45) Date of Patent: Jun. 9, 2026

(54) AUTOMATED HITCH FOR AUTOMATED VEHICLE

(71) Applicant: United States Postal Service, Washington, DC (US)

(72) Inventors: Edward F. Houston, Bristow, VA (US); Leung Man Shiu, Gaithersburg, MD (US); Michael Joseph Goldberg, Portland, OR (US); Mark David Bittenbender, Baltimore, MD (US); William Patrick McConnell, Woodstock, MD (US)

(73) Assignee: United States Postal Service, Washington, DC (US)

( * ) Notice: Subject to any disclaimer, the term of this patent is extended or adjusted under 35 U.S.C. 154(b) by 235 days.

(21) Appl. No.: 18/352,128

(22) Filed: Jul. 13, 2023

(65) Prior Publication Data

US 2023/0356990 A1    Nov. 9, 2023

Related U.S. Application Data

(63) Continuation of application No. 16/931,956, filed on Jul. 17, 2020, now Pat. No. 11,708,252.

(60) Provisional application No. 62/969,539, filed on Feb. 3, 2020, provisional application No. 62/876,304, filed on Jul. 19, 2019.

(51) Int. Cl.
| | |
|---|---|
| *B60D 1/07* | (2006.01) |
| *B60D 1/36* | (2006.01) |
| *B66F 9/06* | (2006.01) |
| *B66F 9/075* | (2006.01) |
| *B66F 9/24* | (2006.01) |
| *B60D 1/00* | (2006.01) |

(52) U.S. Cl.
CPC ........... *B66F 9/07504* (2013.01); *B60D 1/07* (2013.01); *B60D 1/363* (2013.01); *B66F 9/063* (2013.01); *B66F 9/0755* (2013.01); *B66F 9/24* (2013.01); *B60D 2001/001* (2013.01)

(58) Field of Classification Search
CPC .......... B66F 9/0755; B66F 9/063; B66F 9/24; B60D 1/36; B60D 1/363; B60D 1/465; B60D 1/07; B60D 1/075
See application file for complete search history.

(56) References Cited

U.S. PATENT DOCUMENTS

| | | | |
|---|---|---|---|
| 3,702,018 A | | 11/1972 | Wood |
| 4,111,452 A | * | 9/1978 | Carlsson ............. B66F 9/07504 |
| | | | 280/421 |
| 4,786,229 A | | 11/1988 | Henderson |
| 5,267,719 A | | 12/1993 | Keller |
| 6,135,701 A | * | 10/2000 | Galloway, Sr. ........... B66F 9/18 |
| | | | 280/415.1 |
| 6,299,001 B1 | | 10/2001 | Frolov et al. |

(Continued)

FOREIGN PATENT DOCUMENTS

| | | | | |
|---|---|---|---|---|
| DE | 202021000626 U1 | 3/2021 | | |
| EP | 3392119 A1 | 10/2018 | | |
| WO | WO-2019110330 A1 | * 6/2019 | ............... | B60P 1/54 |

*Primary Examiner* — Erin D Bishop
*Assistant Examiner* — Joseph Thompson
(74) *Attorney, Agent, or Firm* — Knobbe, Martens, Olson & Bear, LLP

(57) ABSTRACT

Systems and methods for towing, hitching, and connecting devices are described. An autonomous guided vehicle includes an automated hitch capable of connecting to a variety of types of containers.

14 Claims, 32 Drawing Sheets

(56)                References Cited

U.S. PATENT DOCUMENTS

| | | | |
|---|---|---|---|
| 6,691,644 B1 | 2/2004 | Anderson | |
| 6,705,523 B1 | 3/2004 | Stamm et al. | |
| 6,871,714 B2 | 3/2005 | Johnson | |
| 7,533,742 B2 | 5/2009 | Johnson et al. | |
| 9,002,506 B1 | 4/2015 | Agarwal | |
| 9,336,509 B1 | 5/2016 | Arun Singhal | |
| 9,387,982 B1 | 7/2016 | Corey, Jr. et al. | |
| 9,561,941 B1 | 2/2017 | Watts | |
| 9,792,577 B2 | 10/2017 | Mountz | |
| 9,827,683 B1 | 11/2017 | Hance et al. | |
| 9,963,331 B1 | 5/2018 | Holmberg | |
| 10,000,284 B1 | 6/2018 | Purwin et al. | |
| 10,539,266 B2 | 1/2020 | Will et al. | |
| 10,772,444 B2 | 9/2020 | Stas | |
| 11,027,640 B2 | 6/2021 | Schwartz et al. | |
| 11,028,609 B2 | 6/2021 | Sargent | |
| 11,034,282 B2 | 6/2021 | Barlow | |
| 11,086,336 B1 | 8/2021 | Bolotski et al. | |
| 11,353,858 B2 | 6/2022 | Shiu et al. | |
| 2006/0273547 A1* | 12/2006 | Holtan | B60D 1/01 |
| | | | 280/416.1 |
| 2010/0117333 A1* | 5/2010 | Ceccarelli | B60D 1/40 |
| | | | 280/479.3 |
| 2013/0054129 A1 | 2/2013 | Wong et al. | |
| 2014/0074341 A1 | 3/2014 | Weiss | |
| 2014/0262690 A1 | 9/2014 | Henderson | |
| 2015/0032252 A1 | 1/2015 | Galluzzo et al. | |
| 2015/0158517 A1 | 6/2015 | Hasan | |
| 2016/0042320 A1 | 2/2016 | Dearing | |
| 2016/0176638 A1 | 6/2016 | Toebes | |
| 2016/0189098 A1 | 6/2016 | Beaurepaire et al. | |
| 2017/0072558 A1* | 3/2017 | Reynolds | G05D 1/024 |
| 2017/0086325 A1* | 3/2017 | Connor | H05K 7/1488 |
| 2017/0278051 A1 | 9/2017 | Cohn | |
| 2017/0283171 A1 | 10/2017 | High et al. | |
| 2017/0297820 A1 | 10/2017 | Grinnell et al. | |
| 2018/0032949 A1 | 2/2018 | Galluzzo et al. | |
| 2018/0096299 A1 | 4/2018 | Jarvis et al. | |
| 2018/0120465 A1 | 5/2018 | Rose et al. | |
| 2018/0127212 A1* | 5/2018 | Jarvis | G05D 1/247 |
| 2018/0137454 A1 | 5/2018 | Kulkarni et al. | |
| 2018/0137458 A1 | 5/2018 | Repensek | |
| 2018/0150798 A1 | 5/2018 | Wilkinson et al. | |
| 2018/0215382 A1* | 8/2018 | Gupta | B60R 1/26 |
| 2018/0215544 A1 | 8/2018 | High et al. | |
| 2018/0218185 A1 | 8/2018 | High | |
| 2018/0222262 A1 | 8/2018 | Vetkos | |
| 2018/0276604 A1 | 9/2018 | Gariepy et al. | |
| 2018/0307941 A1 | 10/2018 | Holz et al. | |
| 2018/0312112 A1* | 11/2018 | Lewis | B60R 1/003 |
| 2019/0005741 A1 | 1/2019 | Klausner et al. | |
| 2019/0064845 A1 | 2/2019 | Pardasani et al. | |
| 2019/0135598 A1* | 5/2019 | Agarwal | G05D 1/0274 |
| 2019/0193629 A1 | 6/2019 | Zevenbergen et al. | |
| 2019/0196505 A1 | 6/2019 | High et al. | |
| 2019/0210849 A1 | 7/2019 | High et al. | |
| 2019/0228375 A1 | 7/2019 | Laury et al. | |
| 2019/0310645 A1 | 10/2019 | Wu et al. | |
| 2020/0005226 A1 | 1/2020 | Sikka | |
| 2020/0023695 A1* | 1/2020 | Niewiadomski | G05D 1/0225 |
| 2020/0033118 A1* | 1/2020 | Nguyen | G06T 17/20 |
| 2020/0034780 A1 | 1/2020 | Sikka et al. | |
| 2020/0061927 A1 | 2/2020 | Millhouse et al. | |
| 2020/0122831 A1 | 4/2020 | Rivaya | |
| 2020/0207167 A1* | 7/2020 | Goncalves | B62B 3/001 |
| 2020/0207250 A1 | 7/2020 | Jarvis et al. | |
| 2020/0216299 A1* | 7/2020 | Johnson | B66F 9/07572 |
| 2020/0231185 A1 | 7/2020 | Shiu et al. | |
| 2020/0231386 A1 | 7/2020 | Shiu et al. | |
| 2020/0242544 A1 | 7/2020 | Galluzzo et al. | |
| 2020/0398620 A1 | 12/2020 | Shiu et al. | |
| 2021/0017007 A1 | 1/2021 | Houston et al. | |
| 2021/0147202 A1* | 5/2021 | Black | G05D 1/0212 |
| 2021/0170817 A1 | 6/2021 | Smith | |
| 2021/0395008 A1 | 12/2021 | Zheng | |
| 2022/0234403 A1 | 7/2022 | Ward | |

* cited by examiner

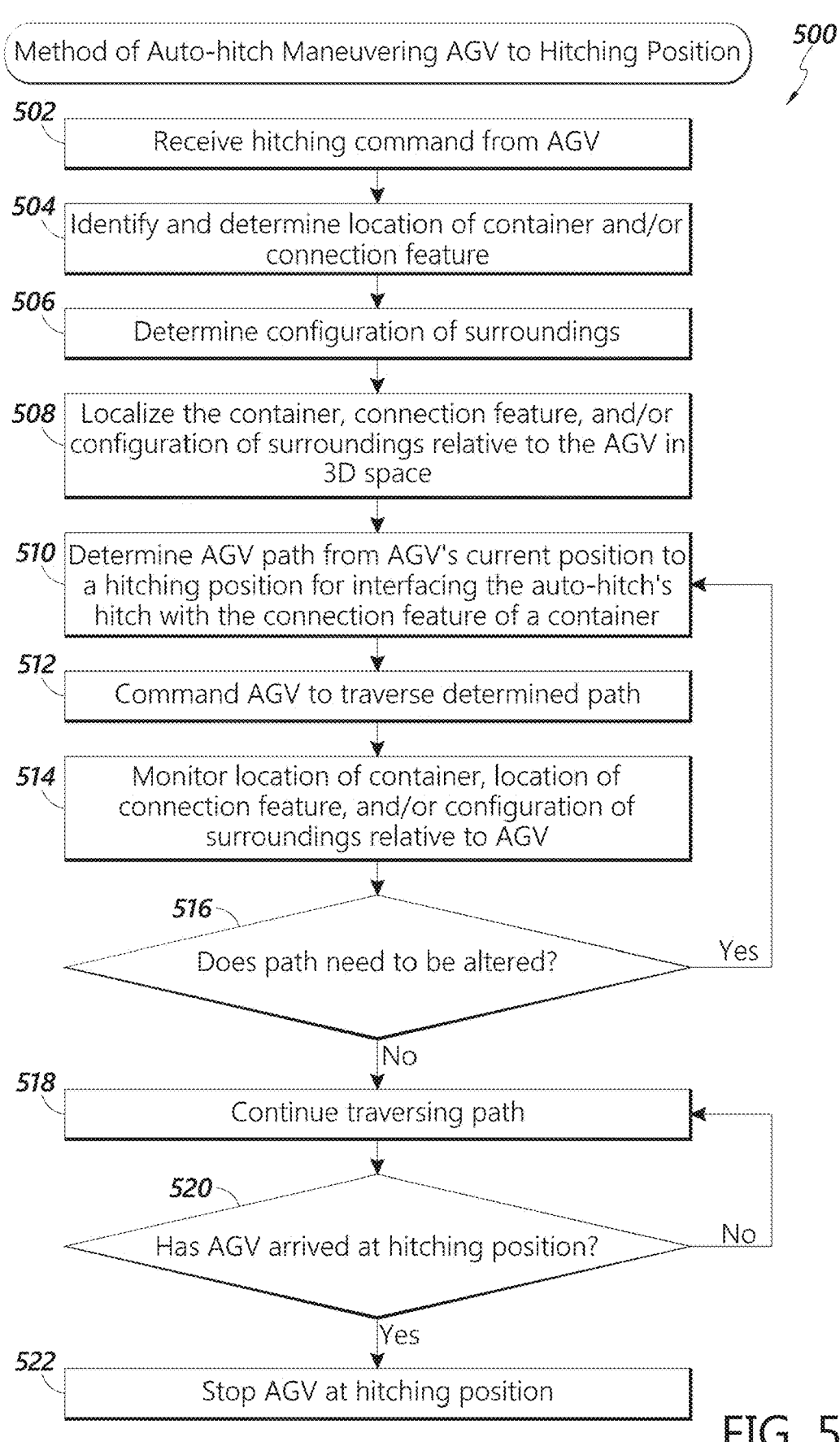

Method of Auto-hitch Maneuvering AGV to Hitching Position                500

502    Receive hitching command from AGV

504    Identify and determine location of container and/or connection feature

506    Determine configuration of surroundings

508    Localize the container, connection feature, and/or configuration of surroundings relative to the AGV in 3D space 510    Determine AGV path from AGV's current position to a hitching position for interfacing the auto-hitch's hitch with the connection feature of a container 512    Command AGV to traverse determined path 514    Monitor location of container, location of connection feature, and/or configuration of surroundings relative to AGV 516    Does path need to be altered?          Yes No 518    Continue traversing path 520    Has AGV arrived at hitching position?          No Yes 522    Stop AGV at hitching position

FIG. 5

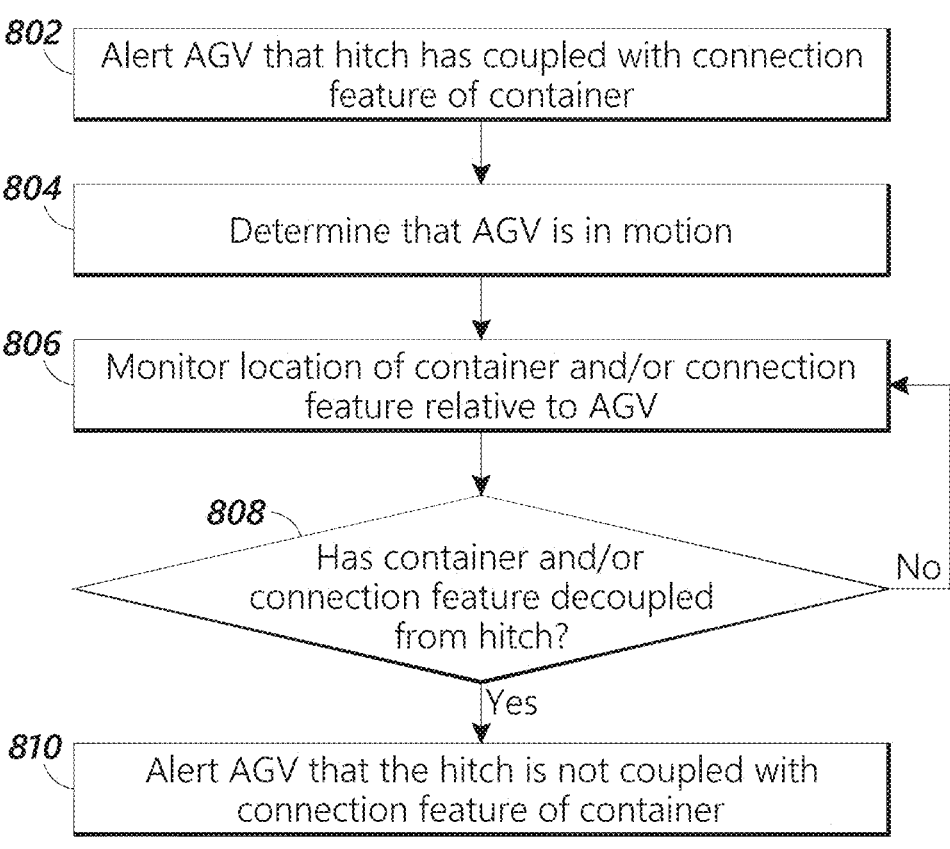
FIG. 8

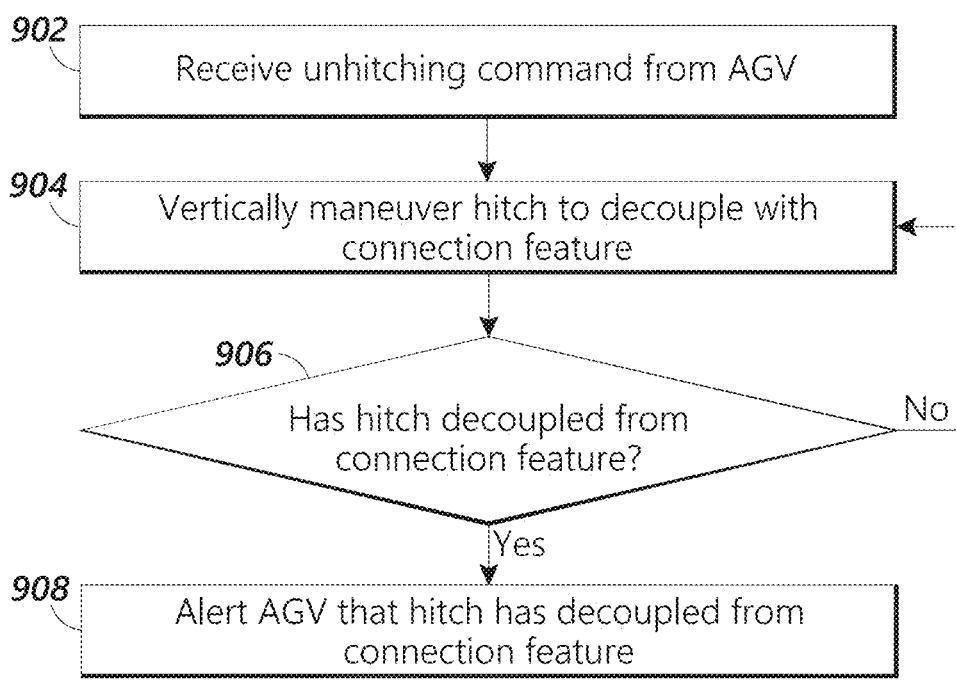
FIG. 9

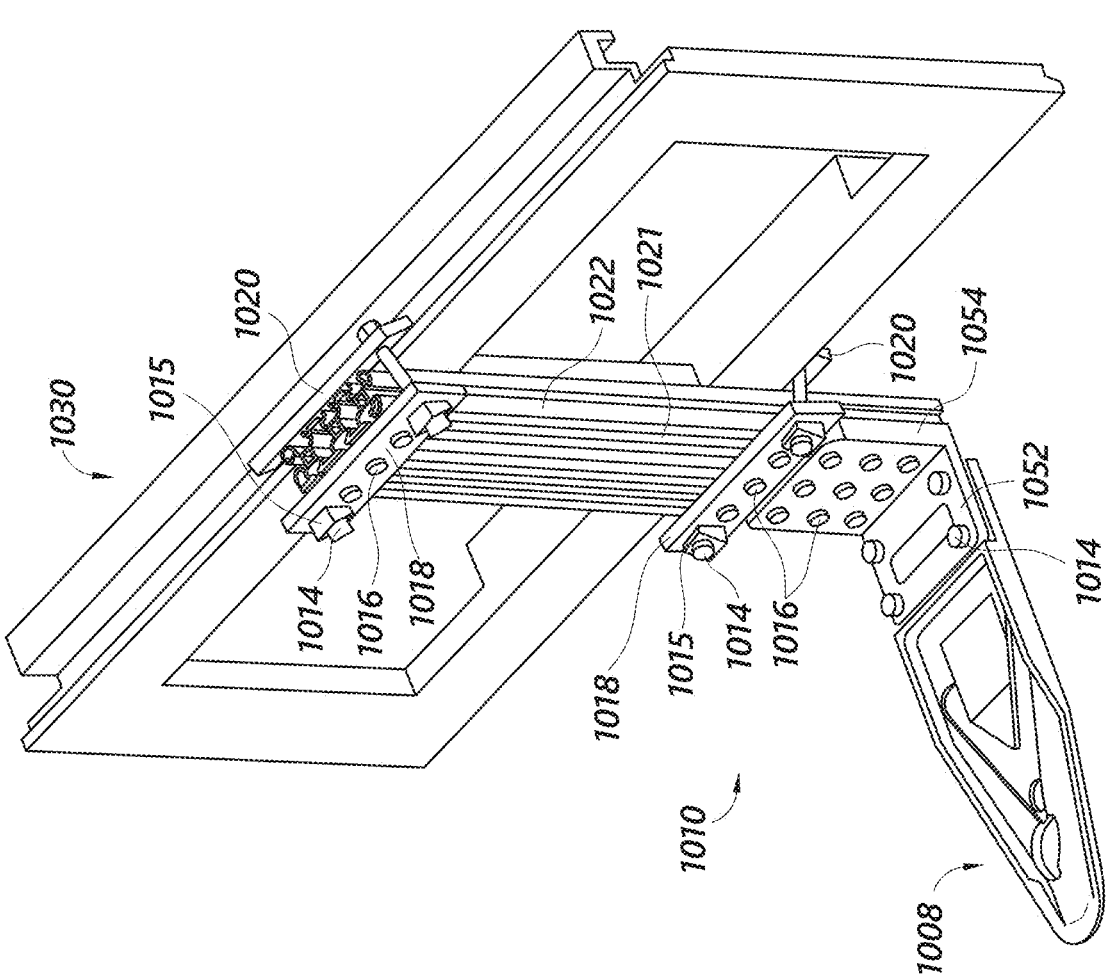
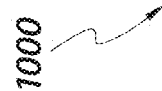
FIG. 10B

1070

1070

_1300_

_1302_ Direct the sensor to perform a scan of a container

_1304_ Generate a point cloud of the container

_1306_ Extract a point cloud of the connection feature from the generated point cloud _1308_ Locate the point cloud of the extracted connection feature within the generated point cloud Method of Locating a connection Feature

*1400*

AUTOMATED HITCH FOR AUTOMATED VEHICLE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57. This application is a continuation of U.S. patent application Ser. No. 16/931,956, filed Jul. 17, 2020, which claims the benefit of priority to U.S. provisional application 62/876,304, filed Jul. 19, 2019, and U.S. provisional application 62/969,539, filed Feb. 3, 2020, the entire contents of each of which are hereby incorporated by reference.

BACKGROUND

This disclosure relates to towing, hitching, and connecting devices, systems, methods of use, and methods of manufacture of the same. In particular, this disclosure relates to automated hitches and connections for transporting items using autonomous guided vehicles.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features provide advantages that include towing and connections.

In one aspect described herein, an automatic hitching system, the system comprises a frame configured to couple to an automated guided vehicle (AGV), wherein the frame comprises a shaft; a hitch comprising an aperture that is configured to interface with a connection feature of an item container, wherein the hitch is coupled to an end of the shaft; a lateral actuator configured to move the hitch laterally; a vertical actuator configured to vertically maneuver the shaft; and a sensor configured to sense a surrounding of the automatic hitching system, a location of the item container, and a location of the connection feature of the item container relative to the hitch; a control system in communication with the lateral actuator, the vertical actuator, and the sensor, wherein the control system receives and interprets sensor inputs from the sensor, wherein the control system generates commands based on the interpreted sensor inputs to control the rotational actuator and vertical actuator to maneuver the hitch, and wherein the control system generates commands based on the interpreted sensor inputs to operate the automated guided vehicle.

In some embodiments, the vertical actuator comprises a motor that moves the shaft up and down using a wind-up belt in a pulley arrangement, and wherein the shaft is pulled downward when the wind-up belt is wound in and pulled upward by an integrated gas spring when the belt is wound out.

In some embodiments, the lateral actuator is configured to rotate the hitch about an axis.

In some embodiments, the hitch comprises a hitch pocket that is surrounded by a peripheral wall.

In some embodiments, the hitch pocket comprises a plurality of apertures configured to interface with different connection features, and wherein the peripheral wall is adapted to guide the connection feature into at least one of the plurality of apertures.

In some embodiments, the automatic hitching system is configured to be retrofitted on the AGV.

In another aspect described herein, an automatic hitching system, the system comprises a hitch comprising a first aperture configured to interface with a connection feature of an item container; a vertical actuator configured to maneuver the hitch vertically; a sensor configured to sense a location of the item container and a location of the connection feature of the item container; a control system comprising a controller, processor, and memory system, wherein the processor is connected to the memory system comprising instructions that, when executed by the processor, cause the system to: receive sensor input from the sensors indicative of the surroundings of the automatic hitching system, the location of the item container, and the location of the connection feature; interpret the sensor input to determine a hitch operation and/or an automated guided vehicle (AGV) operation, wherein the hitch operation comprises directing the vertical actuator to maneuver the hitch, and wherein the AGV operation comprises directing movements of the AGV; and generate, via the controller, commands configured to cause the vertical actuator and/or AGV to effectuate the hitch operation and/or AGV operation.

In some embodiments, the instructions, when executed by the processor, cause the automatic hitching system to identify the item container or connection feature; determine the location of the item container, and the location of the connection feature, relative to the hitch; and determine a path from a current location of the AGV to a hitching position proximate the connection feature of the item container and/or item container.

In some embodiments, the instructions, when executed by the processor, cause the automatic hitching system to command the AGV to traverse the determined path from the current location of the AGV to the hitching position proximate the connection feature of the item container and/or item container; monitor the surrounding of the automatic hitching system, the location of the item container, and/or the location of the connection feature relative to the AGV as the AGV traverses the determined path; determine whether the determined path needs to be altered based on the monitored surrounding of the automatic hitching system, the location of the item container, and/or the location of the connection feature, relative to the AGV; and in response to determining that the determined path needs to be altered, determine a new AGV path from the current location of the AGV to the hitching position proximate the connection feature of the item container and/or item container.

In some embodiments, the instructions, when executed by the processor, cause the hitching system to maneuver the AGV to position the aperture of the hitch beneath the connection feature of the item container; vertically maneuver the hitch to place the connection feature within the aperture; determine that the connection feature is positioned within the aperture; in response to determining that the connection feature is positioned within the aperture, alert the AGV that the hitch has successfully coupled with the connection feature.

In some embodiments, the hitch further comprises a hitch pocket that is bounded by a peripheral wall, a target, and a second aperture disposed posteriorly relative to the first aperture and within a v-shaped groove.

In some embodiments, the instructions, when executed by the processor cause the automatic hitching system to maneuver the AGV to position the target of the hitch below the connection feature of the item container; vertically maneuver the hitch such that the connection feature is proximate the target of the hitch; determine whether the connection feature is sized for the first aperture or second aperture; in response to determining that the connection feature is sized for the first aperture, maneuver the AGV forward such that the connection feature is forward of the v-shaped groove, vertically maneuver the hitch to apply an upward preload on the connection feature with the hitch, and maneuver the AGV forward such that the connection feature is guided by the peripheral wall to the first aperture; and in response to determining that the connection feature is sized for the second aperture, vertically maneuver the hitch to apply an upward preload on the connection feature with the hitch, maneuver the AGV forward such that the connection feature is placed in the v-shaped groove and guided therein to the second aperture.

In some embodiments, the system further comprises a rotational actuator configured to rotate the hitch, wherein the instructions, when executed by the processor, are configured to cause the automatic hitching system to: interpret the sensor input to determine a hitch operation, wherein the hitch operation is configured to direct the rotational actuator to maneuver the hitch; and generate, via the controller, commands configured to cause the rotational actuator to effectuate the hitch operation.

In some embodiments, the instructions, when executed by the processor, cause the automatic hitching system to determine the location of the connection feature relative to the hitch; determine whether the hitch needs to be rotated to align the hitch with the connection feature of the item container based on the location of the connection feature relative to the hitch; in response to determining that the hitch needs to be rotated to align with the connection feature, command the rotational actuator to rotate the hitch to align with the connection feature; and in response to determining that the hitch does not need to be rotated to align with the connection feature, command the vertical actuator to vertically maneuver the hitch to couple the connection feature to the hitch.

In some embodiments, the instructions, when executed by the processor cause the automatic hitching system to alert the AGV that the hitch has coupled to the connection feature of the item container; monitor the location of the item container and/or connection feature relative to the AGV to determine whether the item container is coupled to the AGV; in response to determining that the item container is coupled to the AGV, continue monitoring the location of the item container relative to the AGV; and in response to determining that the item container is not coupled to the AGV, alert the AGV.

In some embodiments, the automatic hitching system receives an unhitching command from the AGV; wherein the instructions, when executed by the processor, are configured to cause the automatic hitching system to command the vertical actuator to vertically maneuver the hitch to decouple the hitch from the connection feature; determine whether the hitch has decoupled from the connection feature; in response to determining that the hitch has not decoupled from the connection feature, continue to command the vertical actuator to vertically maneuver the hitch to decouple the hitch from the connection feature; in response to determining that the hitch has decoupled from the connection feature, alert the AGV that the hitch has decoupled from the connection feature.

In another aspect described herein, the system comprises a hitch configured to interface with a connection feature of an item container; a vertical actuator configured to vertically maneuver the hitch; a sensor configured to sense a surrounding of the automatic hitching system, a location of the item container, and a location of the connection feature of the item container; a control system configured to connect to an automated guided vehicle (AGV), wherein the control system receives and interprets sensor inputs from the sensor, and wherein the control system generates commands based on the interpreted sensor inputs to control the vertical actuator and automated guided vehicle to couple the hitch to the connection feature of the item container.

In some embodiments, the hitch further comprises a pocket at least partially defined by a peripheral wall; a target configured to be used to align the hitch with the connection feature, the target being disposed in the pocket; a first aperture and a second aperture, wherein the first and the second apertures are configured to interface with different connection features and are at least partially disposed within the pocket; and a groove configured to guide the connection feature to the second aperture; wherein the peripheral wall is configured to guide the connection feature to the first aperture.

In some embodiments, the hitch comprises an inclined outer edge.

In some embodiments, the vertical actuator is a lifting mechanism of a forklift.

BRIEF DESCRIPTION OF THE DRAWINGS

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

FIG. 5 illustrates an exemplary method of the auto-hitch system maneuvering the AGV to a hitching position.

FIG. 8 illustrates an exemplary method of monitoring a container and/or connection feature when an AGV is towing.

FIG. 9 illustrates an exemplary method of unhitching a hitch from a connection feature.

FIG. 10B illustrates components of the exemplary auto-hitch system.

DETAILED DESCRIPTION

Although certain embodiments and examples are described below, this disclosure extends beyond the specifically disclosed embodiments and/or uses and obvious modifications and equivalents thereof. Thus, it is intended that the scope of this disclosure should not be limited by any particular embodiments described below.

The quantity of items, such as packages and parcels, being delivered to homes and businesses is rising. Often large quantities of items need to be moved quickly and efficiently. Consequently, distribution networks, such as the United States Postal Service (USPS), can employ automated guided vehicles (AGVs) to tow one or more item containers, such as rigid and collapsible wire containers, pallets, wheeled shelves, bins, pouches, bags, containers, and other rolling stock to move large quantities of items in an efficient manner. AGVs can efficiently and quickly tow containers to move large quantities of items. This efficiency and speed can be affected when human interaction is required to couple a container to an AGV for transportation. Further, requiring human interaction can significantly increase cost. Accordingly, distribution networks can use automatic hitching systems to automatically hitch AGVs to item containers with reduced or eliminated human interaction. This can advantageously make AGVs more cost effective and/or increase the efficiency and speed of the movement of items or containers within a warehouse. Further efficiency can be gained by enabling an auto-hitch mechanism to be operable with a wide variety of types of containers and rolling stock.

Figure 1A:
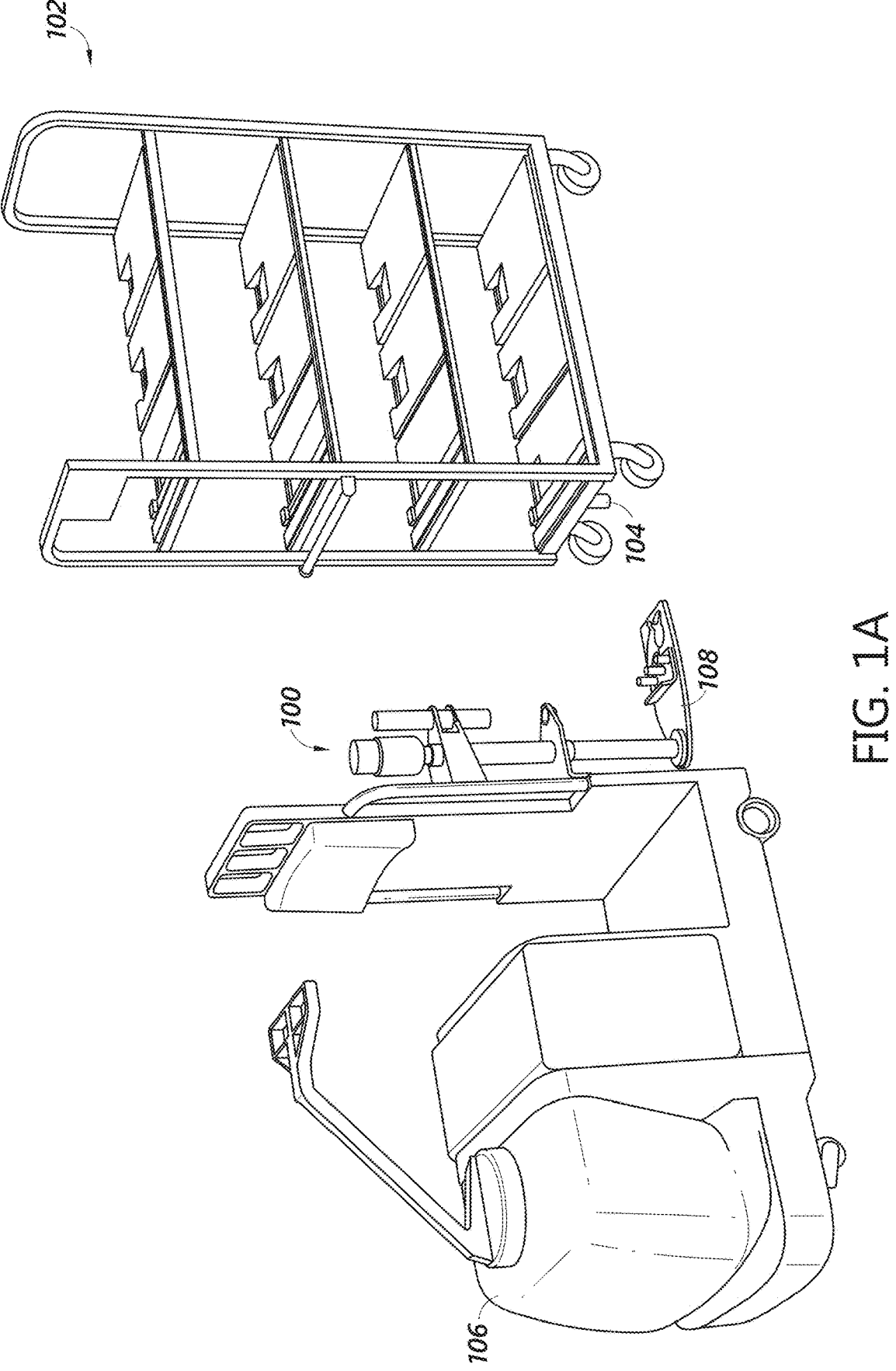
FIG. 1A illustrates an exemplary auto-hitch system connected to an automated guided vehicle (AGV) positioned to begin a hitching procedure.
Figure 1B:
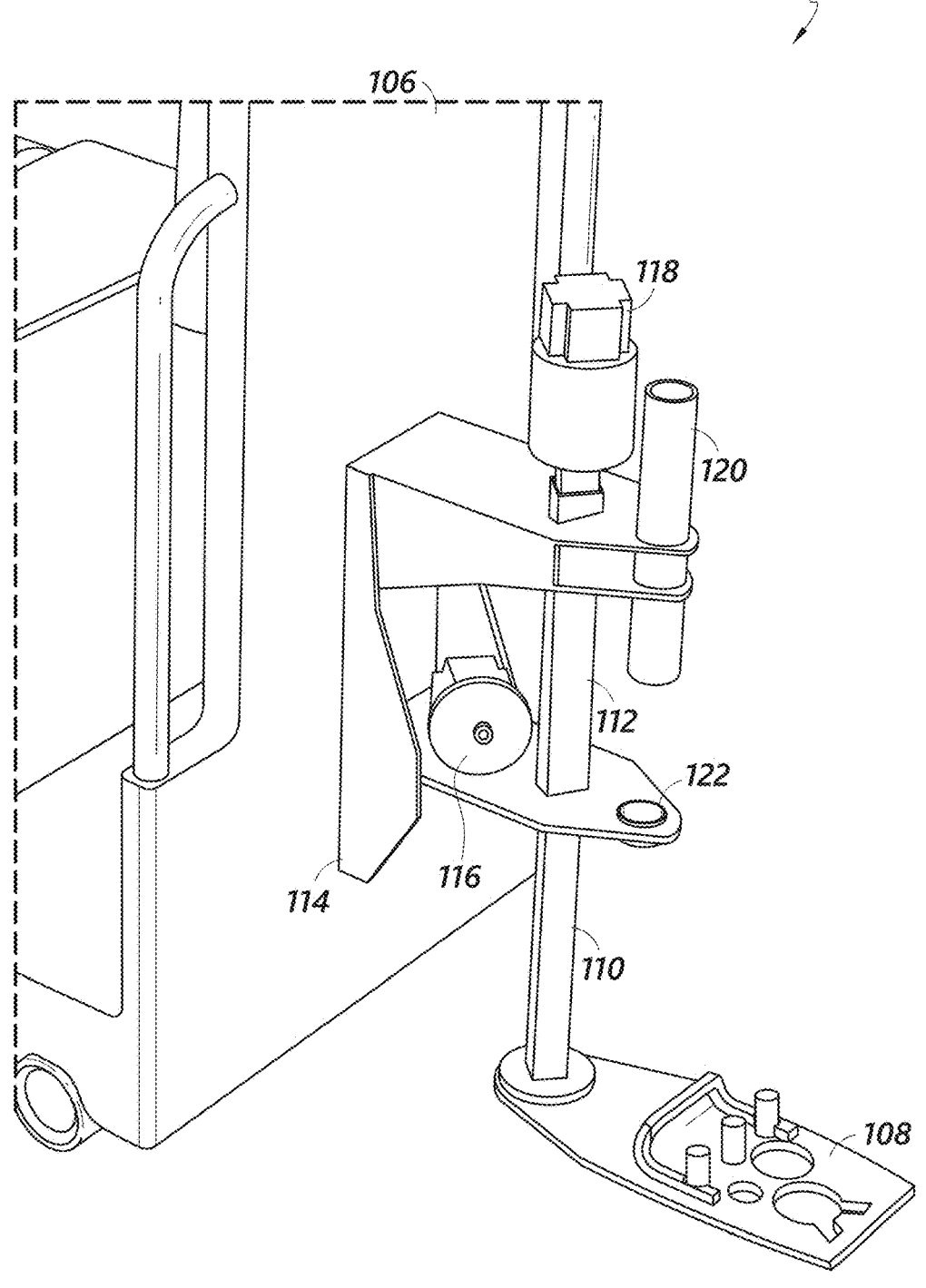
FIG. 1B illustrates an exemplary auto-hitch system connected to an AGV.
Figure 1C:
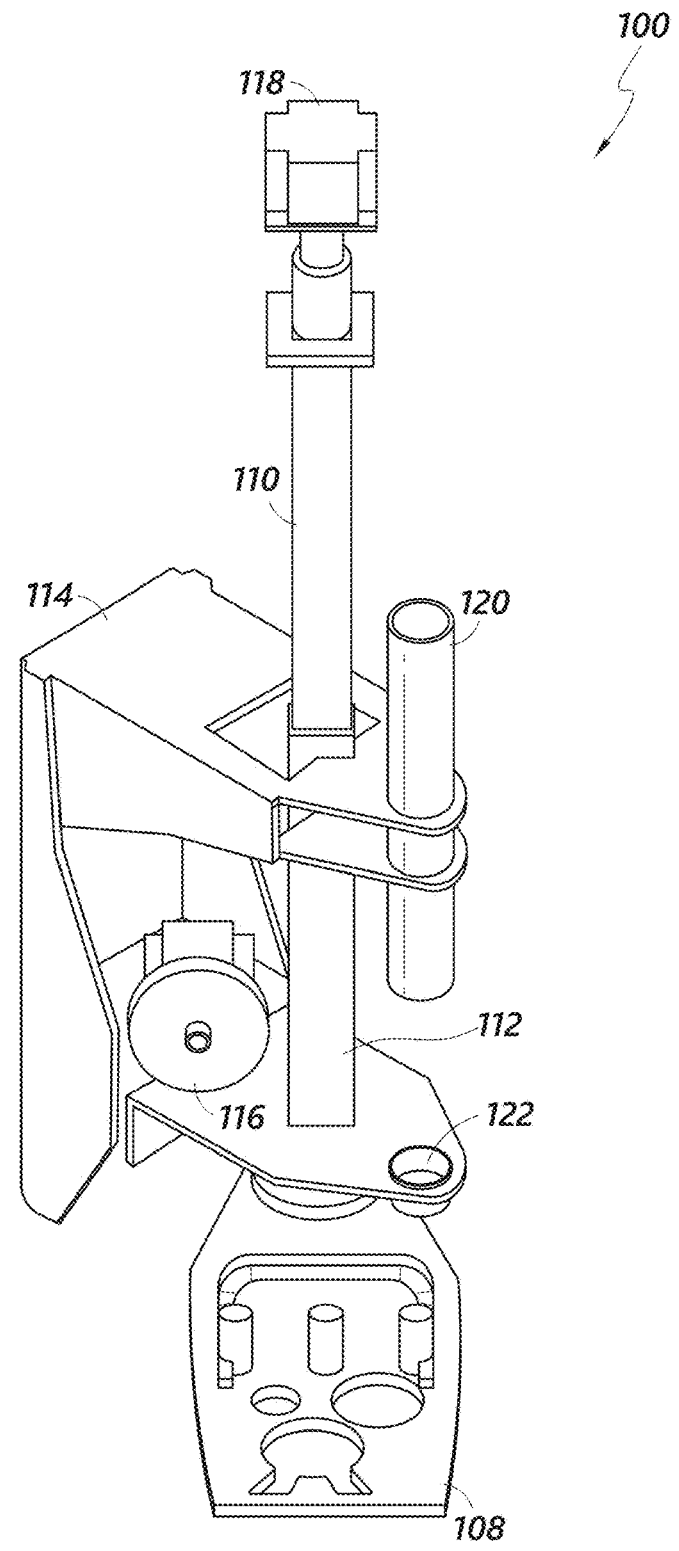
FIG. 1C illustrates an exemplary auto-hitch system with a hitch rotated and lifted.

FIGS. 1A-1C illustrate an embodiment of an automatic hitching—auto-hitch—system 100. FIG. 1A illustrates the auto-hitch system 100 coupled to an AGV 106. The auto-hitch system 100 has a hitch 108. The auto-hitch system 100 automatically couples and decouples the hitch 108 to a connection feature 104 of an item container 102. The connection feature 104 is coupled to or a part of the item container 102 to which the AGV must connect (via the auto-hitch) in order to pull the item container 102. The item container 102 depicted in FIG. 1A is a wheeled shelving unit; however, it will be understood that the auto-hitch system 100 described herein can be used with many types of item containers. The auto-hitch system 100 identifies and determines the location of the item container 102 and the connection feature 104. The auto-hitch system 100 selectively controls the AGV 106 to position the AGV 106 in a position to hitch to the item container 102. In the illustrated embodiment, the item container 102 is a wheeled shelf container. In some embodiments, the item container 102 can be rigid and collapsible wire containers, pallets, wheeled shelves, bins, pouches, bags, containers, and rolling stock to move large quantities of items in an efficient manner. As described herein, items can be held in containers, pallets, bins, etc., and the term item can also be used interchangeably with containers, pallets, bins, etc.

With the AGV 106 in a hitching position, the auto-hitch system 100 maneuvers the hitch 108, with at least two axes of motion, to couple to the connection feature 104 of the item container 102. In some embodiments, the auto-hitch system 100 maneuvers the AGV 106 during the hitching process. To decouple, the auto-hitch system 100 maneuvers the hitch 108 and/or the AGV 106 to decouple the hitch 108 from the connection feature 104 of the item container 102. In some embodiments, the AGV 106 can be operated by a human, such as a motorized pallet jack or tug or forklift, but can selectively command the auto-hitch system 100 to automatically couple the hitch 108 to a connection feature 104. In some embodiments, the AGV 106 can be a fully autonomous vehicle. The auto-hitch system 100 can be used to tow one container 102 or a plurality of containers. This process will be described in greater detail elsewhere herein.

In some embodiments, the auto-hitch system 100 can be retrofitted to an existing AGV 106. Retrofitting the auto-hitch system to the AGV 106 requires minimal modification. The auto-hitch system 100 is coupled to a posterior portion of the AGV 106. In some embodiments, the auto-hitch system 100 is incorporated into the AGV 106 when the AGV 106 is manufactured. In some embodiments, the auto-hitch system 100 is coupled to an anterior, lateral, bottom, and/or top portion of the AGV 106.

FIG. 1B shows an auto-hitch system 100 coupled to an AGV 106. The auto-hitch system 100 has a hitch 108. The hitch 108 is coupled to a shaft 110. The shaft 110 has a square cross-section. In some embodiments, the shaft 110 has a cross-section that is circular, polygonal, and/or some other shape. In some embodiments, the shaft 110 is hollow or solid. The shaft 110 slides within or through a sleeve 112. The sleeve 112 is part of a frame 114 that supports the various components of the auto-hitch system 100. The frame 114 is coupled to the AGV 106.

The shaft 110 is vertically maneuvered in the sleeve 112 by the vertical actuator 116. Moving the shaft 110 up and down maneuvers the hitch 108 up and down. The vertical actuator 116, using a motor, moves the shaft 110 up and down using a wind-up belt, pulley arrangement, a gear, and/or other similar mechanism. In some embodiments, the shaft 110 is moved downward when the belt is wound in. In some embodiments, the shaft 110 is moved upward by an integrated gas spring 213, as shown in FIG. 2E, when the belt is wound out. The torque output of the vertical actuator 116 can be limited for safety. The unpowering of the motor of the vertical actuator 116 allows the shaft 110 to automatically rise up. In the illustrated embodiment, the motor of the vertical actuator 116 has wound the belt in, pulling the shaft 110 and hitch 108 downward. In some embodiments, the vertical actuator 116 incorporates gears, hydraulics, and/or other suitable mechanisms to maneuver the shaft 110 up and down. In some embodiments, unpowering the motor of the vertical actuator 116 enables a user to physically maneuver the shaft 110 and hitch 108 up and down.

The auto-hitch system 100 has a rotational actuator 118. The rotational actuator 118 is positioned on shaft 110 opposite the hitch 108. The rotational actuator 118 is motorized using a direct drive motor arrangement to rotate the hitch 108. In some embodiments, an internal shaft extends from the rotational actuator 118 to the hitch 108 through the shaft 110, enabling the rotational actuator 118 to rotate the hitch 108. In some embodiments, when the shaft 110 has a circular cross-section, the rotational actuator 118 rotates the shaft 110 to rotate the hitch 108. The torque output of the motor of the rotational actuator 118 can be limited for safety. Unpowering the motor of the rotational actuator 118 allows the hitch 108 to function as a standard pivoting hitch while the AGV 106 is in motion. In some embodiments, the hitch 108 can be locked in a fixed position or rotate when towing. In some embodiments, unpowering the motor of the rotational actuator 118 allows a user to physically rotate the hitch 108. In some embodiments, the rotational actuator 118 can incorporate gears, pulleys, hydraulics, and/or other suitable mechanisms to rotate the hitch 108.

The frame 114 is connected to a fixed receiver 120. The longitudinal axis of the fixed receiver 120 is parallel to the sleeve 112. The fixed receiver 120 is a hollow tube that extends in a vertical direction. The fixed receiver 120 is fixed relative to the frame 114 and AGV 106. In some embodiments, the fixed receiver 120 is a non-automated hitch connection that can be used when automatic hitching is not needed or wanted. The fixed receiver 120 has a circular cross-section. In some embodiments, the fixed receiver 120 has a polygonal and/or other suitably shaped cross-section.

Similarly, the frame 114 has a fixed aperture 122. The fixed aperture 112 is circular. The fixed aperture 122 is fixed relative to the frame 114 and AGV 106. In some embodiments, the fixed aperture 120 is a non-automated connection that can be used when automatic hitching is not needed or wanted. In some embodiments, the fixed aperture 122 can be polygonal and/or be another suitable shape.

FIG. 1C shows the auto-hitch system 100. In the illustrated embodiment, the rotational actuator 118 rotated the hitch 108 to a different position than shown in FIG. 1B. As discussed above, the rotational actuator 118 can rotate the hitch 108 for hitching to a connection feature. In the illustrated embodiment, the vertical actuator 116 raised the shaft 110 up through the sleeve 112, raising the hitch 108. The shaft 110 is visible above the sleeve 112. As discussed above, the vertical actuator 116 raises and lowers the shaft 110 and hitch 108 to couple and uncouple the hitch 108 from a connection feature.

FIGS. 2A-2F illustrate an embodiment of an auto-hitch system 200. The auto-hitch system 200 can include all the features, characteristics, methods, and variations described in reference to other auto-hitch systems described herein.

Figure 2A:
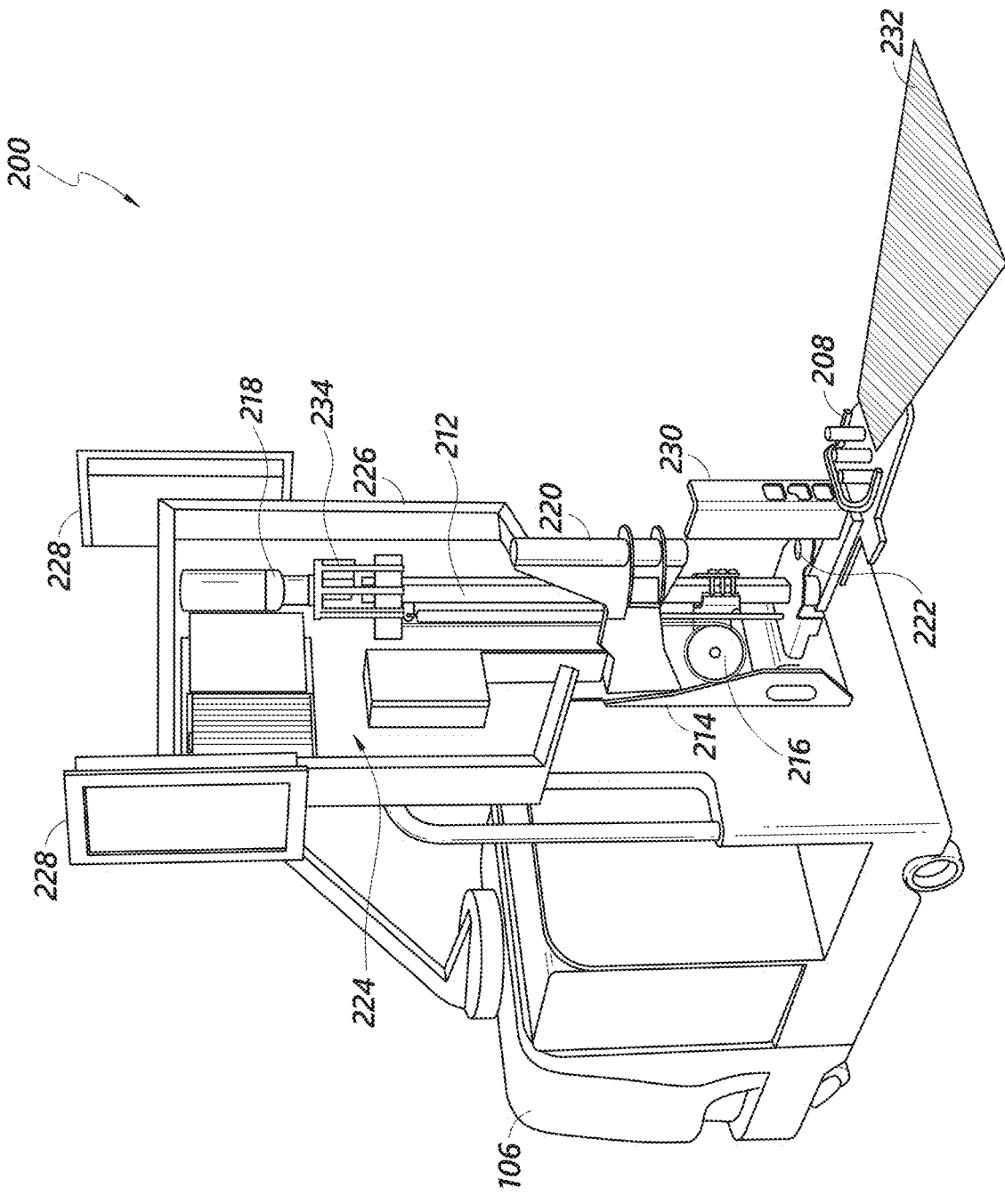
FIG. 2A illustrates an exemplary auto-hitch system connected to an AGV.

FIG. 2A shows the auto-hitch system 200 coupled to an AGV 106. The auto-hitch system 200 is retrofitted to the AGV 106. The auto-hitch system 200 is coupled to a posterior portion of the AGV 106 and extends above a rear wall of the AGV 106.

The auto-hitch system 200 has a hitch 208. The hitch 208 is coupled to a shaft that is positioned within the sleeve 212. The shaft slides in and out of the sleeve 212 to maneuver the hitch 208 up and down for coupling and decoupling with a connection feature. The sleeve 212 is part of the frame 214 that supports the varied components of the auto-hitch system 200. The frame 214 is coupled to the AGV 106.

The shaft is vertically maneuvered in and out of the sleeve 212 by the vertical actuator 216. The vertical actuator 216 is positioned on the frame 214. An enlarged view of the vertical actuator 216 and surrounding features is shown in FIG. 2E. FIG. 2E, as explained above, shows an integrated gas spring 213 that maneuvers the shaft, and hitch 208, up when the vertical actuator 216 has wound out the belt. Other devices similar to a gas spring can be used to maneuver the shaft and hitch 208 upward, such as a helical spring, hydraulic spring, magnet arrangement, or other suitable devices. Moving the shaft 210 up and down moves the hitch 208 up and down. The vertical actuator 216 includes at least the same features and variations described in reference to the vertical actuator 116.

The hitch 208 is rotated with a rotational actuator 218. An enlarged view of the rotational actuator 218 and surrounding features is shown in FIG. 2C. The rotational actuator 218 is positioned on the shaft opposite the hitch 208. The rotational actuator 218 includes at least the same features and variations described in reference to the rotational actuator 216. The rotational actuator 218 includes a guard 234 that is coupled to the sleeve 212. The guard 234 protects features of the rotational actuator 218. The guard 234 includes four bars surrounding a bottom portion of the rotational actuator 218 that advantageously reduce the risk that the rotational actuator will be damaged during use and/or that a bystander or operator will be injured when interacting with the auto-hitch system 200.

The frame 214 has a fixed receiver 220. The fixed receiver 220 includes at least the same features and variations described in reference to the fixed receiver 120.

The frame 214 has a tower portion 226, as shown in FIG. 2A. The tower portion 226 extends above the rear wall of the AGV 106. The tower portion 226 houses the control system 224. The tower portion 226 includes a wall that extends around the perimeter of the tower portion 226. The wall can protect the control system 224 from damage.

Interface devices 228 are positioned on a top portion of the tower portion 226. The interface devices can display information about the AGV 106, such as the battery status, current route, task or mission, a send or call status, and the like.

A sensor 230 is positioned proximate the hitch 208. The sensor 230 is positioned on and/or proximate the hitch 208. An enlarged view of the sensor 230 is shown in FIG. 2E. The sensor 230 detects the location of the containers and connection features for hitching. The sensor 230 can detect the surroundings of the auto-hitch system 200 to avoid collisions and/or to detect desirable maneuvering paths. The sensor 230 is connected to the control system 234 via a data and power connection. In some embodiments, sensor 230 includes one sensor, two sensors, or more than two sensors. The sensor 230 can provide real-time sensing information to the control system 224. The sensor 230 can include one or more of the following: an optic sensor, photo sensor, light sensor, video camera sensor, camera sensor, radar sensor, infrared sensor (including infrared laser mapping), thermal sensor, laser sensor, LiDAR sensor, proximity sensor, capacitive sensor, ultrasonic sensor, 3D sensor, and/or any combination of sensing systems used to determine distance, presence, movement, etc. The sensor 230 has at least a field of view 232, as shown in FIG. 2A. Field of view 232 schematically illustrates the viewing region of sensor 230. In some embodiments, the sensor 230 can include a field of view that extends up to 360 degrees around the hitch 208. The sensor 230 provides input to the controller 234 as described elsewhere herein.

The control system 224 is described in more detail below in reference to FIG. 4. The control system 224 can be powered by the AGV 106. The control system 224 can include a data connection to the AGV 106 that enables control system 224 to control the AGV 106. The control system 224 can control the AGV 106 directly or through a network relay. In some embodiments, the control system 224 communicates with the AGV 106 in other manners, which can include wirelessly, such as Bluetooth, radio, etc. The controller 234 can include a processor, a programmable logic controller ("PLC"), in some embodiments, the control system 224 can comprise a processor such as, for example, a microprocessor, such as a Pentium® processor, a Pentium® Pro processor, a 8051 processor, a MIPS® processor, a Power PC® processor, an Alpha® processor, a microcontroller, an Intel CORE i9®, i7®, j5®, or i3® processor, or combination of cores, an AMD Ryzen®, Phenom®, Aseries®, or FX® processor, or any other type of microprocessor. The processor typically has conventional address lines, conventional data lines, and one or more conventional control lines and comprise one or more cores. The processor may be in communication with a processor memory, which may include, for example, RAM memory, flash memory, ROM memory, EPROM memory, EEPROM memory, registers, hard disk, a removable disk, a CD-ROM, or any other form of storage medium known in the art. The processor memory may include, for example, software, at least one software module, instructions, steps of an algorithm, or any other information. In some embodiments, the processor performs processes in accordance with instructions stored in the processor memory. In some embodiments, other controllers or computing systems can be used. In some embodiments, the AGV 106 maneuvers to the vicinity of a container prior to engaging with the auto-hitch system 200. In some embodiments, the AGV 106 commands the auto-hitch system 200 to begin a hitching procedure when the AGV 106 is in the vicinity of a container. The auto-hitch system 200 can provide steering angle inputs and motion instructions/feedback to the AGV 106 to direct the AGV 106 to a hitching position proximate the container and/or connection feature of the container.

The auto-hitch system 200 is powered by the AGV 106. The power supplied can be between 12 VDC and 36 VDC, or other suitable ranges. In some embodiments, this can include 6V to 100V or more. In some embodiments, the auto-hitch system 200 is independently powered and includes a battery for energy storage.

Figure 2B:
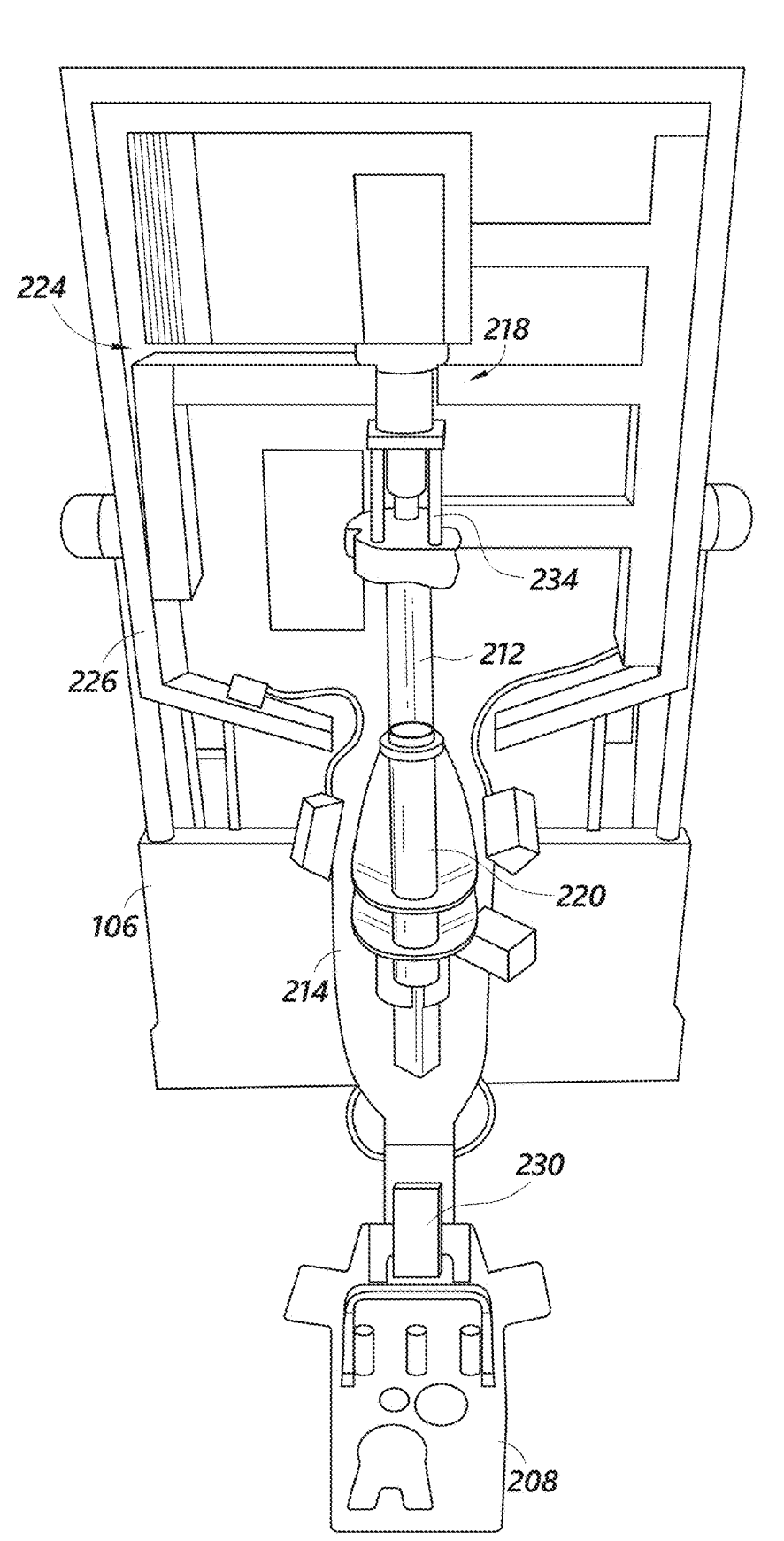
FIG. 2B illustrates an exemplary auto-hitch system connected to an AGV.
Figure 2C:
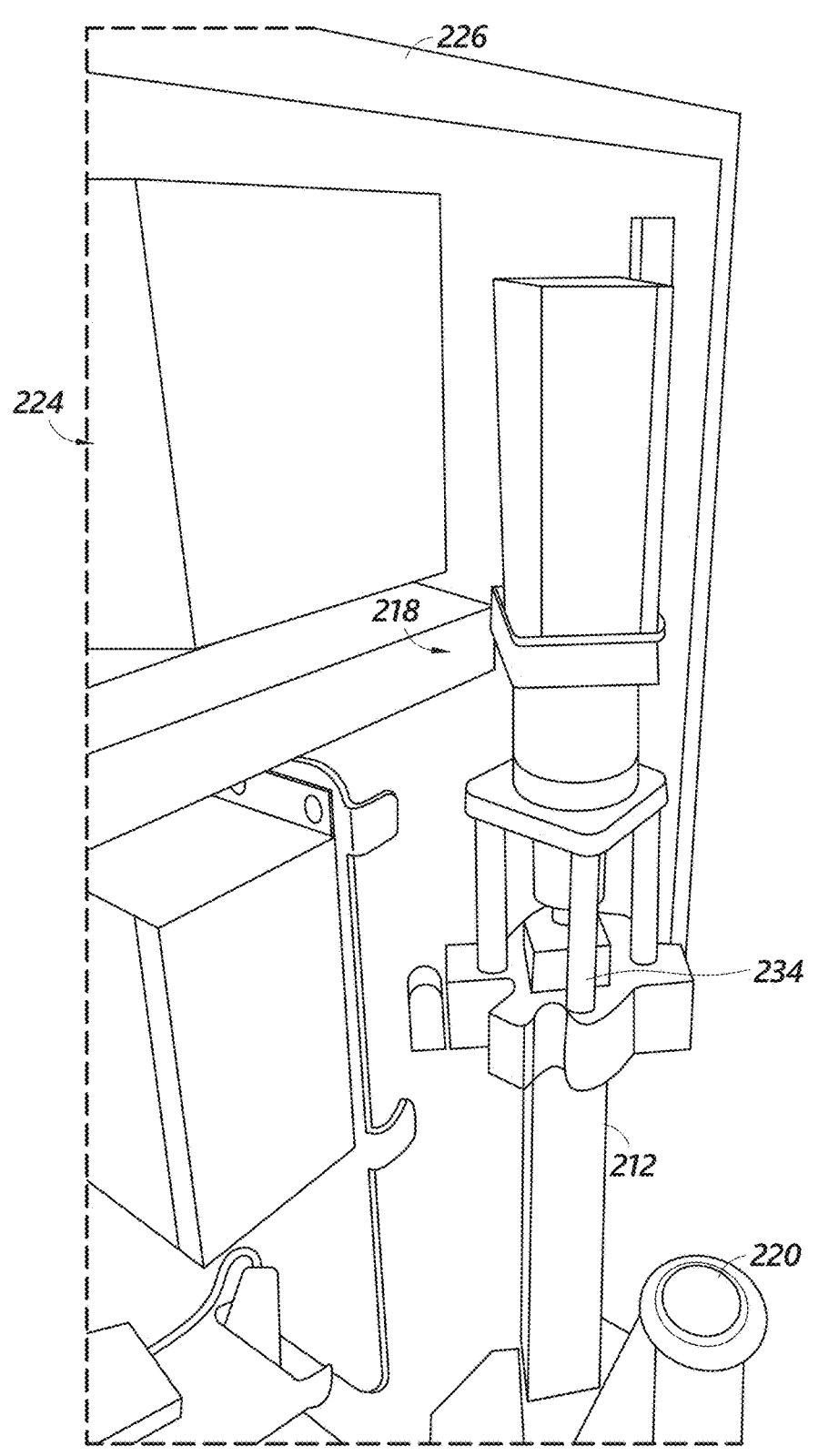
FIG. 2C illustrates a rotational actuator of an exemplary auto-hitch system.
Figure 2D:
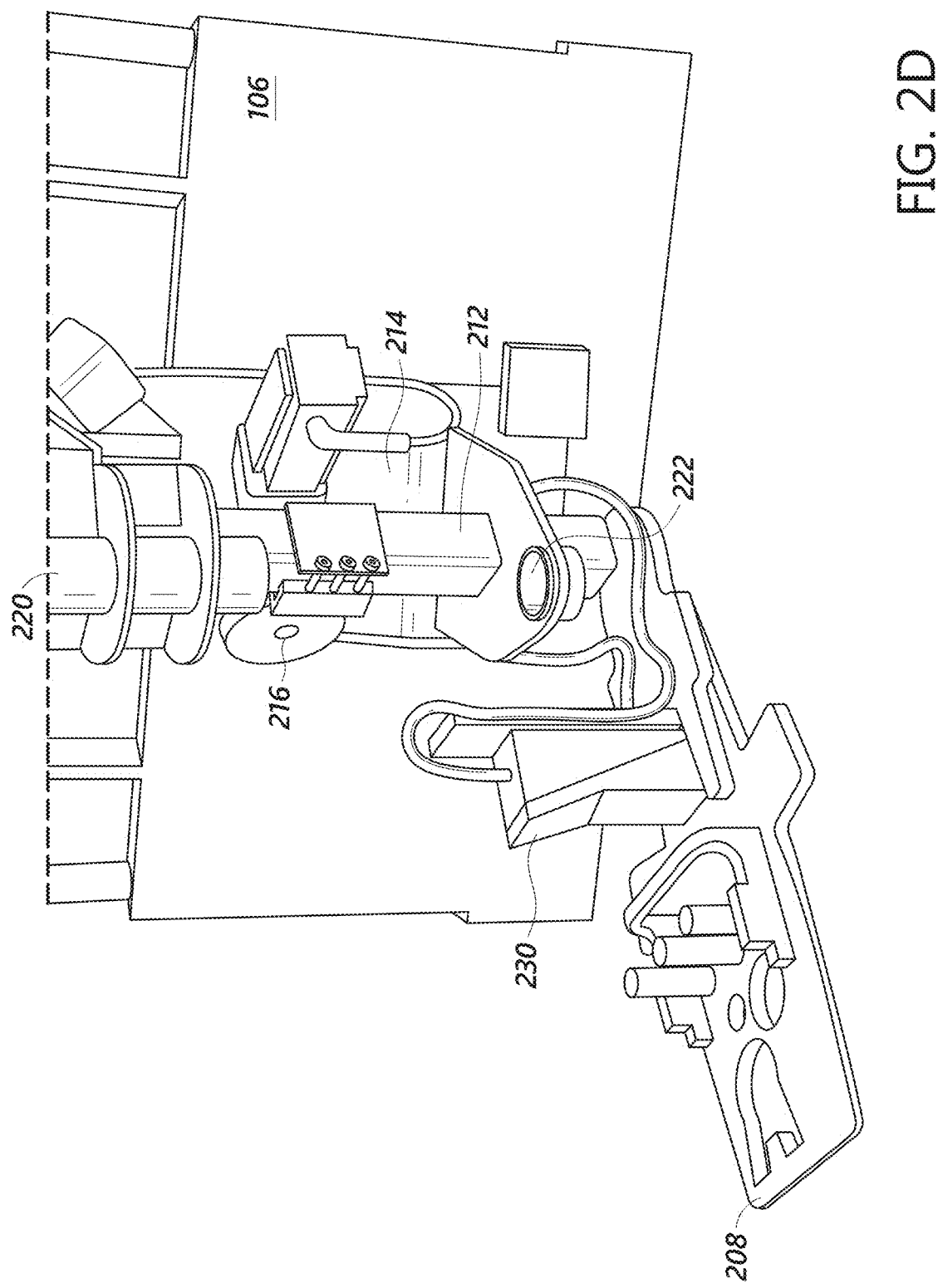
FIG. 2D illustrates an exemplary auto-hitch system coupled to an AGV with the hitch rotated.
Figure 2E:
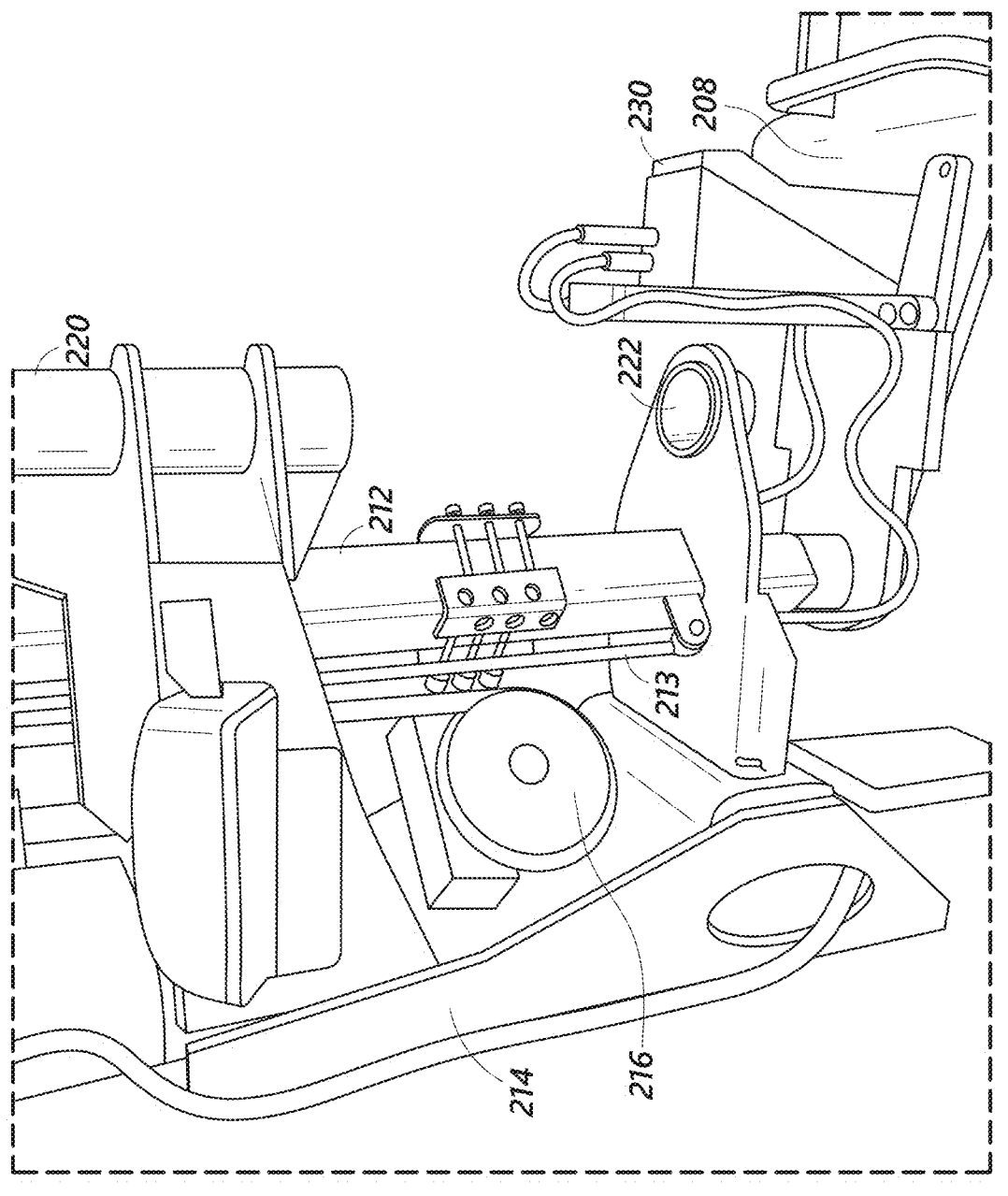
FIG. 2E illustrates a vertical actuator of an exemplary auto-hitch system.

FIG. 2B illustrates a front view of the auto-hitch system 200 coupled to the AGV 106. The hitch 208 is oriented in a first position. In FIG. 2D, the rotational actuator 218 has rotated the hitch 208 to a second position. The rotational actuator 218 can position the hitch 208 along a continuum of different rotational positions for hitching. In some embodiments, the rotational actuator 218 can position the hitch 208 at discrete rotational positions for hitching. The vertical actuator 216 can position the hitch 208 along a continuum of different vertical positions for hitching. In some embodiments, the vertical actuator 216 can position the hitch 208 at discrete vertical positions for hitching. Similarly, the frame 214 has a fixed aperture 222. The fixed aperture 212 is circular. The fixed aperture 222 is fixed relative to the frame 214 and AGV 106. In some embodiments, the fixed aperture 222 is a non-automated connection that can be used when automatic hitching is not needed or wanted. In some embodiments, the fixed aperture 222 can be polygonal and/or be another suitable shape.

Figure 2F:
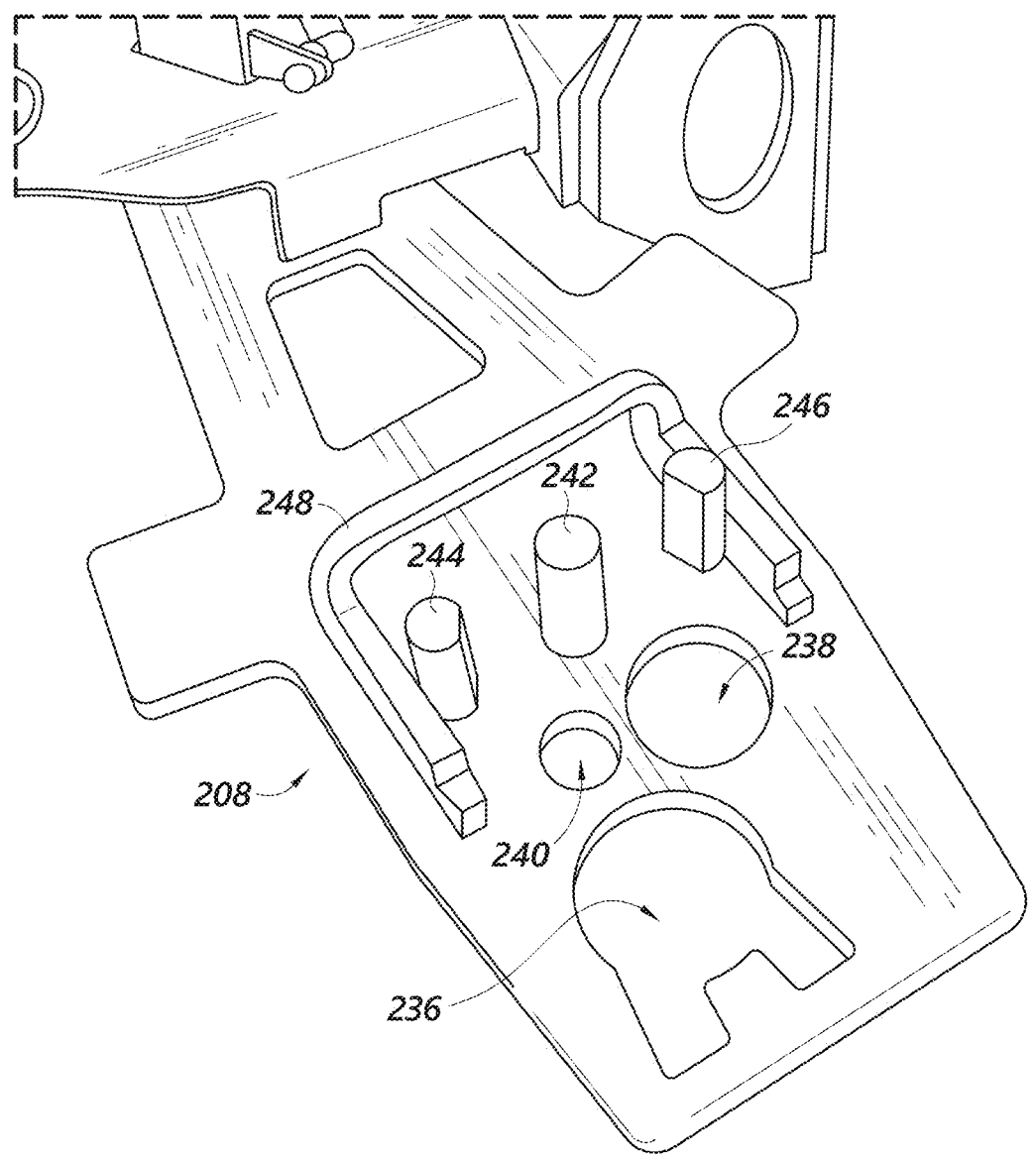
FIG. 2F illustrates a hitch coupled to an exemplary auto-hitch system.

FIG. 2F illustrates an enlarged view of the hitch 208. The hitch 208 includes a variety of apertures and/or hitching connections that enable the hitch 208 to be able to interface with a plurality of item containers and/or connection features. The hitch 208 includes a first aperture 236. The first aperture 236 has a circular main portion with two arm recesses. The hitch 208 includes a second aperture 238. The second aperture 238 is circular. The hitch 208 includes a third aperture 240. The third aperture 240 is circular. In the illustrated embodiment, the first aperture 236, second aperture 238, and third aperture 240 are different sizes, enabling the hitch 208 to interface with different sized connection features. In some embodiments, more or fewer than three apertures are included on the hitch 208. In some embodiments, the apertures can be different shapes and/or sizes.

The hitch 208 has a center connector 242, first peripheral connector 244, and second peripheral connector 246. The center connector 242, first peripheral connector 244, and second peripheral connector 246 can be positioned posterior to the first aperture 236, second aperture 238, and third aperture 240. The center connector 242 is positioned between the first peripheral connector 244 and second peripheral connector 246. The center connector 242 is cylindrical. The first peripheral connector 244 is generally cylindrical with a flat face portion. The flat face portion can be positioned on a portion of the first peripheral connector 244 that is proximate the center connector 242. The second peripheral connector 246 is generally cylindrical with a flat face portion. The flat face portion can be positioned on a portion of the second peripheral connector 246 that is proximate the center connector 242. The first peripheral connector 244 and second peripheral connector 246 are positioned equidistantly from the center connector 242. The center connector 242, first peripheral connector 244, and second peripheral connector 246 have the same length. In some embodiments, the center connector 242, first peripheral connector 244, and second peripheral connector 246 have differing lengths and/or shapes.

The hitch 208 has a crossbar 248. The crossbar 248 can be used as a handle to enable a user to conveniently physically manipulate the position of the hitch 208. The crossbar 248 can include a grasping portion that is positioned posterior, which can include entirely, generally, or partially, to the center connector 242, first peripheral connector 244, second peripheral connector 246, first aperture 236, second aperture 238, and/or third aperture 240.

The auto-hitch system 200 orients the hitch 208 such that the appropriate connector or aperture is positioned to interface with a connector feature. For example, in some situations, the auto-hitch system 200 detects a connection feature or container and determines that the first aperture 236 is the appropriate aperture to interface with the detected connection feature. Accordingly, the auto-hitch system 200 rotates the hitch 208 to position the first aperture 236 below or above the detected connection feature and lowers or raises the hitch 208 to interface the first aperture 236 with the detected connection feature.

Figure 3A:
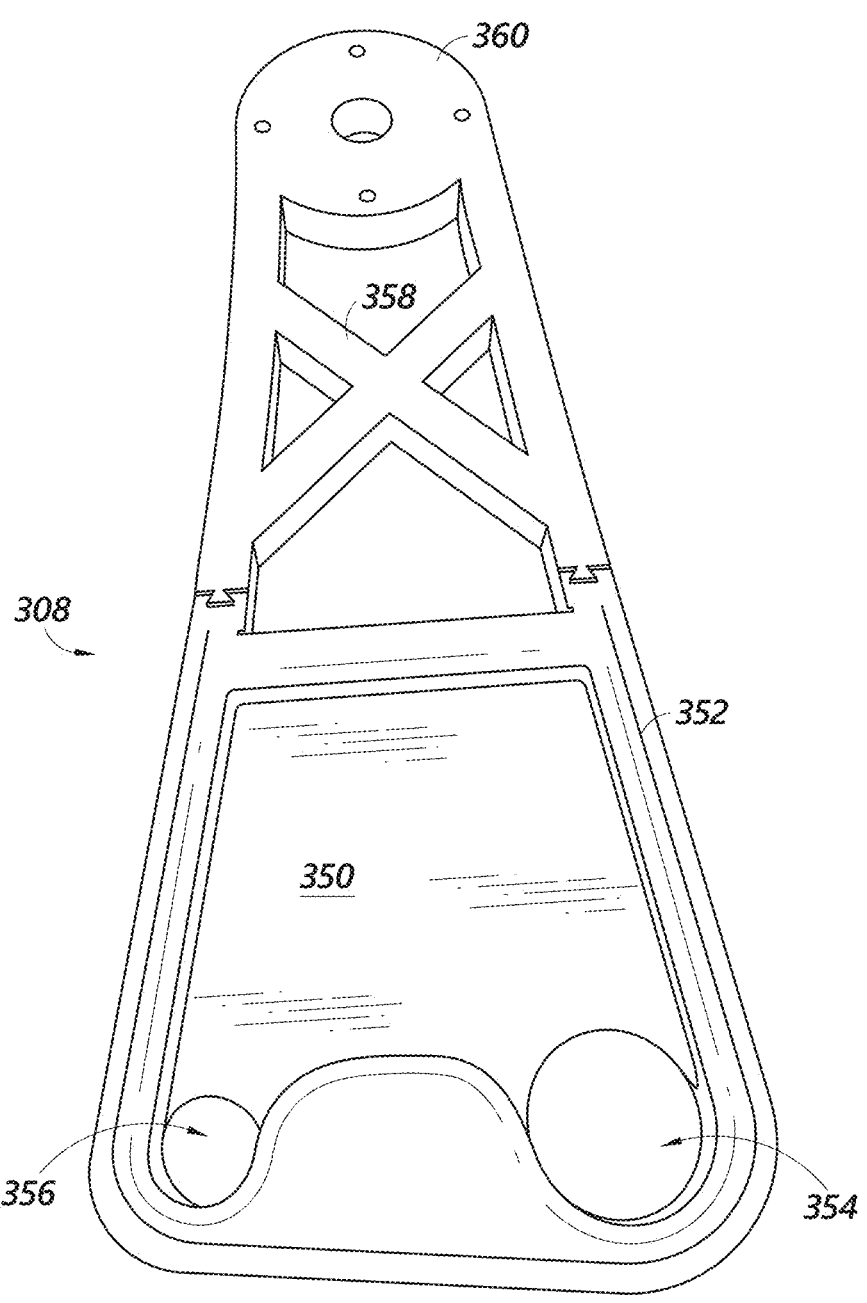
FIG. 3A illustrates an exemplary hitch component.

FIG. 3A illustrates an embodiment of a hitch 308. The hitch 308 can be mounted to the frame 214 and shaft 210 as described elsewhere herein.

The AGVs, hitches, and frames described herein can be used as described/depicted, or components of each can be combined with any other components described herein without departing from the scope of this disclosure. The hitch 308 is configured to provide the ability to connect or hitch the AGV 106 to a variety of rolling stock. The hitch 308 includes a hitch pocket 350. The hitch pocket 350 is surrounded by a wall 352. The hitch pocket 350 has a large aperture 354. The hitch pocket 350 can provide a larger target area for connecting to a connection feature. In some embodiments, the hitch pocket 350 has a 3-inch range in both X and Y directions for general purpose containers, such as wheeled shelves, etc. In some embodiments, hitch pocket 350 has a 5-inch range in both X and Y directions for wire containers and over the road containers. These types of containers can have smaller pins than the general purpose containers. The hitch pocket 350 has a small aperture 356. The large aperture 354 and small aperture 356 are configured to interface with different sized connection features. A portion of the large aperture 354 is surrounded by the wall 352. A portion of the small aperture 356 is surrounded by the wall 352. Positioning the wall 352 around a portion of the large aperture 354 and small aperture 356 can assist the auto-hitch system 200 in positioning the large aperture 354 and/or small aperture 356 under a connection feature. The auto-hitch system 200 can position the hitch under the connecting pins of the rolling stock and move the hitch 308 up until the pin contacts a portion of the pocket 350. The controller 234 can detect the resistance of the pin pushing on the pocket 350, and stop the upward motion of the hitch 308. The hitch can rotate as needed, with the pin/connection feature making contact with the wall 352, the wall 352 acting as a guide or a feedback mechanism to the controller 234 to urge the hitch 308 into the correct position. The hitch 308 can be maneuvered until the larger aperture 354 or small aperture 356 is under the connection feature. The wall 352, at portions proximate the large aperture 354 and small aperture 356, are curved, which can assist the auto-hitch system 200 in positioning the large aperture 354 or small aperture 356 under a connection feature. The curved surfaces of the wall 352 can cause the hitch 208 to be manipulated or guided to position the large aperture 354 or small aperture 356 under the connection feature. In some embodiments, the hitch 308 includes a single aperture or more than two apertures. In some embodiments, the hitch 308 includes extrusions that can mate with connection features.

In some embodiments, the sensor 230 can determine the type of rolling stock by taking a measurement of the connection feature or pin on the rolling stock, and compare that to known dimensions of rolling stock connection features. The controller 234 can then correctly position the hitch 308 such that either the small or large aperture 356, 354 is positioned under the connection feature, as appropriate. The controller 234 can then move the hitch 308 further upward so the connection feature or pin on the rolling stock extends through either the small aperture 356 or the large aperture 354.

The hitch 308 has a mating portion 360 that connects to a shaft or portion of a frame. The mating portion 360 has a hole for receiving a shaft or connecting to a shaft that is coupled to a rotational actuator. The mating portion 360 connects the hitch 308 to the shaft 210 and ultimately to the AGV 106. The mating portion 360 has a diameter or width that is smaller than the width of the hitch pocket 350. The hitch 308 has an overall width that is smallest at the mating portion 360 and grows gradually larger as the hitch 308 extends away from the mating portion 360. The hitch 308 has a support structure 358 that extends between the mating portion 360. The support structure 358 includes crossing supports with gaps that can advantageously enable the hitch 308 to use less material while maintaining strength and rigidity. In some embodiments, the hitch pocket 350 portion of the hitch 308 and the support structure 358 are releasably coupled together or coupled by a hinge connection that enables the hitch pocket 350 portion to fold to different orientations.

Figure 3B:
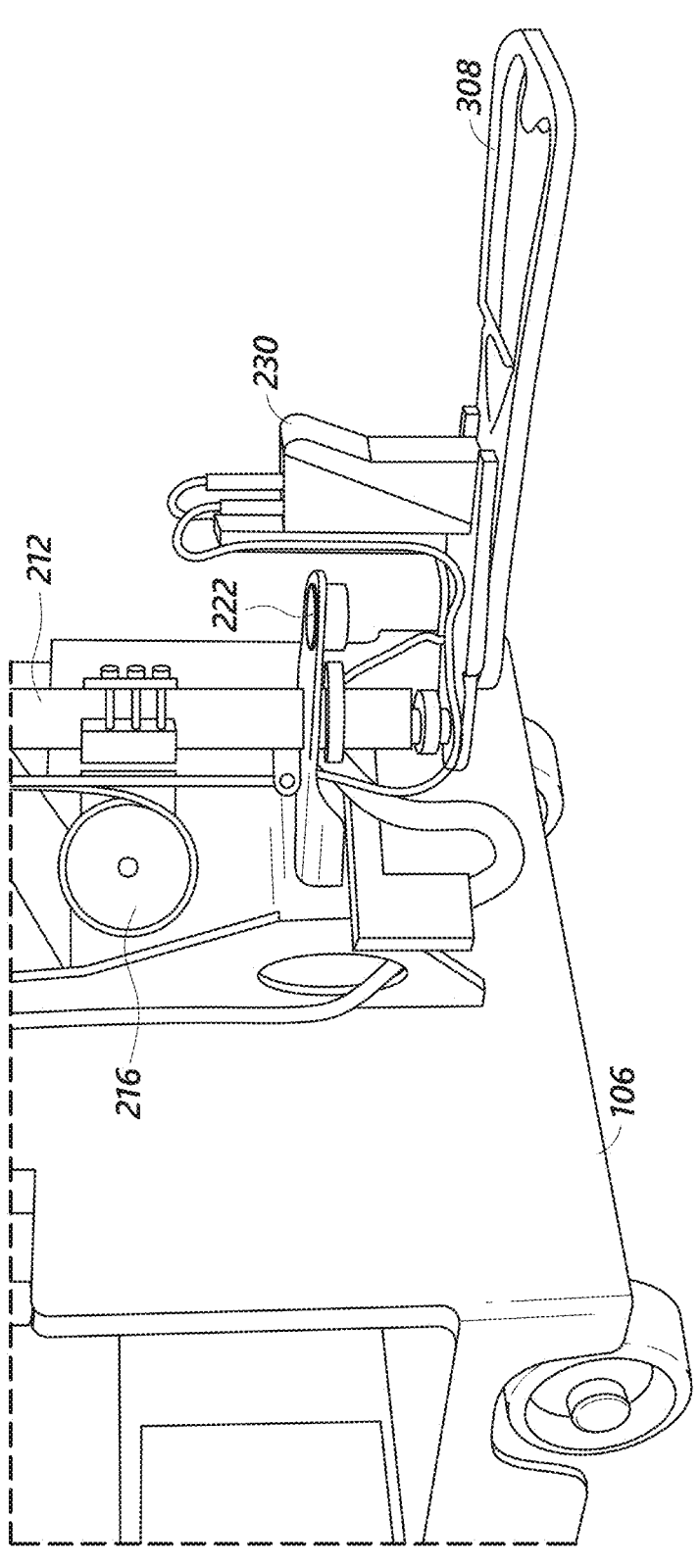
FIG. 3B illustrates the hitch coupled to an exemplary auto-hitch system.

FIG. 3B illustrates the hitch 308 incorporated into an auto-hitch system on the AGV 106. The sensor 230 is coupled to the hitch 308. The sensor 230 is positioned on and/or above the support structure 358. In some embodiments, the hitch 308 is fixed during towing such that the connection feature can be used as a pivot in the large aperture 354 or small aperture 356 when the AGV maneuvers.

Figure 4:
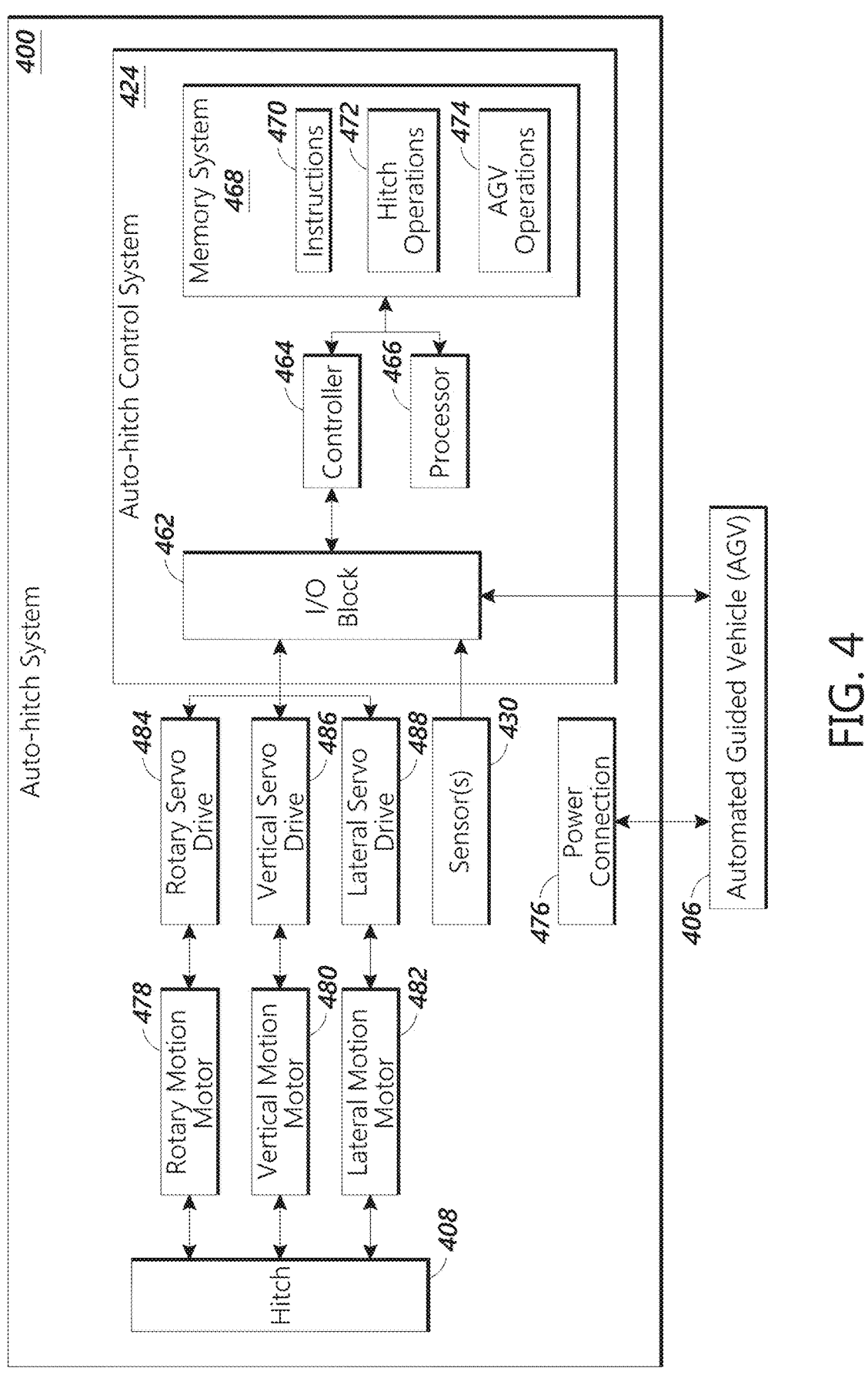
FIG. 4 illustrates a block diagram of an exemplary auto-hitch system.

FIG. 4 schematically illustrates an embodiment of an auto-hitch system 400. The auto-hitch system 400 includes an auto-hitch control system 424. The architecture of the auto-hitch control system 424 can include an arrangement of computer hardware and software components used to implement aspects of the present disclosure. The auto-hitch system 400 may include more or fewer elements than those shown in FIG. 4. It is not necessary, however, that all of these elements be shown in order to provide an enabling disclosure.

The auto-hitch control system 424 comprises a processor, which can be similar to control systems and processors described elsewhere herein. As illustrated, the auto-hitch control system 424 includes an I/O block 462, controller 464, processor 466, and memory system 468, all of which can communicate with one another by way of a data communication technique.

The processor 466 can read and/or write to memory system 468 and can execute instructions 470, hitch operations 472, and/or AGV operations 474 on memory system 468 to perform methods disclosed herein. As used herein, hitch operations 472 encompass procedures, program code, or other logic that initiates, modifies, directs, and/or eliminates one or more hitch 408 movements. As used herein, AGV operations 474 encompass procedures, program code, or other logic that initiates, modifies, directs, and/or eliminates one or more AGV 406 movements. In some embodiments, instructions 470 encompass procedures, program code, or other logic that initiates, modifies, directs, and/or eliminates one or more hitch operations 472 and/or AGV operations 474 or other operations necessary or advantageous for the methods described herein. In some embodiments, one or more portions of the memory system 468 can be remotely located from the AGV 406, such as on a server or other component of a distribution facility network, and can be in wired or wireless communication with the controller 464 and processor 466.

The I/O block 462 receives, communicates, and/or sends commands, information, and/or communication between the auto-hitch control system 424 and other components of auto-hitch system 400 or other external devices and/or systems, such as the AGV 406. The I/O block 462 can connect to the sensor(s) 430, rotary servo drive 484, vertical servo drive 486, lateral servo drive 488, and/or AGV 406.

The controller 464 can, which can include cooperation with the I/O block 462, interface between peripheral devices, such as the AGV 406. The controller 464 can provide a link between different parts of the auto-hitch control system 424, such as between the I/O block 462 and the memory system 468. The controller 464 can generate commands to effectuate the instructions 470, hitch operations 472, and/or AGV operations 474.

The memory system 468 can generally include RAM, ROM and/or other persistent auxiliary or non-transitory computer-readable media. The memory system 468 can store an operating system that provides computer program instructions for use by the processor 466 in the general administration and operation of the auto-hitch system 400. The instructions 470 when executed by the processor 466, can cause the auto-hitch system 400 to receive sensor input from the sensor(s) 430 indicative of the location of a container, connection feature, objects, animate objects, people, hitch 408, AGV 406, and/or other things in the vicinity of the auto-hitch system 400. The instructions 470, when executed by the processor 466, can cause the system to interpret sensor input to determine a hitch operation(s) 472 and/or AGV operation(s) 474 that is a desirable, appropriate, and/or correct response to and/or associated with the received sensor input. The auto-hitch system 400 can effectuate the designated hitch operation(s) 472 and/or AGV operation(s) 474, which can include the processor generating commands via the controller 464 to effectuate the operation(s). The hitch operations 472 and AGV operations 474 can at least include the methods described herein.

The auto-hitch system 400 has sensor(s) 430. Sensor(s) 430 can include the characteristics, features, and/or variations of other sensors described herein. Sensor(s) 430 can detect and/or locate containers, connection features, objects, animate objects, people, hitch 408, AGV 406, and/or other things in the vicinity of the auto-hitch system 400. Sensor(s) 430 can include one or more sensors. Sensor(s) 430 can include one or more of the following: an optic sensor, photo sensor, light sensor, video camera sensor, camera sensor, radar sensor, infrared sensor (including infrared laser mapping), thermal sensor, laser sensor, LiDAR sensor, proximity sensor, capacitive sensor, ultrasonic sensor, 3D sensor, and/or any combination of sensing systems used to determine distance, presence, movement, etc. The sensor(s) 430 can relay sensor input data to the auto-hitch control system 424. Sensor(s) 430 can be positioned at different locations on the auto-hitch system 400 and/or AGV 406.

The auto-hitch system 400 includes a power connection 476 that interfaces with the AGV 406. The AGV 406 supplies power to the auto-hitch system 400, which can include 12 VDC to 36 VDC or other suitable ranges. In some embodiments, the auto-hitch system 400 includes a battery to independently power the auto-hitch system 400.

The auto-hitch system 400 has a rotary servo drive 484. The auto-hitch system 400 has a rotary motion motor 478. The rotary servo drive 484 can cooperate with the rotary motion motor 478 to rotate the hitch 408. The rotary servo drive 484 can provide position feedback regarding the rotation of the hitch 408 to indicate whether a rotation has been successful. The rotary servo drive 484 can provide force feedback to indicate if the rotation of the hitch 408 is being hindered. Safety limits can be set to restrict the amount of force that the rotary motion motor 478 will output. In some embodiments, the rotary motion motor 478 is employed without the rotary servo drive 484.

The auto-hitch system 400 has a vertical servo drive 486. The auto-hitch system 400 has a vertical motion motor 480. The vertical servo drive 486 can cooperate with the vertical motion motor 480 to raise and lower the hitch 408 and/or a shaft coupled to the hitch 408. The vertical servo drive 486 can provide position feedback regarding the vertical position. The vertical servo drive 486 can provide position feedback regarding the vertical positioning of the hitch 408 to indicate whether a vertical maneuver has been successful. The vertical servo drive 486 can provide force feedback to indicate if the vertical maneuvering of the hitch 408 is being hindered. Safety limits can be set to restrict the amount of force that the vertical motion motor 480 will output. In some embodiments, the vertical motion motor 480 is employed without the vertical servo drive 486.

The auto-hitch system 400 can optionally include a lateral servo drive 488. The auto-hitch system 400 optionally has a lateral motion motor 482. The lateral servo drive 488 can cooperate with the lateral motion motor 482 to extend and retract the hitch 408. The lateral servo drive 488 can provide position feedback regarding the extended (lateral) position. The lateral servo drive 488 can provide position feedback regarding the extension of the hitch 408 to indicate whether an extension or retraction maneuver has been successful. The lateral servo drive 488 can provide force feedback to indicate if the extension or retraction of the hitch 408 is being hindered. Safety limits can be set to restrict the amount of force that the lateral motion motor 482 will output. In some embodiments, the lateral motion motor 482 is employed without the lateral servo drive 488. The AGV 406, under the control of the auto-hitch system 400, is used for maneuvering the hitch 408 in forward and backward directions when the auto-hitch system does not include a lateral servo drive 488 and/or lateral motion motor 482.

The rotary motion motor 478, vertical motion motor 480, and/or lateral motion motor 482 can incorporate or cooperate with belts, pulleys, gears, shafts, splines, and/or other power transfer mechanisms to maneuver the hitch 408. The rotary motion motor 478, vertical motion motor 480, and/or lateral motion motor 482 can be electric motors. The rotary motion motor 478, the vertical motion motor 486 and the lateral motion motor 488 can provide force feedback to the controller 464 via the associated servos and the I/O block 462 regarding travel limits, increased resistance, etc., and the controller 464 can change its instructions based on the force feedback.

All the features, characteristics, and/or components disclosed herein can be made from a variety of materials, which can include metals, metal alloys, polymers, ceramics, and/or other suitable materials or combinations of materials.

FIG. 5 is a flow diagram depicting an exemplary method of using an auto-hitch system maneuvering an AGV to a hitching positon. The flow diagram is provided for the purpose of facilitating description of aspects of some embodiments. The diagram does not attempt to illustrate all aspects of the disclosure and should not be considered limiting.

The process 500 begins at block 502, wherein the auto-hitch system 400 receives a hitching command from the AGV. The auto-hitch system can receive the hitching command from the AGV through a wired data connection or a wireless data connection. The auto-hitch system controls the AGV after receiving the hitching command.

At block 504, the auto-hitch system 400 identifies and/or determines the location of a container and/or connection feature of the container. The auto-hitch system senses the container and/or connection feature of the container using the sensor 130 or similar component described herein. The sensor input is communicated to the auto-hitch control system 424. The auto-hitch control system 424 can identify the type of container based on the connection feature, such as the size of the pin or other feature. The auto-hitch control system can identify the type of connection feature by directly sensing or by association with the type of container identified. The auto-hitch system can locate the container and/or connection feature.

At block 506, the auto-hitch system 400 determines the configuration of the auto-hitch system surroundings. The auto-hitch system 400 senses the surrounding using at least one of the sensor(s) described herein. The sensor input is communicated to the auto-hitch control system 424. In some embodiments, the auto-hitch control system 424 creates a digital model (including 3D model) of the surroundings for route planning. In some embodiments, the AGV determines the presence or absence of obstacles near or around the container, and can use this information to position itself to facilitate connecting the hitch to the container. For example, the AGV may approach the container from the side, and the AGV may need to maneuver to align the auto-hitch with the connection feature of the container. The configuration of the surroundings can inform the AGV control system on how to maneuver to the container in light of the surroundings.

At block 508, the auto-hitch system 400 localizes the detected container, connection feature, and/or configuration of the surroundings relative to the AGV and/or auto-hitch system and/or sensor (such as a 3D sensor) in 3D space. In some embodiments, the auto-hitch system uses its awareness of the AGV's position relative to the 3D sensor, coupled with its awareness of the connection feature's position relative to the 3D sensor, to localize the connection feature to the AGV in 3D space. In some embodiments, the AGV sizing parameters are saved into the memory system of the auto-hitch system to accurately localize the AGV in its surroundings. In some embodiments, the auto-hitch system senses the size and the configuration of the AGV to accurately localize the AGV in its surroundings.

At block 510, the auto-hitch system determines an AGV path from the AGV's current position to a hitching position for interfacing the auto-hitch system's hitch with the connection feature of the container. In some embodiments, the AGV, or a remote system in communication with the AGV, knows the configuration of the surroundings, the pose of the AGV relative to the connection feature, the container type, etc., received from the various sensors, and plans the path for the AGV to travel for the purpose of arriving at the hitching position, or at a position where the auto-hitch can connect to the connection feature. In some embodiments, the auto-hitch system processes the AGV's size and configurations, the surroundings, container location, connection feature location, and/or animate objects to determine a safe and efficient path to the container. In some embodiments, the auto-hitch system operates within certain safety parameters when determining a path. For example, the auto-hitch system may have proximity restrictions, speed restrictions given proximity, speed restrictions in general, object specific proximity restrictions (i.e. animate object v. inanimate object, etc.), and/or other similar safety limitations.

The process 500 moves to block 512, wherein the auto-hitch system commands the AGV to traverse the determined path. The AGV traverse the determined path. Sensors on the AGV and on the auto-hitch can be used as inputs to the AGV control system in order to move the AGV to the hitching position.

The process 500 moves to block 514, wherein the auto-hitch system monitors, with the sensor(s), the location of the container, the location of connection feature, and/or configuration of surroundings relative to the AGV. This enables the AGV to monitor if conditions change while traversing the determined path. This can advantageously reduce the risk of equipment damage and/or personnel injury. The auto-hitch system can monitor the location of the container, location of connection feature, and/or configuration of surroundings relative to the AGV with any of the sensors disclosed herein. In some embodiments, the auto-hitch system continuously monitors the path to determine if path alterations should be made. The sensor input is communicated to the auto-hitch control system.

The process 500 moves to decision state 516, wherein the auto-hitch system determines whether the selected path needs to be altered in light of the monitoring described in reference to block 514. If the determined path does need to be altered, the auto-hitch system moves to block 510 to determine a new path. In some embodiments, the auto-hitch system stops the AGV if the determined path needs to be altered. In some embodiments, the auto-hitch system determines a new path without stopping the AGV. If the determined path does not need to be altered, the auto-hitch system moves to block 518.

The process 500 moves to block 518, wherein the auto-hitch system commands the AGV to continue traversing the determined path or does not instruct the AGV to stop or deviate from the determined path.

The process 500 moves to decision state 520, wherein the system determines whether the AGV has arrived at the hitching position. The auto-hitch system can sense the location of the item container, connection feature, surroundings, and/or AGV position to determine if AGV has arrived at the hitching position. In some embodiments, the AGV is in a hitching position when the AGV is within a certain distance of the container and/or connection feature. In some embodiments, the AGV is in a hitching position when the AGV has traversed the entire determined path. If the AGV has not arrived at a hitching position, the AGV moves to block 518. If the AGV has arrived at a hitching position, the process 500 moves to block 522, wherein the AGV stops at the hitching position.

In the method described above, the auto-hitch system and the AGV sensors instructed the AGV how to maneuver into a hitching position. In some embodiments, the AGV systems alone maneuver the AGV into a hitching position. In some embodiments, the auto-hitch system and sensors maneuver the AGV into a hitching position. The process 500 then ends.

Figure 6:
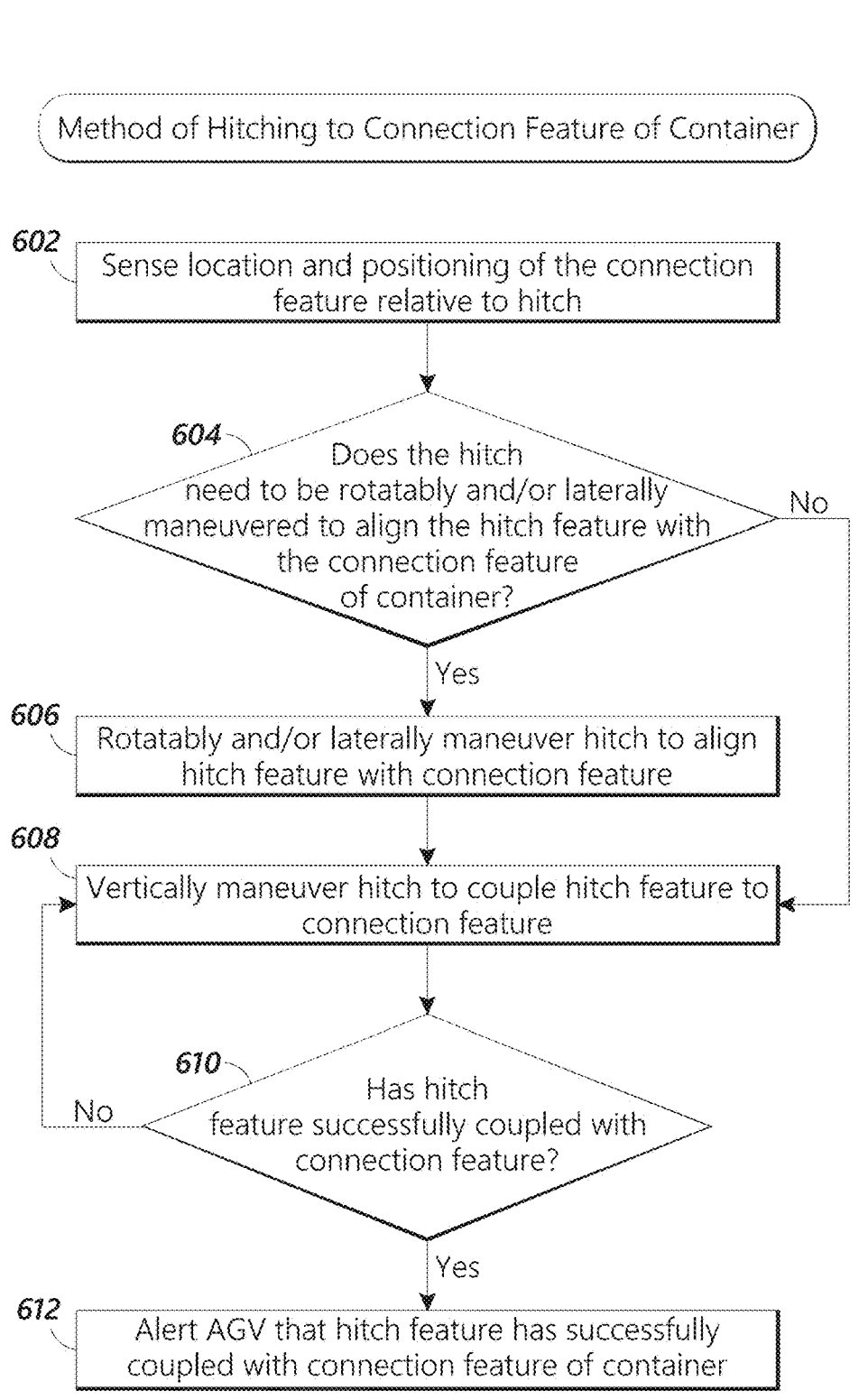
FIG. 6 illustrates an exemplary method of the auto-hitch system hitching to the connection feature of a container.

FIG. 6 is a flow diagram depicting an exemplary process 600 of an auto-hitch system coupling a hitch to a connection feature of a container. The flow diagram is provided for the purpose of facilitating description of aspects of some embodiments. The diagram does not attempt to illustrate all aspects of the disclosure and should not be considered limiting.

The process 600 begins in block 602, wherein the auto-hitch system senses the location and position of the connection feature relative to the hitch of the auto-hitch system. The auto-hitch system can sense the location and position of the connection feature using at least any of the sensors disclosed herein. The sensor input is communicated to the auto-hitch control system.

The process 600 moves to decision state 604, wherein the system determines whether the auto-hitch needs to be rotatably and/or laterally maneuvered to align a specific component or feature of the auto-hitch with the connection feature of the container. This can be determined by sensors 130, or similar sensors described elsewhere herein. If the hitch does not need to be rotatably and/or laterally maneuvered to align a specific hitch feature with the connection feature, the process 600 moves to block 608. If the hitch needs to be rotatably and/or laterally maneuvered to align a specific hitch feature with the connection feature, the process 600 moves to block 606.

At block 606, the auto-hitch system rotatably and/or laterally maneuvers the hitch to align a specific auto-hitch feature or component with the connection feature of the hitches described herein. During the aligning, the auto-hitch may be spaced a small distance apart from the container and/or the connection feature, to enable the auto-hitch freedom to move as required. At this point, the auto-hitch is generally located lower, or nearer the floor, than the lowest point of the connection feature of the container. Aligning the auto-hitch need not be a perfect alignment, but can align the auto-hitch such that the connection feature is aligned with any portion of, for example, the pocket 350, the small or large aperture 354, 356, the first aperture 236, the second aperture 238, or any other feature of the auto-hitch described elsewhere herein. The auto-hitch system can rotate the hitch to an aligned position using the methods and devices disclosed herein, which can include using a motor, belt, servo, gears, pulleys, and/or other methods and devices. The auto-hitch system can extend or retract (laterally maneuver) the hitch using the methods and devices disclosed herein, which can include using a motor, belt, servo, gears, pulleys, and/or other methods and devices. In some embodiments, the auto-hitch system can cause the AGV to move forward or backward to effectively extend or retract the hitch for positioning. In some embodiments, the auto-hitch system verifies that the hitch has rotated and or laterally moved to the correct location using servo feedback and/or sensing.

At block 608, the auto-hitch vertically maneuvers the hitch to couple the specific hitch feature with the connection feature. This includes moving the auto-hitch up and down. The auto-hitch system can move the hitch up and down such that the specific hitch feature couples with the connection feature using the methods disclosed herein, which can include using a motor, belt, servo, gears, pulleys, and/or other methods and devices. In some embodiments, after the auto-hitch is aligned, the AGV moves forward a small amount such that the auto-hitch is located below, or nearer the floor, the lowest point of the connection feature. Then, the auto-hitch maneuvers vertically upward until the auto-hitch contacts the connection feature. At this point, the auto-hitch system can receive feedback from the auto-hitch based on forces applied, in order to further rotate the auto-hitch and/or move the auto-hitch vertically, in order to ensure the auto-hitch and the connection feature are properly connected. This process can involve instructing the AGV to move small amounts forward, backward, laterally, etc., as required.

The process moves to decision state 610, wherein the auto-hitch system determines if the auto-hitch hitch feature has successfully coupled with the connection feature. The auto-hitch system can determine if a coupling has been successful from position feedback, such from a vertical servo drive. In some embodiments, the auto-hitch system can, using sensor input, determine if the hitch feature has successfully coupled with the connection feature. If the hitch feature has not successfully coupled to the connection feature, the auto-hitch system moves to block 608. In some embodiments, if the hitch feature has not successfully coupled to the connection feature, the auto-hitch system moves to block 602. In some embodiments, the auto-hitch system is continuously monitoring the movement of the hitch relative to the connection feature and, sensing an erroneous rotational and/or lateral alignment, moves to block 602. In some embodiments, the auto-hitch system moves to block 602 after the expiration of a time interval in which the hitch has not successfully coupled to the connection feature.

If the hitch feature has successfully coupled to the connection feature, the process 600 moves to block 612, wherein the auto-hitch system alerts the AGV that the hitch has successfully coupled with the connection feature of the container. In some embodiments, the auto-hitch system transitions control to the AGV upon a successful coupling. The process 600 then ends.

Figure 7:
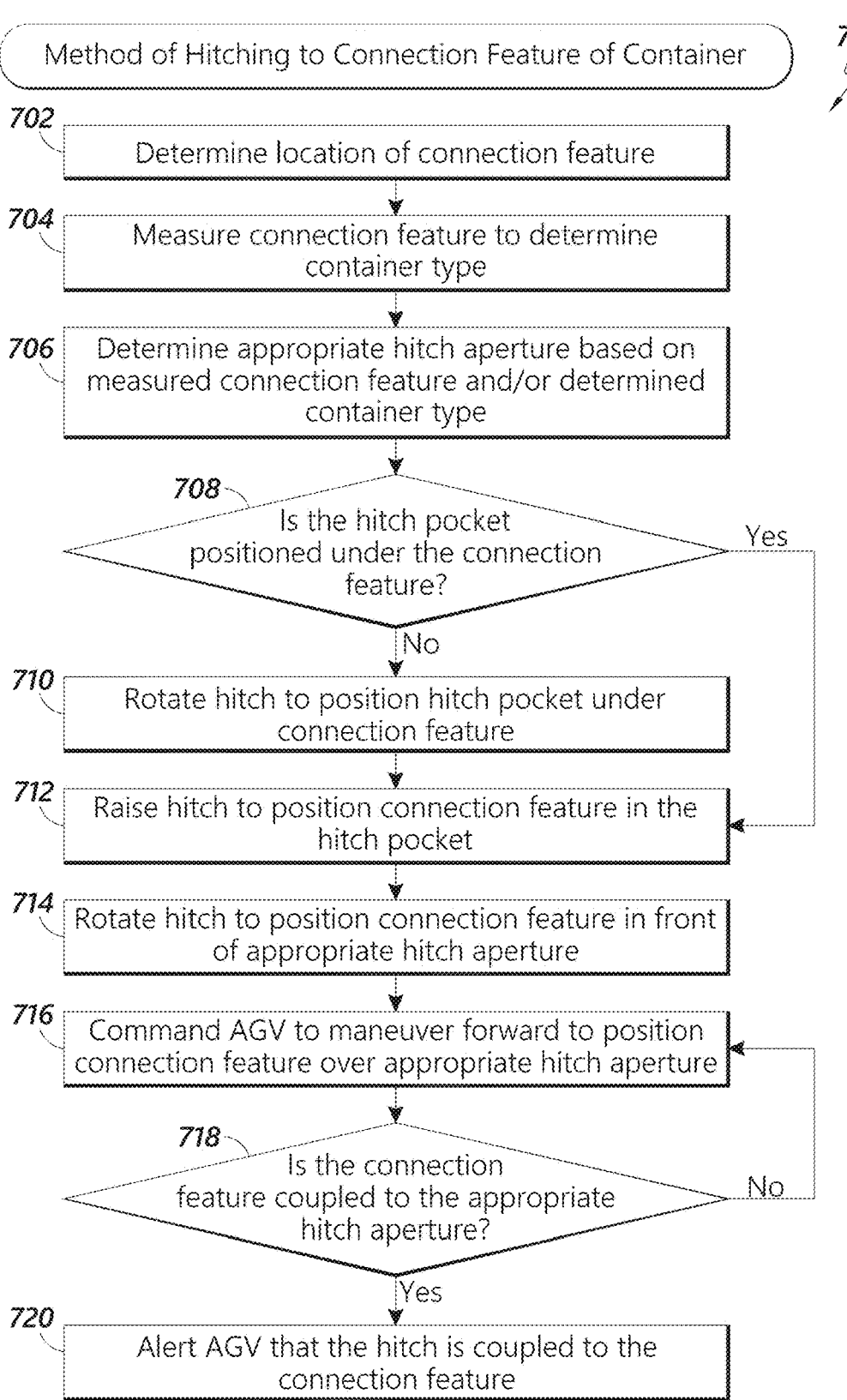
FIG. 7 illustrates an exemplary method of the auto-hitch system hitching to the connection feature of a container.

FIG. 7 is a flow diagram depicting an exemplary process 700 of an auto-hitch system coupling a hitch to a connection feature of a container. The flow diagram is provided for the purpose of facilitating description of aspects of some embodiments. The diagram does not attempt to illustrate all aspects of the disclosure and should not be considered limiting.

The process 700 begins at block 702, wherein the auto-hitch system determines the location of the connection feature. The auto-hitch system can determine the location of the connection feature of a container using any of the sensors disclosed herein. The sensor input is conveyed to the auto-hitch control system.

The process 700 moves to block 704, wherein the auto-hitch system measures the connection feature to determine the container type. The auto-hitch can measure the connection feature using any of the sensor disclosed herein. The sensor input is conveyed to the auto-hitch control system. The auto-hitch system determines the container type based on the measurements of the connection feature. A variety of connection feature sizes/configurations can be stored in the memory system that are paired with corresponding containers.

The process 700 moves to block 706, wherein the auto-hitch system determines the appropriate hitch aperture, or feature, based on the measurements of the connection feature and/or the determined container type.

The process 700 moves to decision state 708, wherein, it is determined whether the hitch pocket is positioned under the connection feature. In some embodiments, the hitch pocket can be the hitch pocket 350 described in reference to FIG. 3A. The auto-hitch system can determine if the hitch pocket is positioned under the connection feature using any of the sensors described herein. If the hitch pocket is positioned under the connection feature, the process 700 moves to block 712. If the hitch pocket is not positioned under the connection feature, the process 700 moves to block 710.

At block 710, the auto-hitch system rotates the hitch to position the hitch pocket under the connection feature. In some embodiments, the auto-hitch system can extend or retract the hitch to position the hitch pocket under the connection feature. In some embodiments, the auto-hitch system can maneuver the AGV to position the hitch pocket under the connection feature, using at least forward and backward movements. In some embodiments, the auto-hitch system verifies successful alignment using any of the sensors described herein and/or position feedback, which can include servo feedback.

At block 712, the auto-hitch system raises the hitch to position the connection feature in the hitch pocket. The auto-hitch system can verify successful positioning using any of the sensors described herein and/or servo feedback.

The process 700 moves to block 714, wherein the auto-hitch system rotates the hitch to position the connection feature, while still in the hitch pocket, in front of the appropriate hitch aperture. In some embodiments, the hitch is rotated such that the connection feature contacts the wall 352 that surrounds the hitch pocket 350, as described in reference to FIG. 3A. The wall 352 can assist in aligning the connection feature with the appropriate hitch aperture.

The process 700 moves to block 716, wherein the auto-hitch system commands the AGV to maneuver forward to position the connection feature over the appropriate hitch aperture. The connection feature can drop into the appropriate hitch aperture.

The process 700 moves to decision state 718, wherein the auto-hitch system asks if the connection feature is coupled to the appropriate hitch aperture. The auto-hitch system can determine if the connection feature is coupled to the appropriate hitch aperture using any of the sensors disclosed herein. If the connection feature is not coupled to the appropriate hitch aperture, the process 700 moves to block 716. If the connection feature is coupled to the appropriate hitch aperture, the process 700 moves to block 720.

At block 720, the auto-hitch system alerts the AGV that the hitch is coupled to the connection feature. In some embodiments, the auto-hitch system transfers control of the AGV to the AGV. The process 700 then ends.

FIG. 8 is a flow diagram depicting an exemplary process 800 of an auto-hitch system monitoring a container and/or connection feature during towing. The flow diagram is provided for the purpose of facilitating description of aspects of some embodiments. The diagram does not attempt to illustrate all aspects of the disclosure and should not be considered limiting.

The process 800 begins at block 802, wherein the auto-hitch system alerts the AGV that the hitch has coupled to the connection feature of the container. In some embodiments, the auto-hitch transfers control of the AGV to the AGV.

The process 800 moves to block 804, wherein the auto-hitch system determines that the AGV is in motion. The auto hitch system can determine that the AGV is in motion using any of the sensors described herein. In some embodiments, the AGV communicates to the auto-hitch system that the AGV is in motion.

The process 800 moves to block 806, wherein the auto-hitch system monitors the location of the container and/or connection feature relative to the AGV and/or hitch. The auto-hitch system monitors the location of the container and/or connection feature relative to the AGV and/or hitch using any of the sensors described herein and communicates the sensor input to the auto-hitch control system.

The process 800 moves to decision state 804, wherein it is determined whether the container and/or connection feature has/have decoupled from the hitch. The auto-hitch system can make this determination based on the monitoring sensor input described in reference to block 806. If the container and/or connection feature has/have not decoupled from the hitch, the auto-hitch system moves to block 806. If the container and/or connection feature has/have decoupled from the hitch, the auto-hitch system moves to block 810.

The process 800 moves to block 804, wherein the auto-hitch system alerts the AGV that the hitch is not coupled to the connection feature and/or container. In some embodiments, the AGV will stop and command the auto-hitch system to begin a hitching procedure to recouple. The process 800 then ends.

FIG. 9 is a flow diagram depicting an exemplary process 900 of an auto-hitch system unhitching the hitch from the connection feature. The flow diagram is provided for the purpose of facilitating description of aspects of some embodiments. The diagram does not attempt to illustrate all aspects of the disclosure and should not be considered limiting.

The process 900 begins in block 902, wherein the auto-hitch system receives an unhitching command from the AGV. The auto-hitch system takes control of the AGV.

The process 900 moves to block 904, wherein the auto-hitch system vertically maneuvers the hitch to decouple the hitch from the connection feature. The vertically maneuvering can be performed with any of the devices and methods disclosed herein.

The process 900 moves to decision state 906, wherein it is determined whether the hitch has decoupled from the connection feature. The auto-hitch system can determine if the hitch has decoupled from the connection feature by using any of the sensors disclosed herein and/or position feedback. If the hitch has not decoupled from the connection feature, the auto-hitch system moves to block 904. If the hitch has decoupled from the connection feature, the auto-hitch moves to block 908.

At block 908, the auto-hitch system alerts the AGV that the hitch has decoupled from the connection feature. In some embodiments, the auto-hitch system transitions control to the AGV. The process 900 then ends.

FIGS. 10A-10K illustrate an embodiment of an auto-hitch system 1000 and components thereof. The auto-hitch system 1000 can include all the features, characteristics, methods, and variations described in reference to other auto-hitch systems described herein.

Figure 10A:
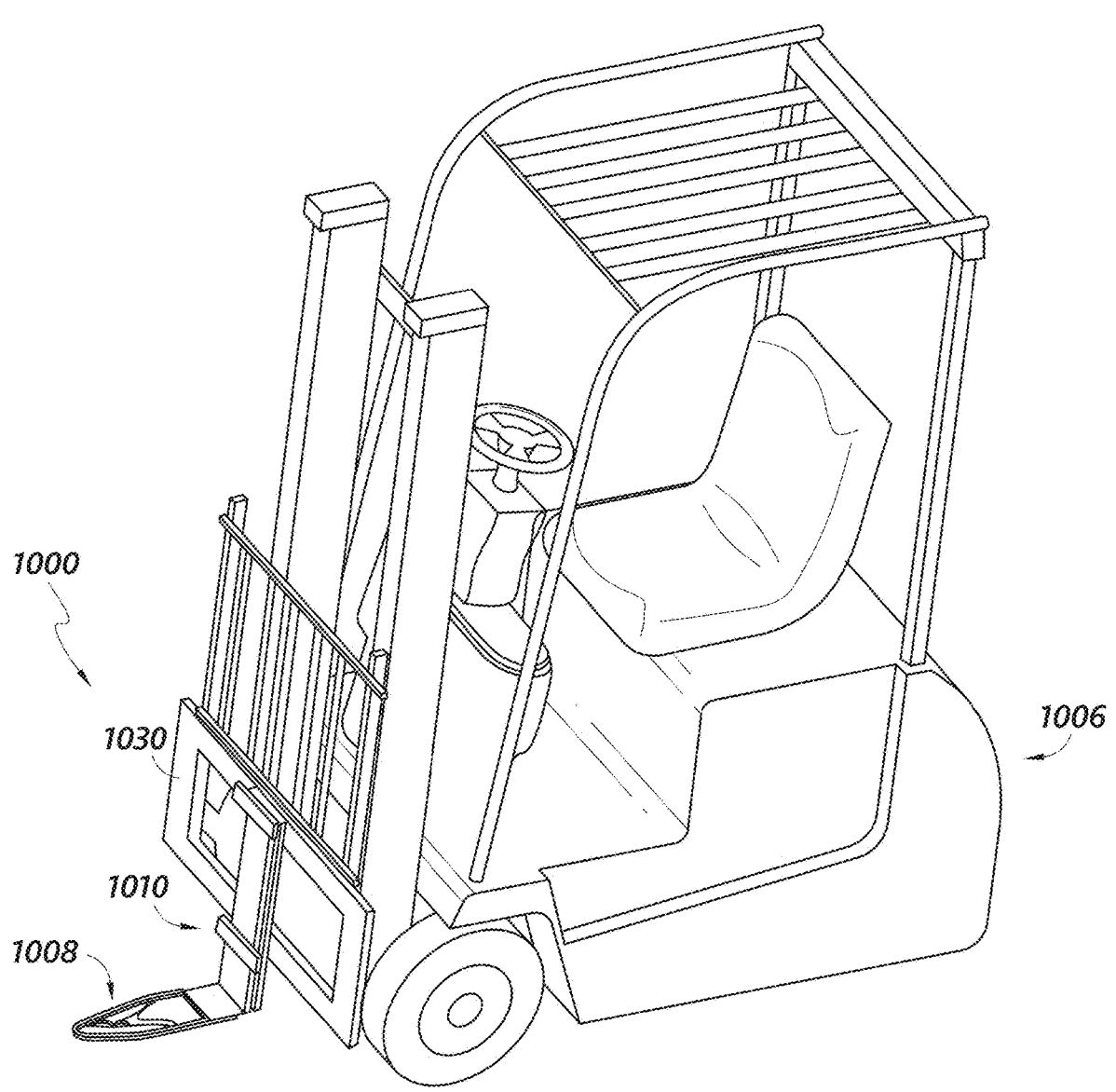
FIG. 10A illustrates an exemplary auto-hitch system connected to a forklift-type AGV.

FIG. 10A shows the auto-hitch system 1000 coupled to a forklift AGV 1006 (e.g., vehicle, forklift, AGV) with the forks removed. Although the forklift AGV depicted in FIG. 10A has a seat and a steering wheel for manual operation, it will be understood that the forklift AGV described herein can be manually operated or can be an autonomous vehicle. The auto-hitch system 1000 includes a hitch 1008 that is coupled to a frame 1030 via a mounting assembly 1010. The frame 1030 is part of the forklift AGV 1006 such that vertical actuation of the frame 1030 results in vertical movement of the hitch 1008. The frame 1030, in some embodiments, can be a standard feature of forklifts, such that the auto-hitch system 1000 can be retrofitted to forklift AGVs 1006 with minimal modification. In some embodiments, the forklift AGV 1006 does not have a frame 1030 and the hitch 1008 is coupled to another portion of the forklift AGV 1006 that facilitates vertical movement. In some embodiments, the auto-hitch system 1000 is designed to at least fit (e.g. operate with) ISO 2328 Class 2 forklifts. In some embodiments, the auto-hitch system 1000 can operate with other classes of forklifts and other vehicles.

In some embodiments, the auto-hitch system 1000 has a single axis of movement, the vertical axis. In some embodiments, the auto-hitch system 1000 has multiple axes of movement. With a single axis of movement, the auto-hitch system 1000 controls the forklift AGV 1006 to maneuver the hitch 1008 under the connection feature of a container, as opposed to rotating or extending the hitch 1008 itself as described in other embodiments herein. In some embodiments, the hitch 1008 can be moved in one or more directions to align with a hitching feature.

As described herein, the auto-hitch system 1000 controls the forklift AGV 1006 to automatically couple the hitch 1008 to the connection feature of an item container. The auto-hitch system 1000 can include a control system, controller, processor, I/O block, memory system, sensor, instructions, operations, and/or other features described in reference to FIG. 4 and/or other embodiments described herein to perform automatic hitching.

FIG. 10B shows assembled components of the auto-hitch system 1000. The hitch 1008, described in more detail below, is mounted to the frame 1030 via a mounting assembly 1010. The mounting assembly 1010 includes a hitch mount 1012 and a support 1022.

Figure 10C:
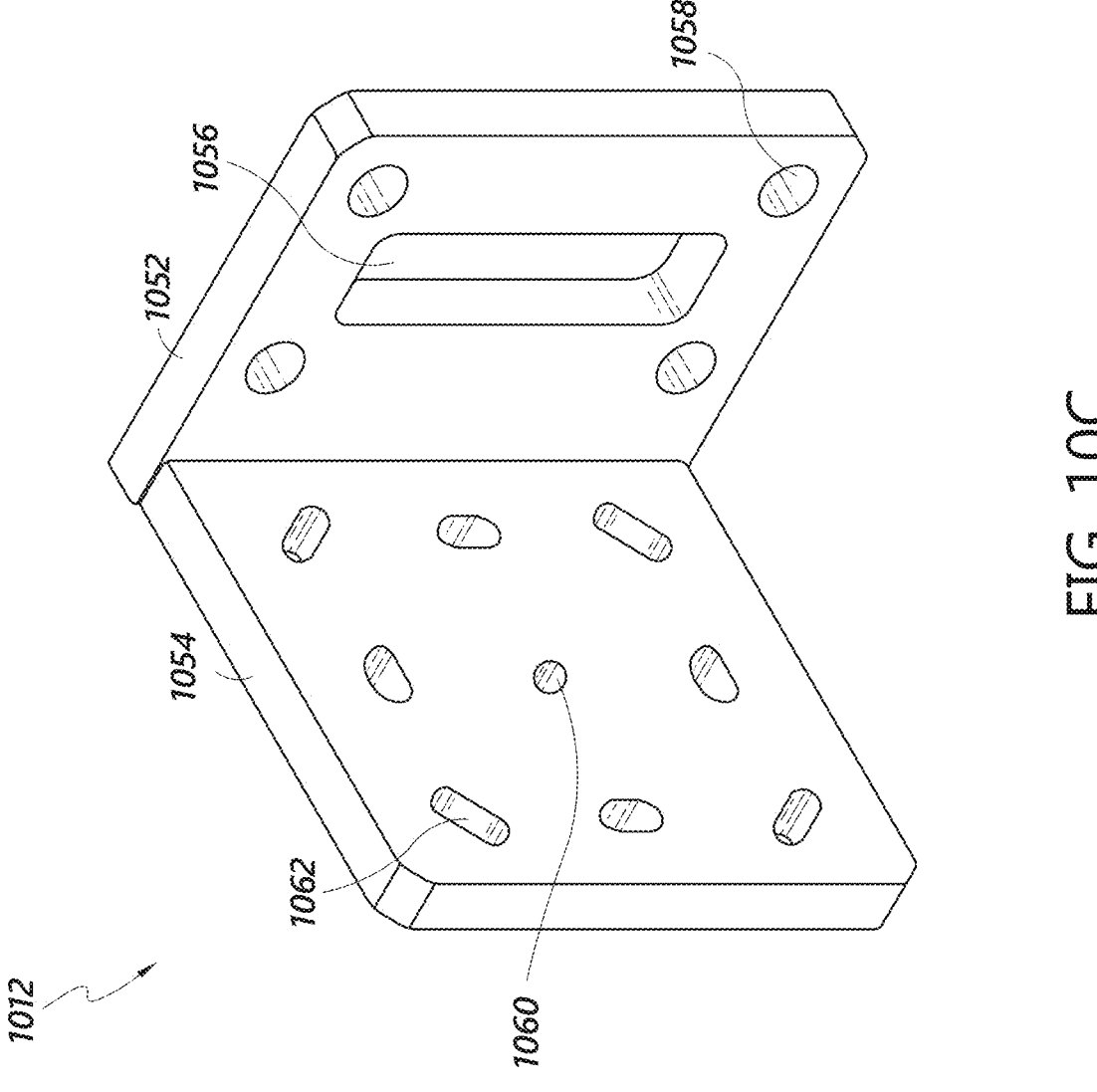
FIG. 10C illustrates an exemplary hitch mount.

As shown in FIG. 10C, the hitch mount 1012 includes a first panel 1052 and a second panel 1054 that can be made from a variety of materials, such as power coated steel. The first panel 1052 and second panel 1054 are attached together (e.g., welded, spot welded, fastened) such that the second panel 1054 is orthogonal to the first panel 1052. The second panel 1054 is attached proximate an end of the first panel 1052. In some embodiments, the first panel 1052 and second panel 1054 are not separate pieces, but rather, the first panel 1052 and the second panel 1054 are portions of a monolithic hitch mount 1012. The first panel 1052 includes a plurality of first apertures 1058 (e.g., four first apertures) and an elongate aperture 1056 (e.g., rectangular aperture). The plurality of first apertures 1058 can be positioned around the elongate aperture 1056.

The second panel 1054 of the hitch mount 1012 includes a central second aperture 1060 and a plurality of second apertures 1062 (e.g., eight second apertures). The central second aperture 1060 is centrally located on the second panel 1054. The central second apertures 1060 has a circular periphery but may have a different shaped periphery in some embodiments. The plurality of second apertures 1062 are positioned around the central second aperture 1060. The plurality of second apertures 1062 are positioned in a square and/or rectangular configuration with three of the plurality of second apertures 1062 forming each side of the square and/or rectangular configuration. Each of the plurality of second apertures 1062 is elongate with rounded ends allowing excess clearance for bolts 1016, which can advantageously permit the plurality of second apertures 1062 to be positioned over slots 1021 of the support 1022 despite varying distances between the slots 1021. The plurality of second apertures 1062 are varying sizes, with the second apertures 1062 at the corners of the square or rectangular configuration being larger than the second apertures 1062 positioned therebetween. The second apertures 1062 at the corners of the square or rectangular configuration are angled (e.g., angled relative to the lateral sides and top side of the second panel 1054). The second apertures 1062 positioned between the corners of the square or rectangular configuration are parallel to the lateral sides or top side of the second panel 1054. The central second aperture 1060 and the plurality of second apertures 1062 are used to couple the hitch mount 1012 to the support 1022.

Returning to FIG. 10B, a plurality of bolts 1016 (e.g., nine M8 T-bolts) extend through the central second aperture 1060 and the plurality of second apertures 1062 to couple the second panel 1054 to the support 1022. The support 1022 is an elongate structure with a plurality of slots 1021 (e.g., grooves). Specifically, the plurality of slots 1021 can include three slots on a face (e.g., front face) of the support 1022 that faces away from the frame 1030 when the support 1022 is mounted thereon. In some embodiments, the support 1022 is a Bosch Rexroth™ aluminum 40 mm×100 mm frame. The central second aperture 1060 and the plurality of second apertures 1062 of the second panel 1054 of the hitch mount 1012 can be positioned over the plurality of slots 1021 such that the plurality of bolts 1016 inserted through the central second aperture 1060 and the plurality of second apertures 1062 of the second panel 1054 extend into the slots 1021 to couple the hitch mount 1012 (e.g, second panel 1054) to the support 1022. Specifically, in some embodiments, a nut or bracket can be positioned within the slots 1021 such that the plurality of bolts 1016 engage with the nut or bracket, coupling the hitch mount 1012 to the support 1022.

Figures 10D, 10E:
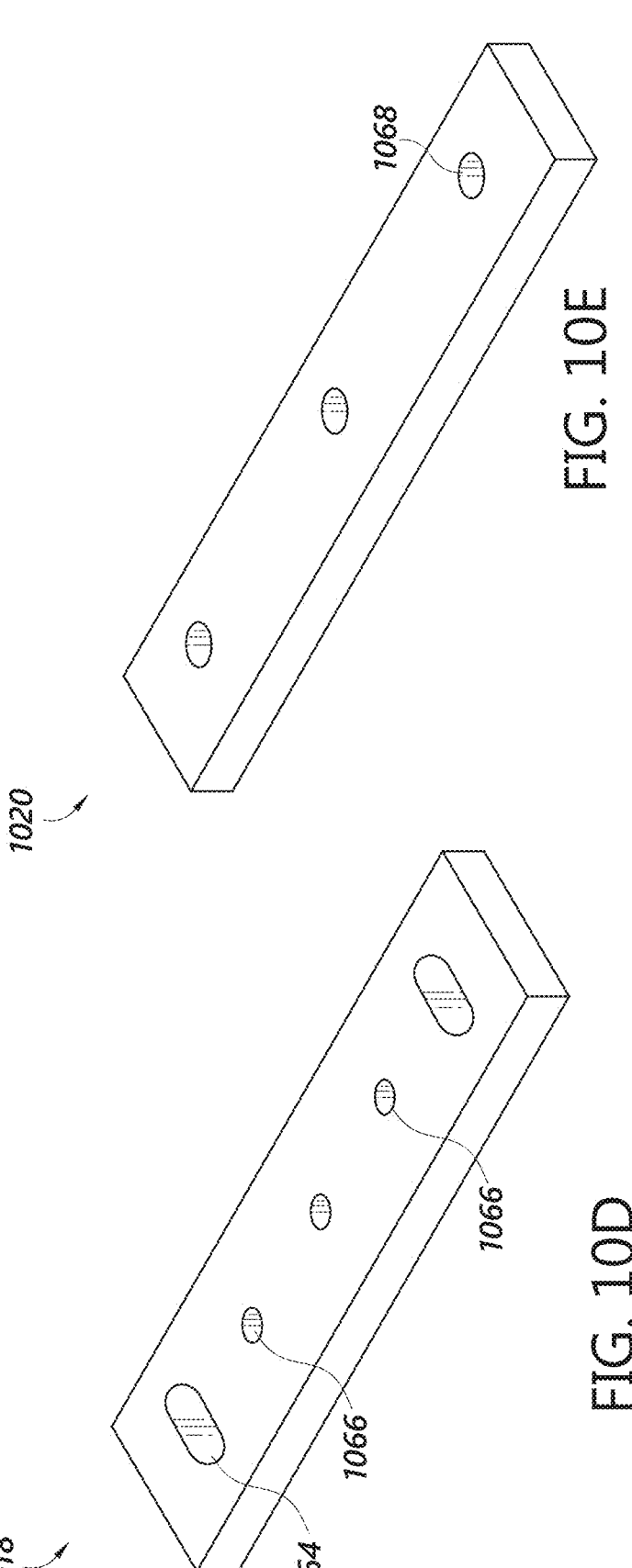
FIG. 10D illustrates an exemplary front plate.
FIG. 10E illustrates an exemplary back plate.

The mounting assembly 1010 includes one or more front plates 1018 (e.g., two front plates) and one or more rear plates 1020 (e.g., two rear plates). The front plate 1018 and rear plate 1020 can be made from a variety of materials, such as steel. As shown in FIG. 10D, the front plate 1018 is an elongate plate having a rectangular shaped periphery. The front plate 1018 has one or more elongate front openings 1064. The one or more elongate front openings 1064 have rounded ends. The two elongate front openings 1064 are spaced apart from each other and positioned proximate opposing ends of the front plate 1018. The one or more elongate front openings 1064 are orthogonally oriented relative to a longitudinal axis of the front plate 1018. The front plate 1018 has a plurality of front openings 1066 (e.g., three front openings). The plurality of front openings 1066 are positioned between the one or more elongate front openings 1064. The plurality of front openings 1066 each have a circular periphery but other shaped peripheries can be used. The plurality of front openings 1066 and/or the one or more elongate front openings 1064 are centered between the longitudinal sides of the front plate 1018.

The rear plate 1020 has a plurality of rear openings 1068 (e.g., three rear openings), as shown in FIG. 10E. The plurality of rear openings 1068 have circular peripheries but other shaped peripheries can be used. The plurality of rear openings 1068 are equally spaced a part. Two of the plurality of rear openings 1068 are spaced apart the same (e.g., substantially the same) distance as between the elongate front openings 1064 of the front plate 1018. Stated differently, two of the plurality of rear openings 1068 and the elongate front openings 1064 are in the same configuration such that two of the plurality of rear openings 1068 and the elongate front openings 1064 can be coaxially aligned.

Figure 10F:
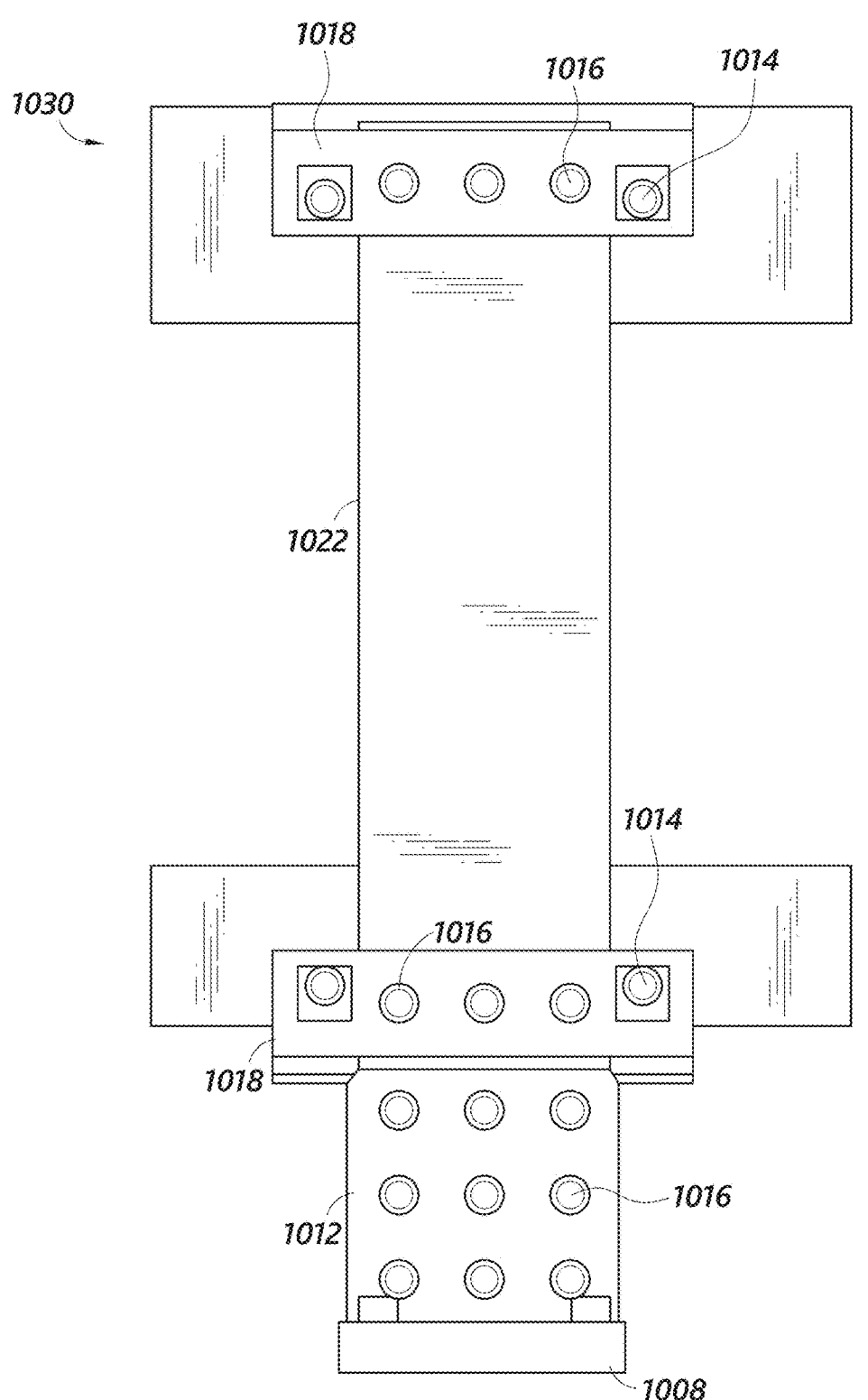
FIG. 10F illustrates a partial view of the components of the exemplary auto-hitch system shown in FIG. 10B.

The front plate 1018 and rear plate 1020 are used to couple the support 1022 to the frame 1030. Front plates 1018 are coupled to the front face of the support 1022. The plurality of front openings 1066 are positioned over the slots 1021 and bolts 1016 are extended through each of the plurality of front openings 1066 and into the slots 1021. Specifically, in some embodiments, a nut or bracket can be positioned within the slots 1021 such that the plurality of bolts 1016 engage with the nut or bracket, coupling the front plates 1018 to the support 1022. As shown in FIG. 10F, two front plates 1018 are coupled to the support 1022 such that the two front plates 1018 are spaced apart approximately the length of the frame 1030. The two front plates 1018 are flush with the front face of the support 1022. The front plate 1018 has a length that is greater than the width of the support 1022 such that the elongate front openings 1064 are positioned beyond the lateral sides of the support 1022 when the front plate 1018 is coupled thereto.

Figure 10G:
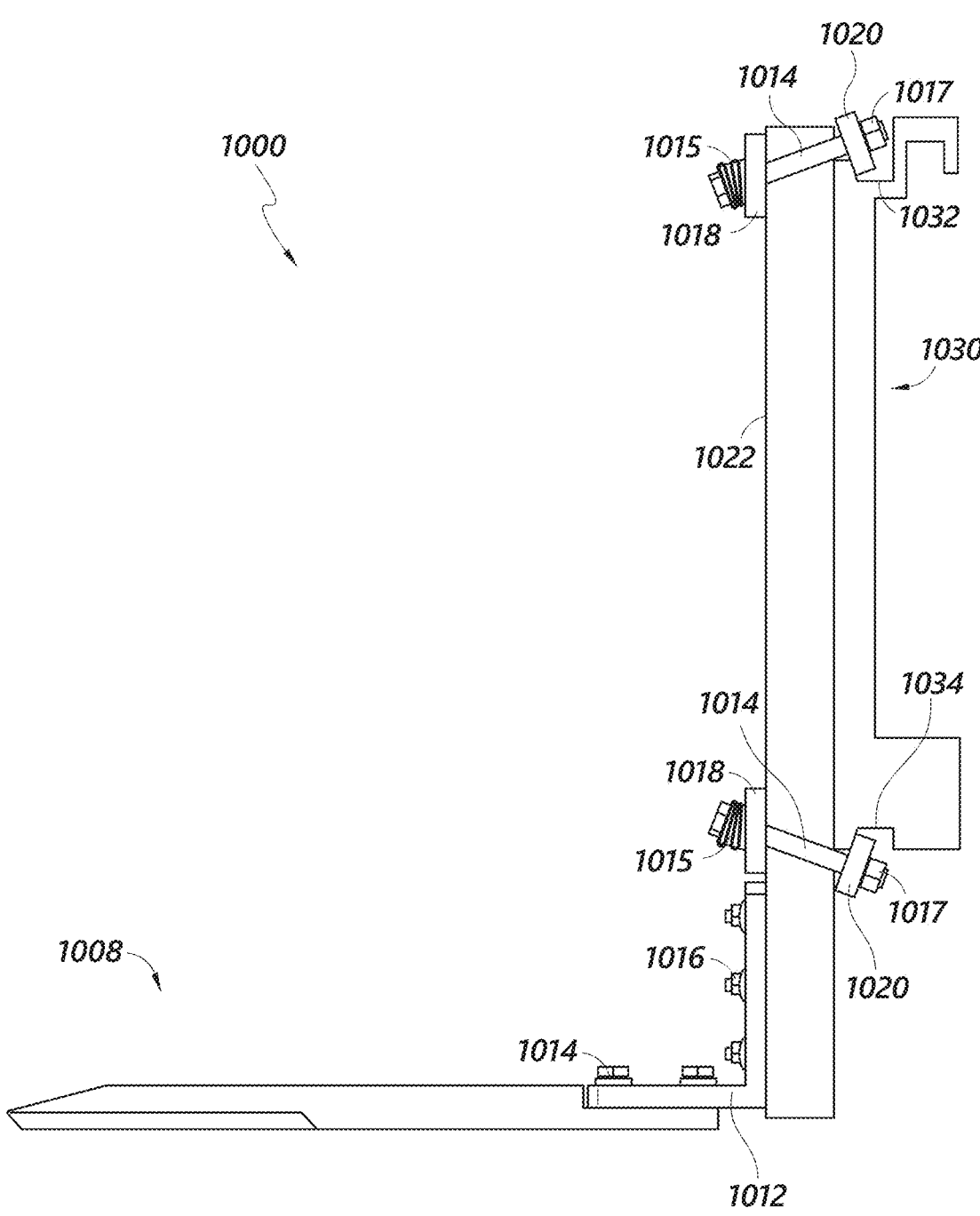
FIG. 10G illustrates another view of the components of the exemplary auto-hitch system shown in FIG. 10B.

As shown in FIG. 10G, the rear plate 1020 is positioned within the top groove 1032 of the frame 1030 and another rear plate 1020 is positioned within the bottom groove 1034 of the frame 1030. The front plate 1018 and the rear plate 1020 can collectively be referred to as a clamp. In other embodiments, other mechanisms can be used to connect the support 1022 to the frame 1030.

Bolts 1014 are inserted through the elongate front openings 1064 of the front plate 1018 and through the plurality of rear openings 1068 of the rear plate 1018. Specifically, bolts 1014 are inserted through two of the elongate front openings 1064 of the front plate 1018 and angled to extend through two of the plurality of rear openings 1068 of the rear plate 1020. The elongate nature of the elongate front openings 1064 permit the bolts 1014 to be angled therethrough. The bolts 1014 can be at a twenty degree angle relative to an axis that is orthogonally oriented relative to the longitudinal axis of the support 1022, such that interfacing with the frame 1030 can be accomplished. In some embodiments, other angles may be used, which can include angles less than 10, 10-15, 15-20, 20-25, 25-30, or greater than 30 degrees.

A beveled washer 1015 (e.g., wedge washer) can be positioned between the heads of the bolts 1014 and the front plates 1018, such that the heads of the bolts 1014 are advantageously flush with the beveled washer 1015 despite being inserted at an angle through the elongate front openings 1064. Stated differently, the beveled washer 1015 can support the angled bolt 1014. The rear plates 1020, as shown in FIG. 10C, are angled relative to the support 1022 such that the angled bolts 1014 can extend through the plurality of rear openings 1068. The rear plates 1020 are angled relative to the front plates 1018. The surfaces of the top groove 1032 and bottom groove 1034 that are positioned between the rear plates 1020 and the support 1022 can be angled to accommodate the angled orientation of the rear plates 1020. A nut 1017 can be positioned on the bolt 1014 to retain the rear plate 1020.

Figure 10H:
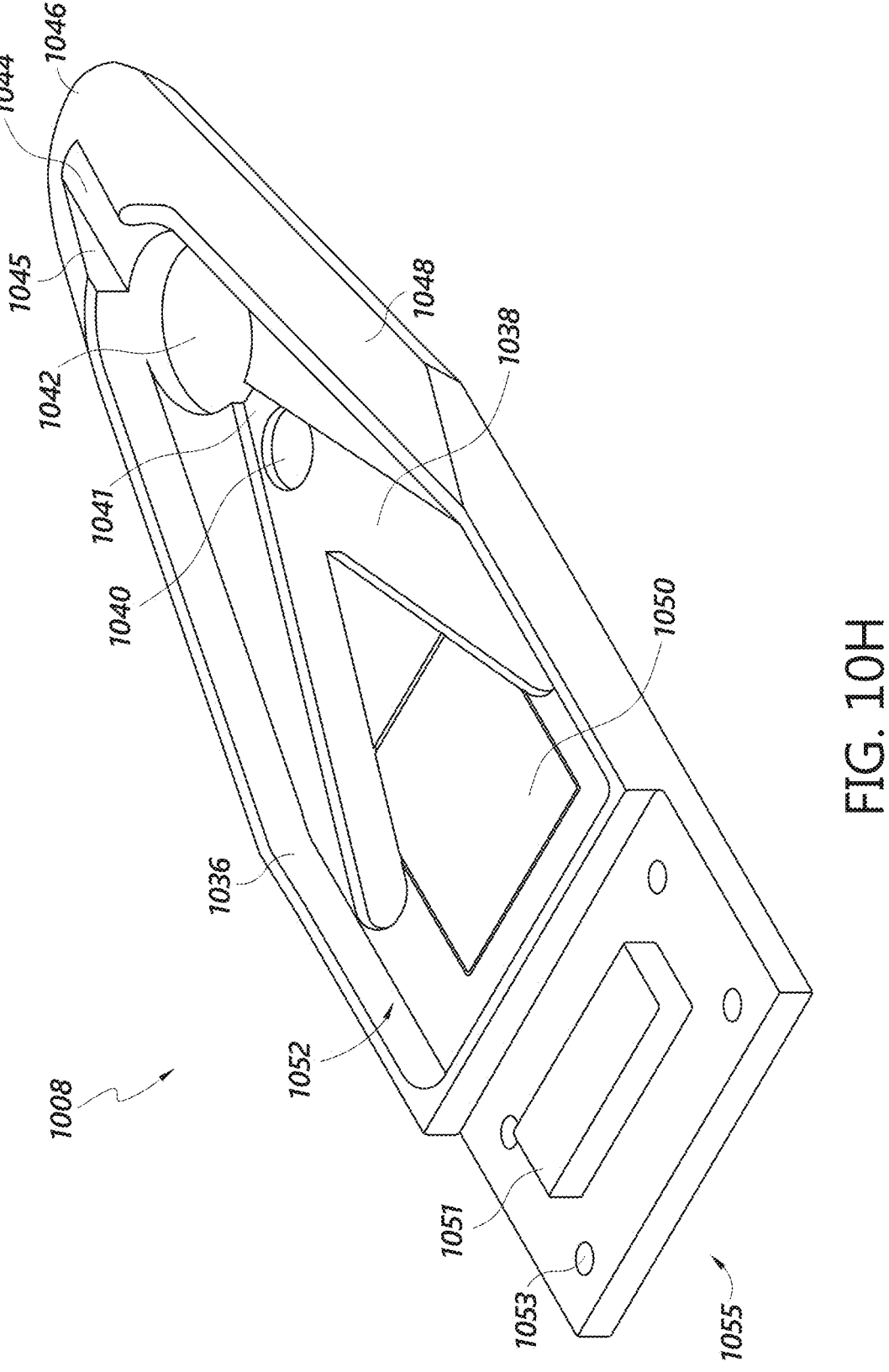
FIG. 10H illustrates an exemplary hitch.
Figure 10I:
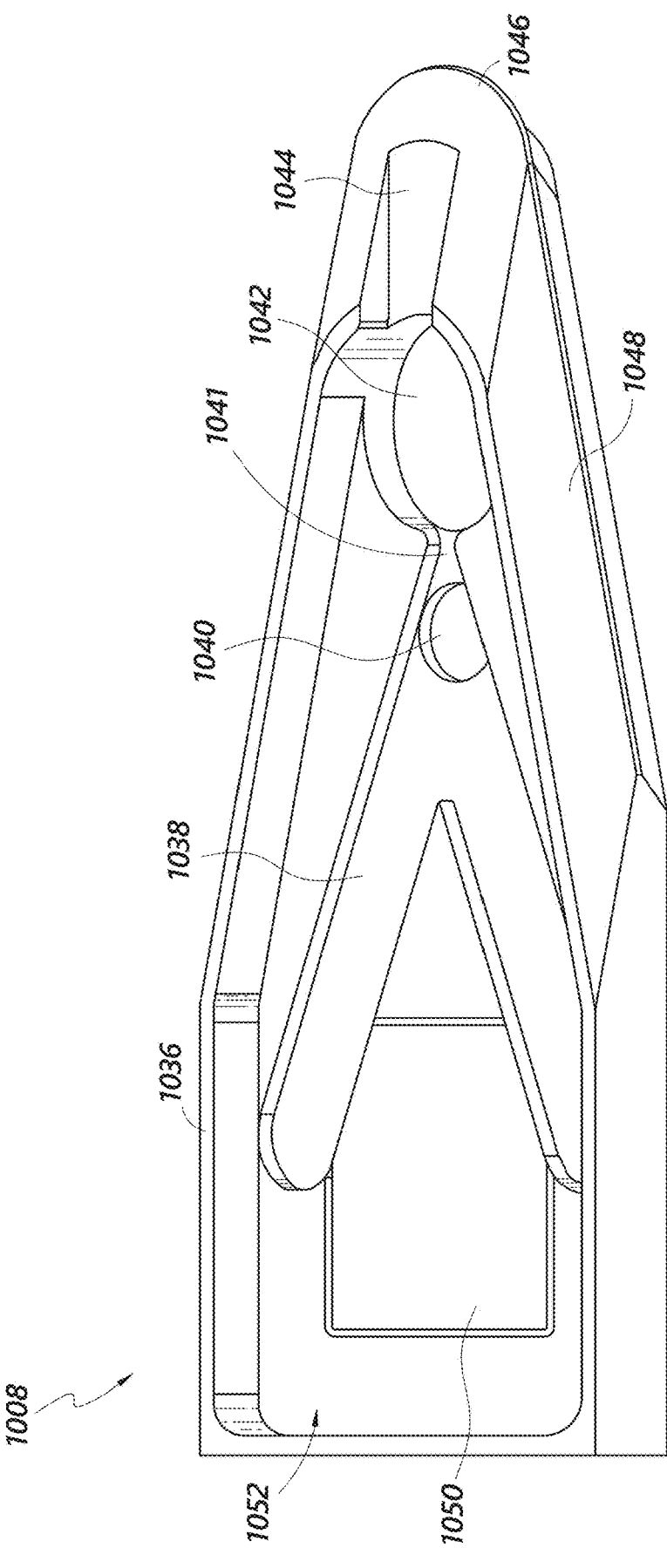
FIG. 10I illustrates a partial view of the hitch shown in FIG. 10H.
Figure 10J:
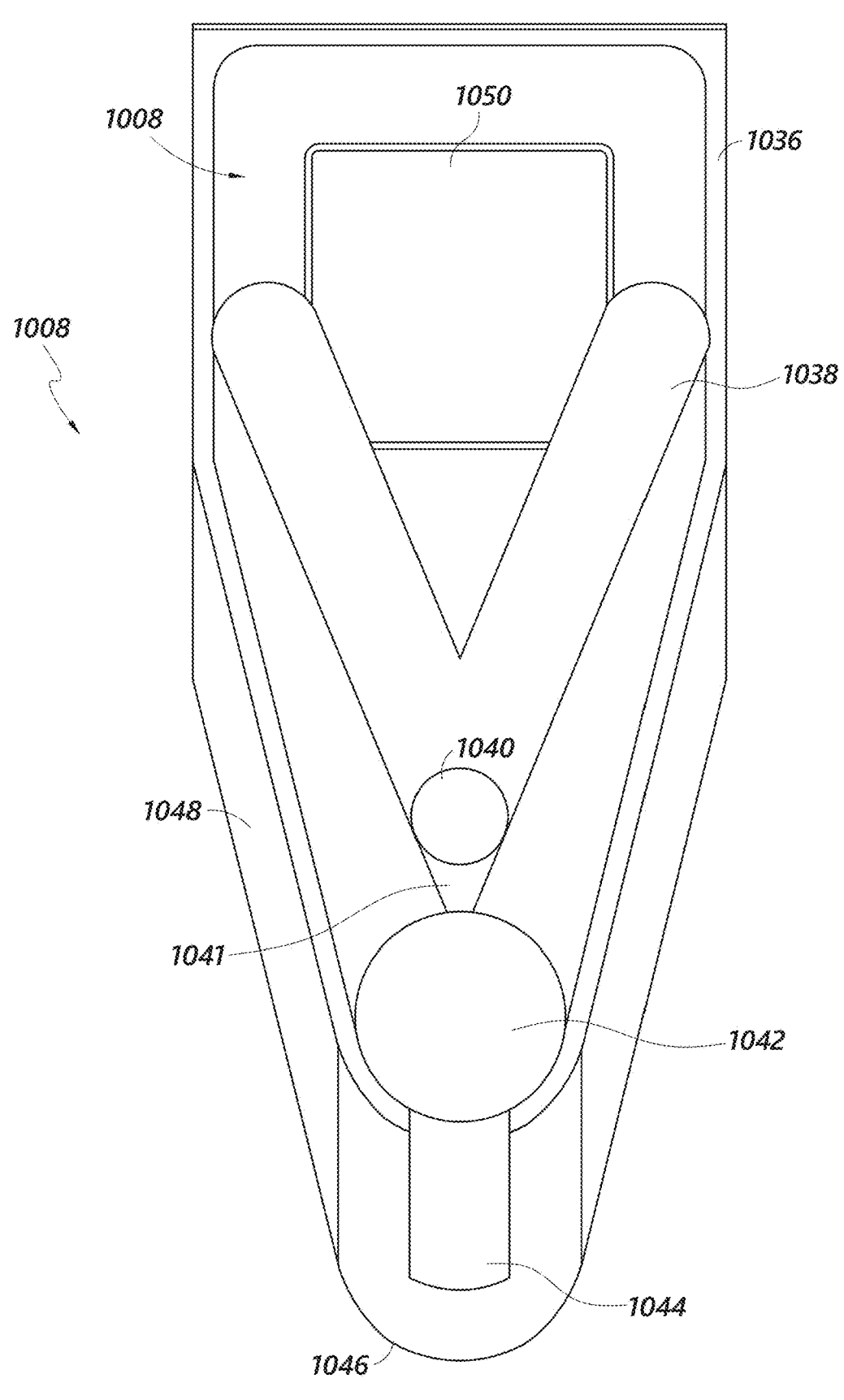
FIG. 10J illustrates another partial view of the hitch shown in FIG. 10H.

FIG. 10H illustrates an embodiment of the hitch 1008, and FIGS. 10I and 10J illustrate a portion of the hitch 1008. Although the hitch 1008 is described with regard to the auto-hitch system 1000, the hitch 1008 can be connected to any of the hitching systems, actuators, devices, etc., described herein with regard to other figures without departing from the scope of the disclosure. The hitch 1008 can be made from a variety of materials, which can include power coated steel. The hitch 1008 is configured to provide the ability to connect or hitch the forklift AGV 1006 or other vehicle to a variety of containers (e.g., rolling stock).

The hitch 1008 has a second side 1055. The second side 1055 has a protrusion 1051 (e.g., rectangular prism) and a plurality of mounting apertures 1053 (e.g., four mounting apertures) that can be used to mount hitch 1008 to the hitch mount 1012 as described elsewhere herein.

The hitch 1008 has a periphery that narrows from the second end 1055 to a first end 1046. The first end 1046 can be rounded, which can advantageously reduce any damage caused by contact between the first end 1046 and another object. The hitch 1008 can have an inclined outer edge 1048

(e.g., chamfer) that extends around a portion of the periphery of the hitch 1008 to the peripheral wall 1036 of the hitch pocket 1052 described below. In some embodiments, the inclined outer edge 1048 extends around the portion of the periphery of the hitch 1008 that is narrowing toward the first end 1046. The inclined outer edge 1048 can advantageously decrease damage to the hitch 1008 and/or connection feature upon contact. The inclined outer edge 1048 can advantageously enable connection features to deflect upward into the pocket 1052 upon impacting the inclined outer edge 1048 of the hitch 1008. A void or notch 1044 in the inclined outer edge 1048 and peripheral wall 1036 is positioned between the first end 1046 and a large aperture (first aperture) 1042. The notch 1044 is formed in the inclined outer edge 1048 of the hitch 1008, and extends longitudinally between the first and second ends 1046, 1055. The notch 1044 is adapted to contact the connection feature, where the connection feature may impinge on a wall 1045 of the notch 1045 to guide the connection feature to a desired location.

The hitch 1008 includes a hitch pocket 1052 that is bounded by a peripheral wall 1036. The hitch pocket 1052 can provide a large target area for a connection feature of rolling stock. In some embodiments, the hitch pocket 1052 has a width of 3 inches in one or both X and Y directions for use with general purpose containers, such as wheeled shelves, etc. In some embodiments, the hitch pocket 1052 has a width of 5 inches in one or both X and Y directions for use with wire containers and over the road containers. The hitch 1008 includes a box (alignment portion, target, orientation feature) 1050 within the hitch pocket 1052 that can be used as a target above which the forklift AGV 1006 positions the connection feature of rolling stock. Specifically, the forklift AGV 1006 can position the hitch 1008 such that the connection feature of the rolling stock is centered above the box 1050. In some embodiments, the box 1050 is a raised area formed within the hitch pocket 1052. In some embodiments, the box 1050 is a recessed area formed within the hitch pocket 1052. The hitch 1008 includes the large aperture 1042 and a small aperture (second aperture) 1040. Using different sized apertures allows the hitch 1008 to be used for connection features of different sizes on rolling stock. The large aperture 1042 and small aperture 1040 are positioned along the center longitudinal axis of the hitch 1008 but other configurations can be used.

The hitch 1008 has a v-shaped groove 1038 that can guide connection features toward the small aperture 1040, large aperture 1042, and/or along the center longitudinal axis of the hitch 1008. The small aperture 1040 can be positioned in the v-shaped groove 1038. In some embodiments, the sides of the v-shaped groove can be tangential to the sides of the small aperture 1040 such that a connection feature engaging with the sides of the v-shaped groove and moving toward the first end 1046 will pass over and/or into the small aperture 1040. The v-shaped groove 1038 has a gap 1041 that enables a connection feature positioned within the v-shaped groove 1038 to pass through the gap 1041 and over and/or into the large aperture 1042. The gap 1041 is positioned between the small aperture 1040 and the large aperture 1042. The large aperture 1042 and the small aperture 1040 are sized and shaped such that a large connection feature will fit within the large aperture 1042, but will not fit within the small aperture 1042. As the hitch 1008 is moved to hitch a container or rolling stock having a large connection feature, the large connection feature on the container or rolling stock can move along the v-shaped groove 1038, pass over the small aperture 1040 into which the large connection feature cannot fit, through the gap 1041, and into the large aperture 1042, wherein the connection feature will extend at least partially into the large aperture 1042. If the container or rolling stock has a small connection feature, the connection feature will move in the v-shaped groove 1038, and will not pass over the small aperture 1038, but will extend at least partially into the small aperture 1038. If the hitch 1008 continues to move, the small connection feature will impinge an inner surface of the small aperture 1038, and the small connection feature will be retained within the small aperture 1038.

The large aperture 1042 can be positioned such that the peripheral wall 1036 is tangential to the periphery of the large aperture 1042 such that a connection feature engaging with the peripheral wall 1036 and moving toward the first end 1046 will pass over and/or into the large aperture 1042. The large aperture 1042 is positioned between the small aperture 1040 and the first end 1046.

Figure 10K:
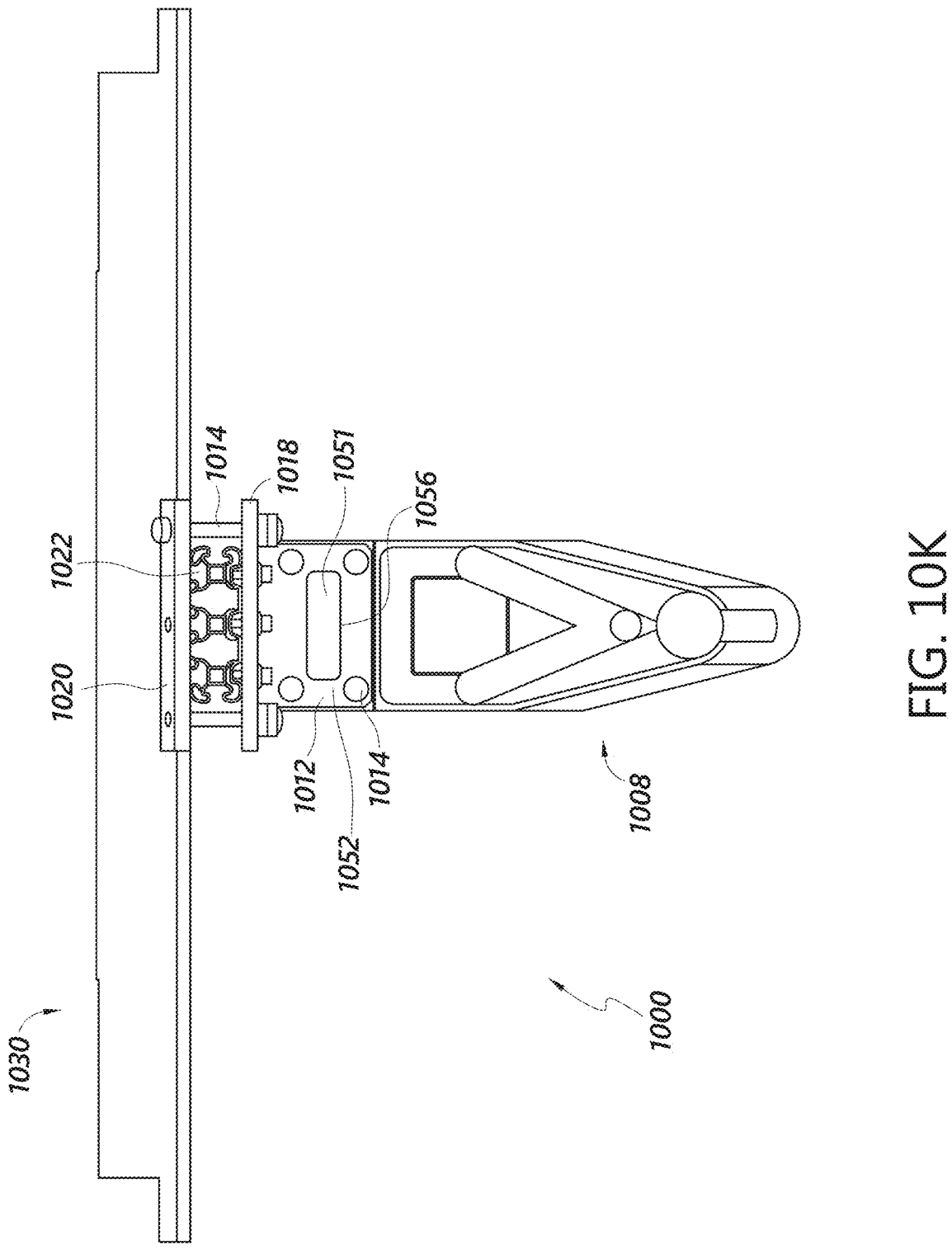
FIG. 10K illustrates another view of the components of the exemplary auto-hitch system shown in FIG. 10B.

As shown in FIG. 10K, the first panel 1052 and the hitch 1008 are coupled together with the protrusion 1051 of the hitch 1008 extending into the elongate aperture 1056 of the first panel 1052 and a plurality of bolts 1014 (e.g., four M12 bolts) extending through each of the plurality of first apertures 1058 of the first panel 1052 and each of the plurality of mounting apertures 1053 of the hitch 1008. The insertion of the protrusion 1051 of the hitch 1008 into the elongate aperture 1056 of the first panel 1052 can alleviate stresses that would otherwise be imparted to the bolts 1014 that result from contact, collisions, normal use, etc.

In use, the auto-hitch system 1000 maneuvers the forklift AGV 1006 such that the hitch 1008 is positioned under the connection feature of a container. Specifically, the auto-hitch system 1000 positions the box 1050 under the connection feature. The auto-hitch system 1000 raises the hitch 1008 until the hitch 1008, is proximate and/or contacting the connection feature such that the connection feature is within the hitch pocket 1052. This arrangement of the hitch 1008 and the connection feature can be referred to as the hitching position. The auto-hitch system 1000 can include a sensor and/or servo/feedback mechanism to verify when the hitch 1008 is in the hitching position.

The auto-hitch system 1000 can employ different operations to guide connection features of varying configurations (e.g. varying sizes and shapes) into/toward the small aperture 1040, large aperture 1042, and/or central longitudinal axis. When in the hitching position, the auto-hitch system 100 can immediately cause the vehicle to apply an upward preload to the hitch 1008, raising the hitch 1008 upward against the connection feature, so that the connection feature drops into the v-shaped groove 1038 as the forklift AGV 1006 moves forward. The v-shaped groove 1038 can guide the connection feature toward the small aperture 1040, large aperture 1042, and/or longitudinal center axis of the hitch 1008. If the small aperture 1040 is the target, the auto-hitch system 1000 can cause the vehicle to apply an upward preload to the hitch 1008 while the connection feature is in the v-shaped groove 1038 such that the connection feature drops into the small aperture 1040 as the forklift AGV 1006 moves forward, which can be desirable with small connection features (e.g., pin) of a wire container or over the road container.

In other operations, the auto-hitch system 1000 ceases to apply an upward preload once the connection feature is in the v-shaped groove 1038 such that the connection feature will be guided in the v-shaped groove 1038 but pass over the small aperture 1040 as the forklift AGV 1006 moves forward. Once past the small aperture 1040, the auto-hitch system 1000 can apply an upward preload such that the connection feature drops into the large aperture 1042 as the forklift AGV 1006 moves forward In other operations, the auto-hitch system 1000 does not immediately apply an upward preload when the hitch 1008 is in the hitching position, but instead, the auto-hitch system 1000 directs the forklift AGV 1006 to move forward and, once the connection feature has passed over the v-shaped groove 1038, then apply an upward preload as the forklift AGV 1006 moves forward. The peripheral walls 1036 can guide the connection feature such that the connection feature drops into the large aperture 1042 as the forklift AGV 1006 moves forward. In some operations, the auto-hitch system 1000 does not apply an upward preload as the forklift AGV 1006 is directed forward such that the connection feature exits the hitch pocket 1052 via the void 1044.

When directing the forklift AGV 1006 to move forward in the operations detailed herein, the auto-hitch system 1000 can limit the speed of the forklift AGV 1006 to a maximum speed of five inches per second, but in other embodiments, maximum speeds of less than 1, 2, 5, 10, 15, 17 or more inches per second or any other desired speed can be used. When directing the forklift AGV 1006 to move forward in the operations herein, the auto-hitch system 1000 can direct the forklift AGV 1006 to move in a straight line for the first 24 inches of travel, but in other embodiments, the forklift AGV 1006 can be directed to move in a straight line for less than 10, 20, 30, 40, or more than 41 inches, or any other desired distance. As the forklift AGV 1006 moves forward, the connection feature can engage with the peripheral wall 1036 or v-shaped groove 1038 to guide the connection feature. In some embodiments, the container of the target connection feature will move as a result of the engagement between the connection feature and the peripheral wall 1036 or v-shaped groove 1038, enabling the forklift AGV 1006 to move in a straight line as the connection feature is guided to the desired location using the operations detailed herein.

Figures 11A, 11B:
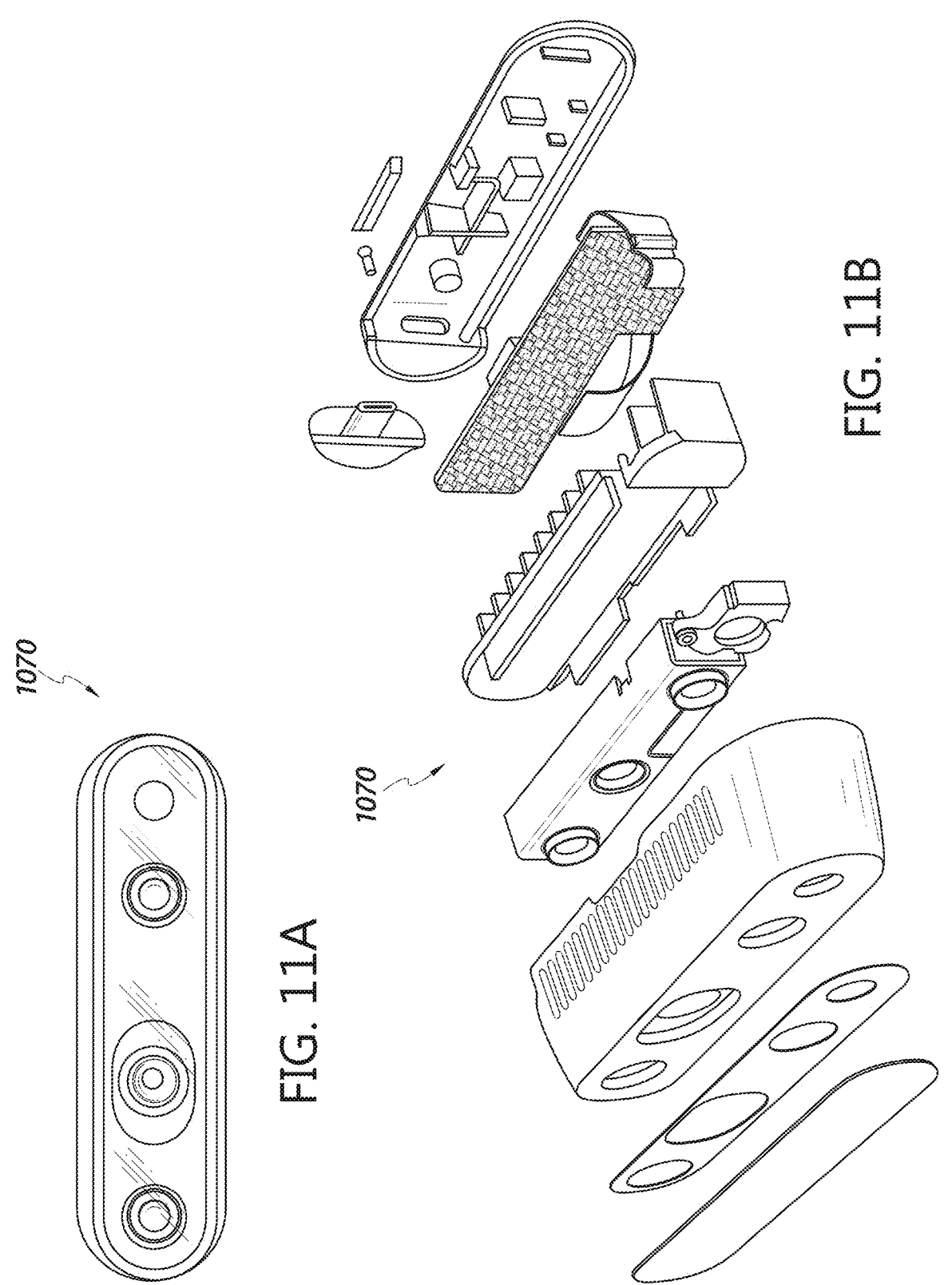
FIG. 11A illustrates a sensor for use with an auto-hitch system.
FIG. 11B illustrates an exploded view of the sensor shown in FIG. 11A.

FIGS. 11A and 11B illustrate an embodiment of a sensor 1070 that can be used with the auto-hitch system 1000 and/or other embodiments described elsewhere herein. For example, the sensor 1170 can be similar to and/or have similar connections as the sensor 430 described elsewhere herein. The sensor 1070 can be used to recognize, identify, differentiate, scan, detect, and/or locate a container, connection feature, hitch, hitch feature, structures, environmental features, pathways, animate objects, and/or other objects. For example, the sensor 1070 can detect or be used to detect a type of container, location of a container, type of connection feature, location of a connection feature, and/or other features. The sensor 1070 can communicate to the auto-hitch control system 424 in real-time such that the auto-hitch system 1000 can respond to changes. The senor 1070 can provide an accurate 3D scan of an environment to detect a type of container, location of a container, type of connection feature, location of a connection feature, and/or other features. The sensor 1070 can have a fast update speed, which can be important when the forklift AGV 1006 is in motion, to provide real-time scans of the environment, connection feature location, and/or other aspects. In some embodiments, the fast update speed is partially facilitated by a lower accuracy or lower resolution scan being performed while the forklift AGV 1006 is in motion. In some embodiments, the sensor 1070 has a short minimum working distance, enabling the hitch 1008 to avoid excessively long lengths. In some embodiments, the sensor 1070 utilizes stereo infrared vision with an internal dot projector, which can be efficacious in low-light scenarios. In some embodiments, the sensor 1070 is the Intel® RealSense™ D435.

Figures 12A, 12B, 12C:
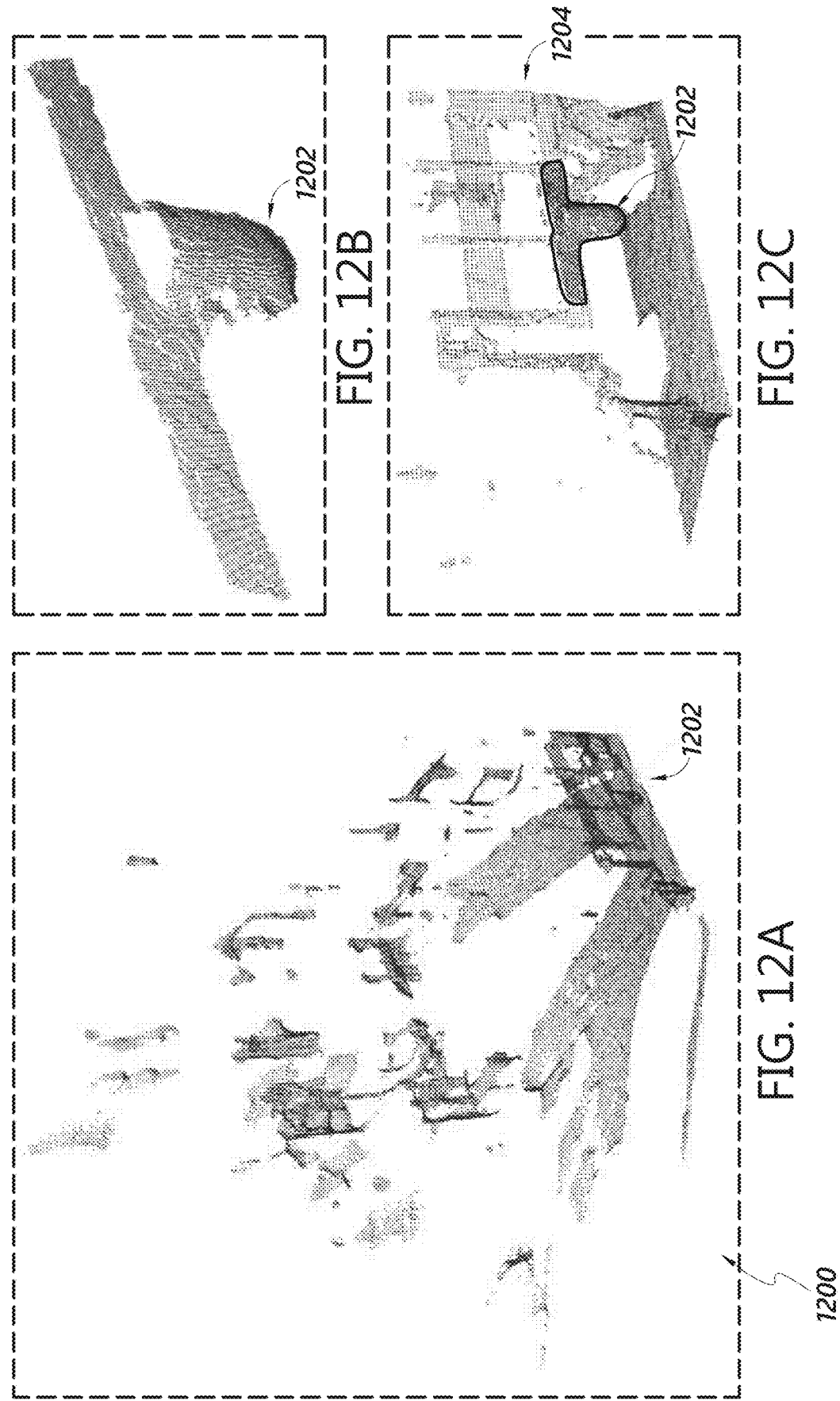
FIG. 12A illustrates a point cloud generated using a sensor.
FIG. 12B illustrates an extracted point cloud of a connection feature.
FIG. 12C illustrates the extracted point cloud of the connection feature located within the point cloud generated by the sensor.

FIG. 12A illustrates a point cloud 1200 generated from a scan using the sensor 1070. The point cloud 1200 can represent a container and/or connection feature. The auto-hitch system 1000, as shown in FIG. 12B, can extract the connection feature point cloud 1202 from the point cloud 1200. This can enable the auto-hitch system 1000 to identify, locate, and/or recognize the connection feature point cloud 1202 within the point cloud 1200, as shown in FIG. 12C. The auto-hitch system 1000 can proceed to locate the extracted connection feature point cloud 1202 within the point cloud 1200 to determine the location of the connection feature. In some embodiments, the auto-hitch system 1000 can extract a container point cloud 1204 within the point cloud 1200 to determine the location of the container. In some embodiments, the auto-hitch system 1000 can determine the type of container and/or connection feature based on the point cloud 1200. In some embodiments, the auto-hitch system 1000 can determine the size and/or configuration of a connection feature such that an appropriate hitch operation can be implemented to couple the hitch 1008 to either the small aperture 1040 or the large aperture 1042. In some embodiments, the sensor 1070 can generate a point cloud of the surroundings of the auto-hitch system 1000 and effectuate operations based on the generated point cloud.

Figure 13:
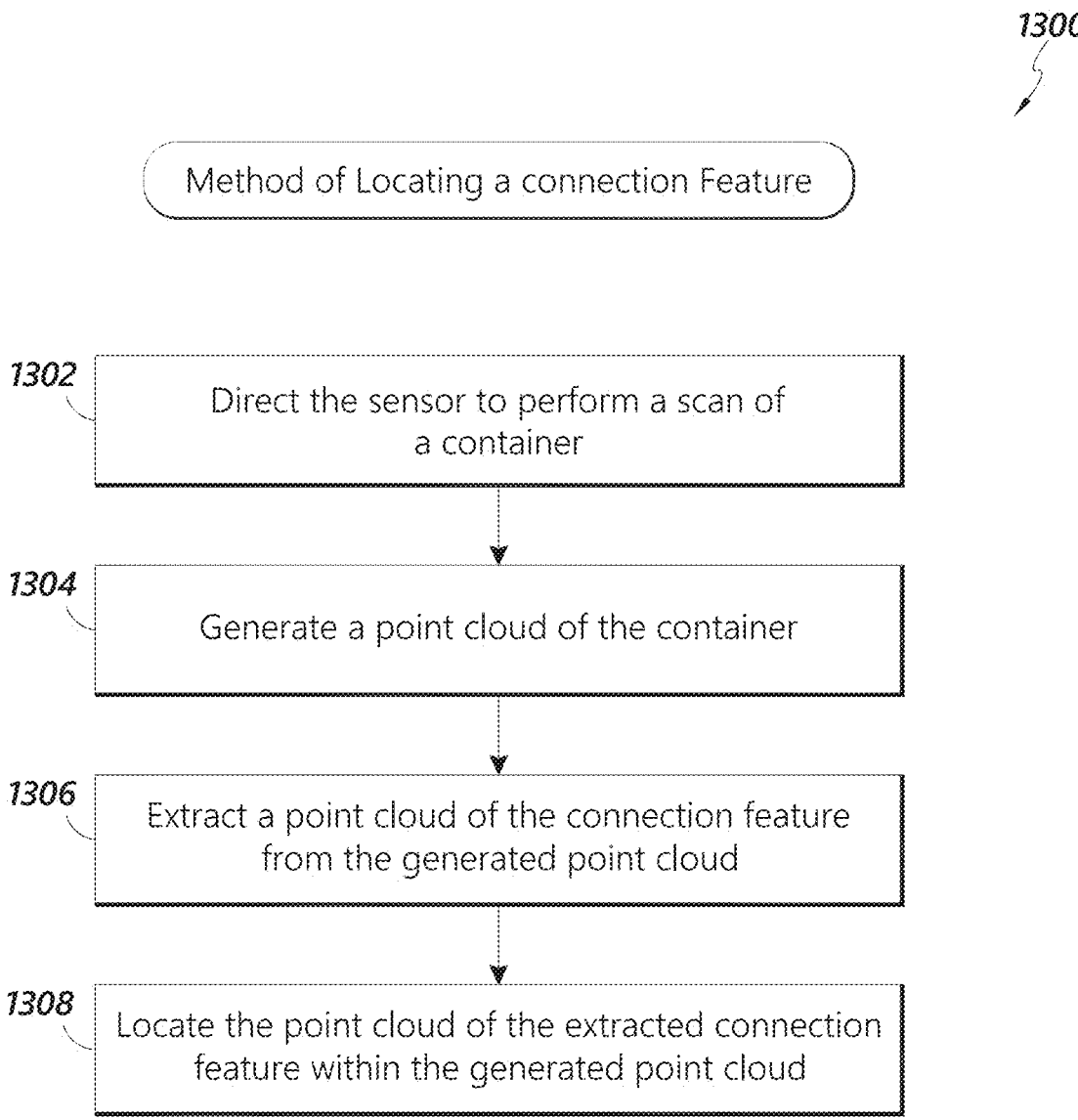
FIG. 13 illustrates an exemplary method of locating a connection feature.

FIG. 13 is a flow diagram depicting an exemplary method of using an auto-hitch system to locate a connection feature. The flow diagram is provided for the purpose of facilitating description of aspects of some embodiments. The diagram does not attempt to illustrate all aspects of the disclosure and should not be considered limiting.

The process 1300 begins at block 1302, wherein the auto-hitch system directs the sensor 430 or 1070 to perform a scan of a container. In some embodiments, the sensor 1070 performs a 3D scan of the container, which can include utilizing stereo infrared vision with an internal dot projector. In some embodiments, the scan includes the environment around the container.

At block 1304, the auto-hitch control system 424 receives a point cloud of the container from the sensor 1070, or receives sensor information from the sensor 1070 and generates a point cloud of the container using the sensor information. The point cloud can represent the features of the container, including a connection feature. In some embodiments, the auto-hitch system can identify the container type based on the generated point cloud.

At block 1306, the auto-hitch control system 424 extracts a point cloud of the connection feature from the generated point cloud. In some embodiments, the auto-hitch system can determine the type and/or size of the connection feature based on the extracted point cloud of the connection feature.

At block 1308, the auto-hitch control system 424 locates the point cloud of the extracted connection feature within the generated point cloud. This can enable the auto-hitch control system 424 to determine the location of the connection feature relative to the hitch 1008 such that appropriate hitching operations can be executed.

Figure 14:
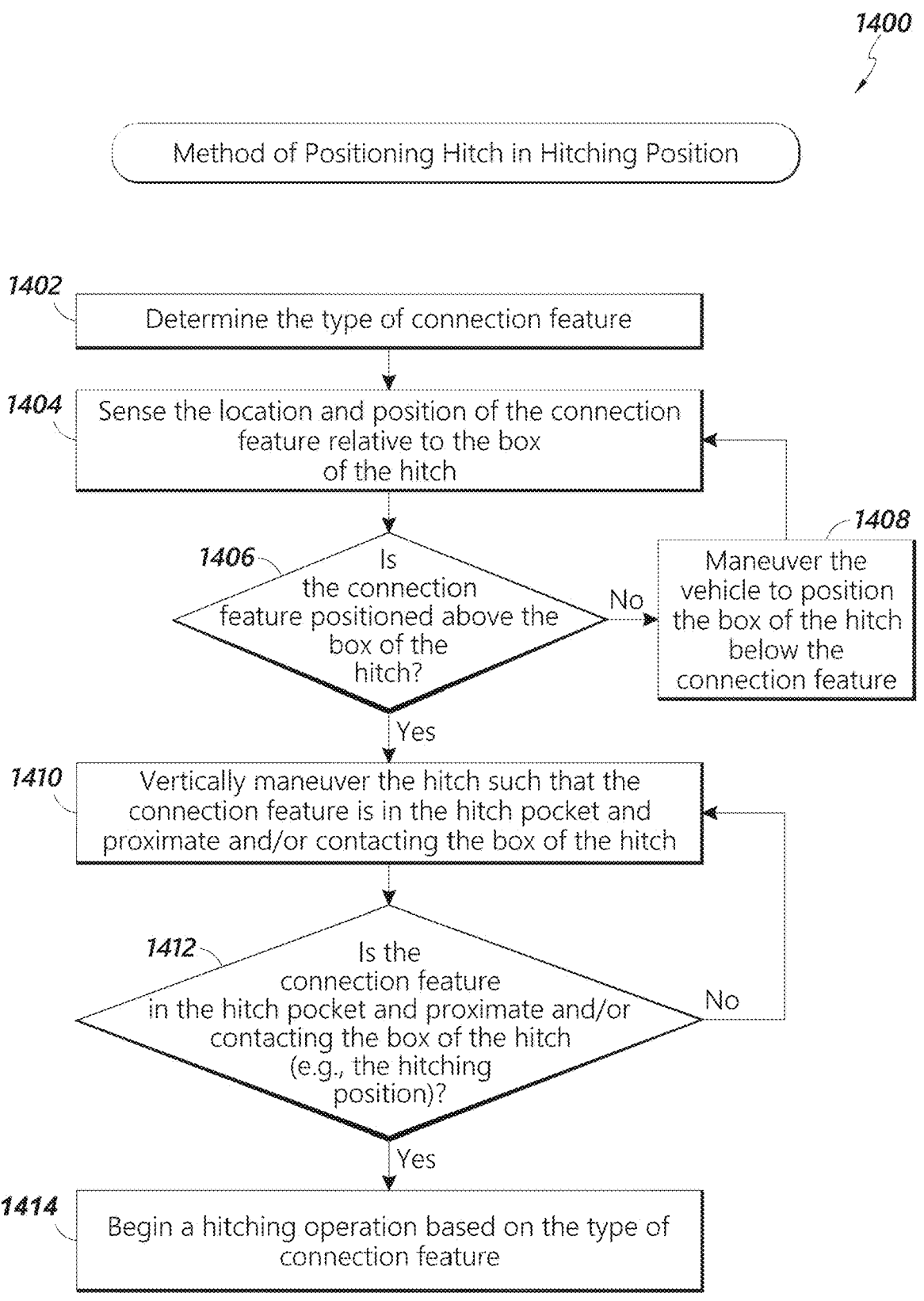
FIG. 14 illustrates an exemplary method of positioning a hitch in the hitching position.

FIG. 14 is a flow diagram depicting an exemplary method of positioning the hitch 1008 in the hitching position. The flow diagram is provided for the purpose of facilitating description of aspects of some embodiments. The diagram does not attempt to illustrate all aspects of the disclosure and should not be considered limiting.

The process 1400 begins at block 1402, wherein the auto-hitch system determines the type of connection feature on the rolling stock or container to which the AGV is to be coupled or connected. This can be accomplished using the methods disclosed elsewhere herein. In some embodiments, the auto-hitch system determines the type of connection feature using the method described in reference to FIG. 13.

At block 1404, the sensor 1070 and/or the auto-hitch control system 424 sense the location and position of the connection feature relative to the box 1050 of the hitch 1008. This can be accomplished using the methods disclosed elsewhere herein. In some embodiments, the auto-hitch control system 424 determines the location and position of the connection feature using the methods described in reference to FIG. 13.

At decision state 1406, the auto-hitch control system 424 determines if the connection feature is positioned above the box 1050, also referred to as a target and/or orientation feature, of the hitch 1008 and/or if the connection feature is vertically above the pocket 1052. If the connection feature is not positioned above the box 1050 or pocket 1052 of the hitch 1008, the process 1400 moves to block 1408 and the auto-hitch control system 424 maneuvers the vehicle, such as the forklift AGV 1006, to position the box 1050 of the hitch 1008 below the connection feature. Specifically, when the hitch 1008 only has the capability to move along the vertical axis, the auto-hitch control system 424 controls the position of the hitch 1008 by rotating the vehicle and moving the vehicle forwards, backwards, and/or laterally. If the hitch 1008 can be moved in more than just the vertical axis, the hitch 1008 can be moved laterally or back and forth by a servo or a motor attached to the hitch 1008. The process then proceeds to block 1404 to again sense/determine the location and position of the connection feature relative to the box 1050 of the hitch 1008.

If the connection feature is positioned above the box 1050 of the hitch 1008, the process 1400 moves to block 1410 and the auto-hitch control system 424 vertically maneuvers the hitch 1008 such that the connection feature is in the hitch pocket 1052 and/or proximate, contacting, and/or in the box 1050 of the hitch 1008 (e.g., the hitching position). As described elsewhere herein, the hitch 1008 can be vertically maneuvered up and down with movement of the frame 1030 or other component to which the hitch 1008 is coupled.

At decision state 1412, the auto-hitch control system 424 determines if the connection feature is in the hitch pocket 1052 and proximate, contacting, and/or in the box 1050 of the hitch 1008 (e.g., the hitching position). The auto-hitch control system 424 can determine the location of the connection feature relative to the box 1050 of the hitch 1008 using the methods disclosed elsewhere herein, which can include the methods disclosed in reference to FIG. 13. If the connection feature is not in the hitch pocket 1052 and proximate, contacting, and/or in the box 1050 of the hitch 1008, the process 1400 proceeds to block 1410 to vertically maneuver the hitch 1008 such that the connection feature is in the hitch pocket 1052 and proximate, contacting, and/or in the box 1050 of the hitch 1008 (e.g., in the hitching position). If the connection feature is in the hitch pocket 1052 and proximate, contacting, and/or in the box 1050 of the hitch 1008 (e.g., in the hitching position), the process 1400 proceeds to block 1414 and begins a hitching operation based on the detected type of connection feature.

Figure 15:
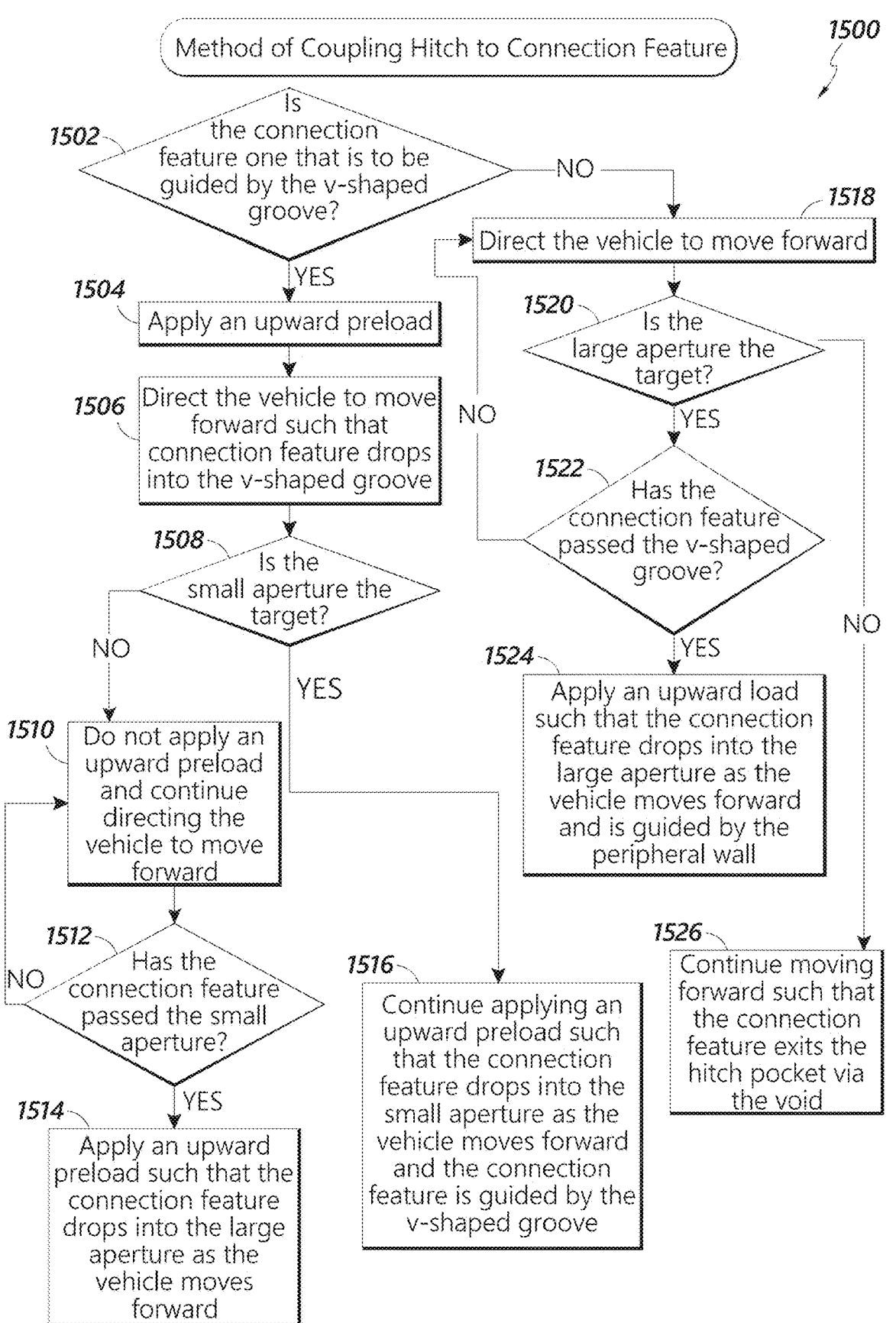
FIG. 15 illustrates an exemplary method of coupling a hitch to a connection feature.

FIG. 15 is a flow diagram depicting an exemplary method of coupling the hitch 1008 to the connection feature. The flow diagram is provided for the purpose of facilitating description of aspects of some embodiments. The diagram does not attempt to illustrate all aspects of the disclosure and should not be considered limiting.

The process 1500 begins at decision state 1502, wherein the auto-hitch control system 424 determines if the detected connection feature is one that is to be guided by the v-shaped groove 1038. In some embodiments, the auto-hitch control system 424 implements a predetermined hitching operation associated with the identified and/or recognized connection feature, which can include being guided by the v-shaped groove 1038. In some embodiments, the auto-hitch control system 424 determines the size and/or shape of a connection feature, and based on that determination, implements a hitching operation, which can include predetermined hitching operations, suitable for the determined size and/or shape of the connection feature.

If the connection feature is one that is to be guided by the v-shaped groove 1038, the process 1500 moves to block 1504 and the auto-hitch control system 424 directs the vehicle to apply an upward preload, raising the hitch 1008 to exert a force on the connection feature.

At block 1506, the auto-hitch control system 424 directs the vehicle to move forward such that the connection feature drops into the v-shaped groove 1038. The auto-hitch control system 424 can direct the vehicle to move forward in a straight line. The walls of the v-shaped groove 1038 can guide the connection feature toward the small aperture 1040, also known as the second aperture. As explained elsewhere herein, the container can move as a result of the connection feature engaging with the walls of the v-shaped groove 1038 such that the connection feature moves toward the small aperture 1040 as the vehicle moves forward in a straight line.

At decision state 1508, the auto-hitch control system 424 determines if the small aperture 1040 is the target, which can be determined by referencing the hitching operation associated with the connection feature. If the small aperture 1040 is the target, the process 1500 proceeds to block 1516 and the auto-hitch control system 424 continues to apply an additional upward preload such that the connection feature drops into the small aperture 1040 as the vehicle moves forward and the connection feature is guided by the v-shaped groove 1038. In some embodiments, the auto-hitch control system 424 continues to apply an upward preload after the connection feature drops into the small aperture 1040 to ensure a secure coupling.

If the small aperture 1040 is not the target, the process 1500 moves to block 1510 and the auto-hitch control system 424 does not apply an additional upward preload and continues to direct the vehicle to move forward. The walls of the v-shaped groove 1038 can guide the connection feature toward the small aperture 1040 and/or central longitudinal axis of the hitch 1008. As explained elsewhere herein, the container can move as a result of the connection feature engaging with the walls of the v-shaped groove 1038 such that the connection feature moves toward the small aperture 1040 and/or central longitudinal axis of the hitch 1008 as the vehicle moves forward in a straight line.

At decision state 1512, the auto-hitch control system 424 determines whether the connection feature has passed the small aperture 1040. If the connection feature has passed the small aperture 1040, the process 1500 continues to block 1514 and the auto-hitch control system 424 applies an additional upward preload such that the connection feature drops into the large aperture 1042 as the vehicle moves forward. In some embodiments, the auto-hitch control system 424 continues to apply an upward preload after the connection feature drops into the larger aperture 1042 to ensure a secure coupling.

If the connection feature has not passed the small aperture 1040, the process 1500 returns to block 1510 and an upward preload is not applied and the auto-hitch control system 424 continues to direct the vehicle to move forward.

Returning to decision state 1502, if the connection feature is one that is not to be guided by the v-shaped groove 1038, the process 1500 moves to block 1518 and the auto-hitch control system 424 directs the vehicle, such as the forklift AGV 1006, to move forward. The auto-hitch control system 424 can direct the vehicle to move forward in a straight line. The connection feature does not drop into the v-shaped groove 1038 as the vehicle moves forward because no upward preload is applied.

At decision state 1520, the auto-hitch control system 424 determines if the large aperture 1042, also known as the first aperture, is the target, which can be determined by referencing the hitching operation associated with the connection feature. If the large aperture 1042 is not the target, the process 1500 proceeds to block 1526 and the auto-hitch control system 424 continues moving forward, without applying a preload, such that the connection feature exits the hitch pocket 1052 via the void 1044.

If the large aperture 1042 is the target, the process 1500 proceeds to decision state 1522 and determines if the connection feature has passed the v-shaped groove 1038. If the connection feature has not passed the v-shaped groove 1038, the process 1500 proceeds to block 1518 and the auto-hitch control system 424 directs the vehicle to move forward. If the connection feature has passed the v-shaped groove 1038, the process 1500 proceeds to block 1524 and the auto-hitch control system 424 causes the vehicle to apply an upward load to the hitch 1008 such that the connection feature drops into the large aperture 1042 as the vehicle moves forward and is guided by the peripheral wall 1036. In some embodiments, the auto-hitch control system 424 continues to cause the vehicle to apply an upward load to the hitch 1008 to ensure a secure coupling.

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may comprise, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Any methods disclosed herein need not be performed in the order recited. The methods disclosed herein include certain actions taken by a practitioner; however, they can also include any third-party instruction of those actions, either expressly or by implication. For example, actions such as "controlling a motor speed" include "instructing controlling of a motor speed."

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and steps described above. Whether such functionality is implemented in hardware or software depends upon the particular application and design constraints imposed on the overall system.

In one or more aspects, the functions described herein may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable storage medium. The steps of a method or algorithm disclosed herein may be implemented in a processor-executable software module which may reside on a computer-readable storage medium. Computer-readable storage media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above can also be included within the scope of computer-readable storage media. Additionally, the operations of a method or algorithm may reside as one or any combination or set of codes and instructions on a machine readable storage medium and computer-readable storage medium, which may be incorporated into a computer program product.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Instructions refer to computer-implemented steps for processing information in the system. Instructions can be implemented in software, firmware or hardware and include any type of programmed step undertaken by components of the system.

As can be appreciated by one of ordinary skill in the art, each of the modules of the invention may comprise various sub-routines, procedures, definitional statements, and macros. Each of the modules are typically separately compiled and linked into a single executable program. Therefore, the description of each of the modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware. A person of skill in the art will understand that the functions and operations of the electrical, electronic, and computer components described herein can be carried out automatically according to interactions between components without the need for user interaction.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An automatic coupling system for an automated guided vehicle (AGV), the system comprising:

a coupling hitch assembly comprising
   a frame adapted to attach to the AGV;
   a rotational shaft rotationally connected to the frame;
   a coupling hitch connected to the rotational shaft, the coupling hitch configured to rotate relative to the AGV, the coupling hitch comprising a plurality of coupling features, each of the plurality of coupling features configured to couple to a different type of connection feature; and
   a sensor coupled to the coupling hitch; and
one or more processors configured to
   receive sensor input from the sensor;
   generate a digital representation of an item container based on the received sensor input;
   extract a point cloud of a connection feature of the item container from the digital representation of the item container;
   determine, based on the extracted point cloud, a location of the connection feature;
   determine, based on the extracted point cloud, a type of the item container;
   identify, based on the determined type of item container, one of the plurality of coupling features configured to couple to the coupling feature on the determined type of item container; and
   rotate, based on the determined location of the coupling feature and the identified one of the plurality of coupling features, the coupling hitch relative to the AGV to align the identified one of the plurality of coupling features of the coupling hitch with the connection feature of the item container.

2. The system of claim 1, wherein the one or more processors are further configured to determine a type of the connection feature based on the extracted point cloud.

3. The system of claim 1, wherein the coupling hitch assembly further comprises a vertical actuator, and wherein the one or more processors are further configured to actuate the vertical actuator to move the coupling hitch relative to the AGV along a vertical axis to couple the coupling feature of the coupling hitch to the connection feature of the item container.

4. The system of claim 1, wherein the coupling hitch assembly further comprises a rotational actuator, and wherein the one or more processors are further configured to actuate the rotational actuator to rotate the coupling feature to align the coupling feature under the connection feature of the item container.

5. The system of claim 1, wherein the one or more processors are further configured to determine a size of the connection feature based on the extracted point cloud.

6. The system of claim 1, further comprising a vertical actuator, wherein the one or more processors are configured to vertically maneuver the coupling hitch using the vertical actuator.

7. The system of claim 6, wherein the AGV is a forklift, and wherein the vertical actuator comprises a lifting mechanism of the forklift.

8. The system of claim 1, further comprising a rotational actuator, wherein the one or more processors are configured to rotatably maneuver the coupling feature with the rotational actuator.

9. The system of claim 1, wherein the sensor is further configured to perform a three-dimensional scan of the item container.

10. The system of claim 1, wherein the sensor is further configured to scan the item container using stereo infrared vision with an internal dot projector.

11. A method of automatically coupling an automated guided vehicle (AGV) to an item container, the method comprising:

scanning the item container with a sensor on a coupling hitch of an AGV, wherein the coupling hitch on the AGV comprises a plurality of coupling features, each of the plurality of coupling features configured to couple to a different type of connection feature;

receiving sensor input from the scanning of the item container;

generating a digital representation of the item container based on the received sensor input;

extracting a point cloud of a connection feature of the item container from the digital representation of the item container;

measuring, in the extracted point cloud, the connection feature of the item container;

identifying, based on the measuring, a type of the item container;

determining, based on the extracted point cloud, a location of the connection feature of the item container;

identifying, based on the determined type of item container, one of the plurality of coupling features configured to couple to the coupling feature on the determined type of item container; and directing movements of the coupling hitch relative to the AGV to couple the identified one of the plurality of coupling features of the coupling hitch with the connection feature of the item container.

12. The method of claim 11, wherein the AGV is a forklift, and wherein the moving the coupling hitch along a vertical axis comprises vertically moving a lifting mechanism of the forklift.

13. The method of claim 11, further comprising rotatably maneuvering the coupling hitch with a rotational actuator.

14. The method of claim 11, wherein the scanning the item container with the sensor comprises scanning utilizing stereo infrared vision with an internal dot projector.

* * * * *